US012464288B2

(12) United States Patent
Ha et al.

(10) Patent No.: US 12,464,288 B2
(45) Date of Patent: Nov. 4, 2025

(54) APPARATUS

(71) Applicant: LG Display Co., Ltd., Seoul (KR)

(72) Inventors: GyungBo Ha, Gyeonggi-do (KR); Taehyung Kim, Gyeonggi-do (KR); SeulKi Nam, Gyeonggi-do (KR); Minjung Kim, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 269 days.

(21) Appl. No.: 18/208,621

(22) Filed: Jun. 12, 2023

(65) Prior Publication Data

US 2024/0007795 A1 Jan. 4, 2024

(30) Foreign Application Priority Data

Jun. 30, 2022 (KR) ........................ 10-2022-0080216

(51) Int. Cl.
*H04R 7/10* (2006.01)
*H04R 1/28* (2006.01)
*H04R 17/10* (2006.01)

(52) U.S. Cl.
CPC ............. *H04R 7/10* (2013.01); *H04R 1/2849* (2013.01); *H04R 17/10* (2013.01); *H04R 2499/15* (2013.01)

(58) Field of Classification Search
CPC ........ H04R 7/10; H04R 1/2849; H04R 17/10; H04R 2499/15
See application file for complete search history.

(56) References Cited

U.S. PATENT DOCUMENTS

2022/0182744 A1* 6/2022 Han ........................ H04R 7/045

* cited by examiner

*Primary Examiner* — Sunita Joshi
(74) *Attorney, Agent, or Firm* — Morgan, Lewis & Bockius LLP

(57) ABSTRACT

An apparatus includes a vibration member, a vibration device connected with the vibration member, a supporting member at a rear surface of the vibration member and configured to include an internal space, and a plurality of holes configured at the supporting member. In another aspect, an apparatus includes a vibration member, a vibration device connected with the vibration member, and a housing covering a rear surface of the vibration member and including a plurality of holes, wherein an internal space provided by the vibration member and the housing is connected to an external space of the housing through the plurality of holes.

47 Claims, 32 Drawing Sheets

APPARATUS

CROSS-REFERENCE TO RELATED APPLICATIONS

This application claims the benefit of and priority to Korean Patent Application No. 10-2022-0080216 filed on Jun. 30, 2022, the entirety of which is hereby incorporated by reference for all purposes as if fully set forth herein.

BACKGROUND

Technical Field

The present disclosure relates to an apparatus, and more particularly, to an apparatus for outputting a sound.

Discussion of the Related Art

An apparatus includes a separate speaker or a sound apparatus for providing a sound. The sound apparatus includes a vibration system which converts an input electrical signal into a physical vibration. Piezoelectric speakers including a piezoelectric device is lightweight and has low power consumption, and thus, is used for various purposes.

In piezoelectric device used for piezoelectric speakers, a lowest resonance frequency increases due to high stiffness, and due to this, a sound pressure level of a low-pitched sound band is easily insufficient. Therefore, the piezoelectric speakers have a technical problem where a sound pressure level of the low-pitched sound band is not sufficient, and due to this, apparatuses including a piezoelectric speaker have a technical problem where a sound pressure level characteristic of the low-pitched sound band is not sufficient.

SUMMARY

Therefore, the inventors of the present disclosure have recognized problems described above and have performed extensive research and experiments for enhancing a sound characteristic and/or a sound pressure level characteristic of an apparatus or a sound apparatus. Based on the extensive research and experiments, the inventors of the present disclosure have invented an apparatus for enhancing a sound characteristic and/or a sound pressure level characteristic of a low-pitched sound band of the apparatus.

Accordingly, embodiments of the present disclosure are directed to an apparatus that substantially obviates one or more of the problems due to limitations and disadvantages of the related art.

An aspect of the present disclosure is to provide an apparatus which may enhance a sound characteristic and/or a sound pressure level characteristic of a low-pitched sound band.

Another aspect of the present disclosure is to provide an apparatus which may enhance a sound characteristic and/or a sound pressure level characteristic of a low-pitched sound band and may output a sound in both directions.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other advantages and aspects of the present disclosure, as embodied and broadly described herein, an apparatus may comprise a vibration member, a vibration device connected with the vibration member, a supporting member at a rear surface of the vibration member and configured to include an internal space, and a plurality of holes configured at the supporting member.

In another aspect, an apparatus may comprise a vibration member, a vibration device connected with the vibration member, and a housing covering a rear surface of the vibration member and including a plurality of holes, an internal space provided by the vibration member and the housing is connected to an external space of the housing through the plurality of holes.

According to one or more embodiments of the present disclosure, an apparatus for enhancing a sound characteristic and/or a sound pressure level characteristic of a low-pitched sound band may be provided.

According to one or more embodiments of the present disclosure, an apparatus for enhancing a sound characteristic and/or a sound pressure level characteristic of a low-pitched sound band and outputting a sound in both directions may be provided.

In an apparatus according to one or more embodiments of the present disclosure, an internal space provided between a supporting member and a vibration member may communicate with an external space through a plurality of holes provided in the supporting member, and thus, an air pressure of the internal space may decrease, thereby enhancing a sound characteristic and/or a sound pressure level characteristic of a low-pitched sound band and outputting a sound in both directions.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with aspects of the disclosure.

It is to be understood that both the foregoing description and the following description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate aspects and embodiments of the disclosure and together with the description serve to explain principles of the disclosure.

Figure 1:
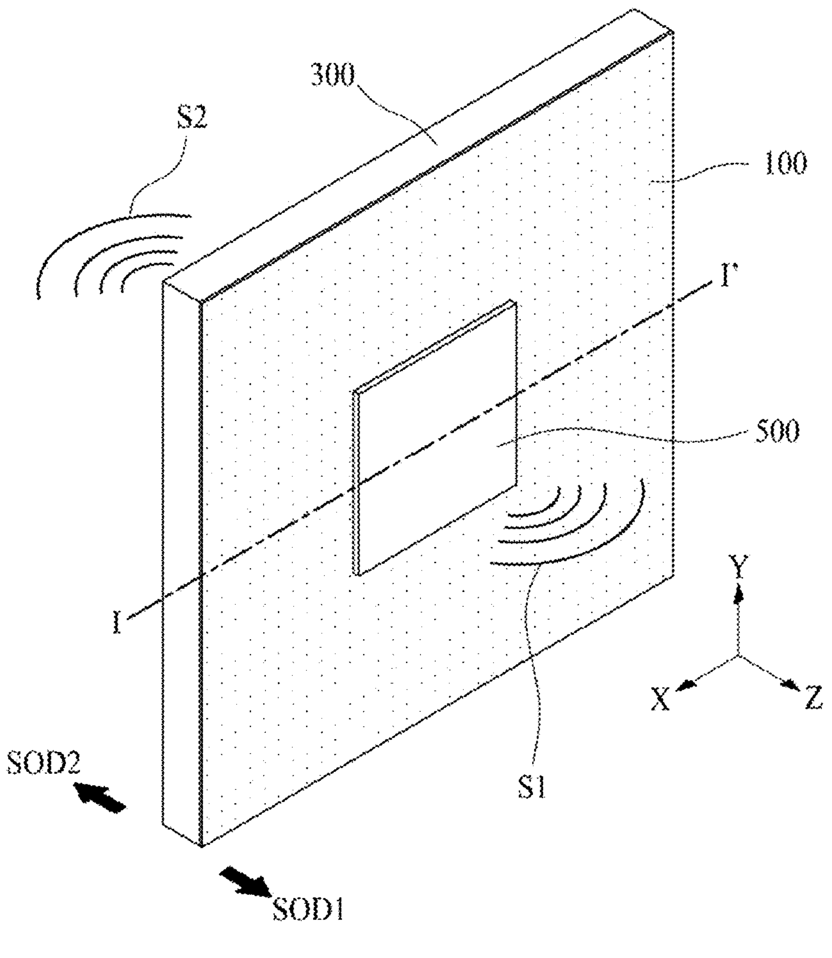
FIG. 1 is a perspective view illustrating an apparatus according to an embodiment of the present disclosure.

Throughout the drawings and the detailed description, unless otherwise described, the same drawing reference numerals should be understood to refer to the same elements, features, and structures. The sizes, lengths, and thicknesses of layers, regions and elements, and depiction of thereof may be exaggerated for clarity, illustration, and convenience.

DETAILED DESCRIPTION

Reference is now made in detail to embodiments of the present disclosure, examples of which may be illustrated in the accompanying drawings. In the following description, when a detailed description of well-known functions or configurations may unnecessarily obscure aspects of the present disclosure, the detailed description thereof may be omitted for brevity. The progression of processing steps and/or operations described is an example; however, the sequence of steps and/or operations is not limited to that set forth herein and may be changed, with the exception of steps and/or operations necessarily occurring in a particular order.

Advantages and features of the present disclosure, and implementation methods thereof, are clarified through the embodiments described with reference to the accompanying drawings. The present disclosure may, however, be embodied in different forms and should not be construed as limited to the embodiments set forth herein. Rather, these embodiments are examples and are provided so that this disclosure may be thorough and complete to assist those skilled in the art to understand the inventive concepts without limiting the protected scope of the present disclosure.

The shapes, sizes, areas, ratios, angles, numbers, and the like disclosed in the drawings for describing embodiments of the present disclosure are merely an example, and thus, the present disclosure is not limited to the illustrated details. Like reference numerals refer to like elements throughout.

When the term “comprise,” “have,” “include,” “contain,” “constitute,” “make up of,” “formed of,” or the like is used, one or more other elements may be added unless a term such as “only” or the like is used. The terms used in the present disclosure are merely used in order to describe particular embodiments, and are not intended to limit the scope of the present disclosure. The terms used herein are merely used in order to describe example embodiments, and are not intended to limit the scope of the present disclosure. The terms of a singular form may include plural forms unless the context clearly indicates otherwise. The word “exemplary” is used to mean serving as an example or illustration. Embodiments are example embodiments. Aspects are example aspects. Any implementation described herein as an “example” is not necessarily to be construed as preferred or advantageous over other implementations.

In one or more aspects, an element, feature, or corresponding information (e.g., a level, range, dimension, size, or the like) is construed as including an error or tolerance range even where no explicit description of such an error or tolerance range is provided. An error or tolerance range may be caused by various factors (e.g., process factors, internal or external impact, noise, or the like). Further, the term “may” encompasses all the meanings of the term “can.”

In describing a positional relationship where the positional relationship between two parts is described, for example, using “on,” “over,” “under,” “above,” “below,” “beneath,” “near,” “close to,” or “adjacent to,” “beside,” “next to,” or the like, one or more other parts may be located between the two parts unless a more limiting term, such as “immediate(ly),” “direct(ly),” or “close(ly),” is used. For example, when a structure is described as being positioned “on,” “over,” “under,” “above,” “below,” “beneath,” “near,” “close to,” or “adjacent to,” “beside,” or “next to” another structure, this description should be construed as including a case in which the structures contact each other as well as a case in which one or more additional structures are disposed therebetween. Furthermore, the terms “front,” “rear,” “back,” “left,” “right,” “top,” “bottom,” “downward,” “upward,” “upper,” “lower,” “up,” “down,” “column,” “row,” “vertical,” “horizontal,” and the like refer to an arbitrary frame of reference.

In describing a temporal relationship, when the temporal order is described as, for example, “after,” “subsequent,” “next,” and “before,” “preceding,” “prior to,” or the like a case that is not consecutive or not sequential may may be included unless a more limiting term, such as “just,” “immediate(ly),” or “direct(ly)” is used.

It will be understood that, although the term “first,” “second,” or the like may be used herein to describe various elements, these elements should not be limited by these terms. These terms are only used to distinguish one element from another. For example, a first element could be a second element, and, similarly, a second element could be a first element, without departing from the scope of the present disclosure. Furthermore, the first element, the second element, and the like may be arbitrarily named according to the convenience of those skilled in the art without departing from the scope of the present disclosure. The terms “first,” “second,” and the like may be used to distinguish components from each other, but the functions or structures of the components are not limited by ordinal numbers or component names in front of the components.

In describing elements of the present disclosure, the terms “first,” “second,” “A,” “B,” “(a),” “(b),” or the like may be used. These terms are intended to identify the corresponding element(s) from the other element(s), and these are not used to define the essence, basis, order, or number of the elements.

For the expression that an element is “connected,” “coupled,” “attached,” or “adhered” to another element or layer the element or layer can not only be directly connected, coupled, attached, or adhered to another element or layer, but also be indirectly connected, coupled, attached, or adhered to another element or layer with one or more intervening elements or layers disposed or interposed between the elements or layers, unless otherwise specified.

For the expression that an element or layer "contacts," "overlaps," or the like with another element or layer, the element or layer can not only directly contact, overlap, or the like with another element or layer, but also indirectly contact, overlap, or the like with another element or layer with one or more intervening elements or layers disposed or interposed between the elements or layers, unless otherwise specified.

The terms such as a "line" or "direction" should not be interpreted only based on a geometrical relationship in which the respective lines or directions are parallel or perpendicular to each other, and may be meant as lines or directions having wider directivities within the range within which the components of the present disclosure can operate functionally.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as only one of the first item, the second item, or the third item.

The expression of a first element, a second elements "and/or" a third element should be understood as one of the first, second and third elements or as any or all combinations of the first, second and third elements. By way of example, A, B and/or C can refer to only A; only B; only C; any or some combination of A, B, and C; or all of A, B, and C. Furthermore, an expression "element A/element B" may be understood as element A and/or element B.

In one or more aspects, the terms "between" and "among" may be used interchangeably simply for convenience unless stated otherwise. For example, an expression "between a plurality of elements" may be understood as among a plurality of elements. In another example, an expression "among a plurality of elements" may be understood as between a plurality of elements. In one or more examples, the number of elements may be two. In one or more examples, the number of elements may be more than two.

In one or more aspects, the phrases "each other" and "one another" may be used interchangeably simply for convenience unless stated otherwise. For example, an expression "different from each other" may be understood as being different from one another. In another example, an expression "different from one another" may be understood as being different from each other. In one or more examples, the number of elements involved in the foregoing expression may be two. In one or more examples, the number of elements involved in the foregoing expression may be more than two.

In one or more aspects, the phrases "one or more among" and "one or more of" may be used interchangeably simply for convenience unless stated otherwise.

Features of various embodiments of the present disclosure may be partially or wholly coupled to or combined with each other, and may be variously inter-operated, linked or driven together. The embodiments of the present disclosure may be carried out independently from each other, or may be carried out together in a co-dependent or related relationship. In one or more aspects, the components of each apparatus according to various embodiments of the present disclosure are operatively coupled and configured.

Unless otherwise defined, the terms (including technical and scientific terms) used herein have the same meaning as commonly understood by one of ordinary skill in the art to which example embodiments belong. It is further understood that terms, such as those defined in commonly used dictionaries, should be interpreted as having a meaning that is, for example, consistent with their meaning in the context of the relevant art and should not be interpreted in an idealized or overly formal sense unless expressly defined otherwise herein.

In the following description, various example embodiments of the present disclosure are described in detail with reference to the accompanying drawings. With respect to reference numerals to elements of each of the drawings, the same elements may be illustrated in other drawings, and like reference numerals may refer to like elements unless stated otherwise. In addition, for convenience of description, a scale, dimension, size, and thickness of each of the elements illustrated in the accompanying drawings may be different from an actual scale, dimension, size, and thickness, and thus, embodiments of the present disclosure are not limited to a scale, dimension, size, and thickness illustrated in the drawings.

Figure 2:
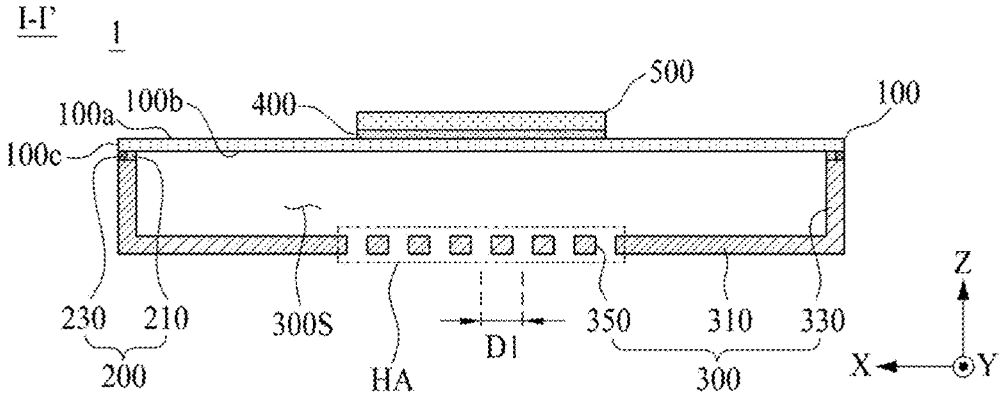
FIG. 2 is a cross-sectional view taken along line I-I' illustrated in FIG. 1 according to an embodiment of the present disclosure.
Figure 3:
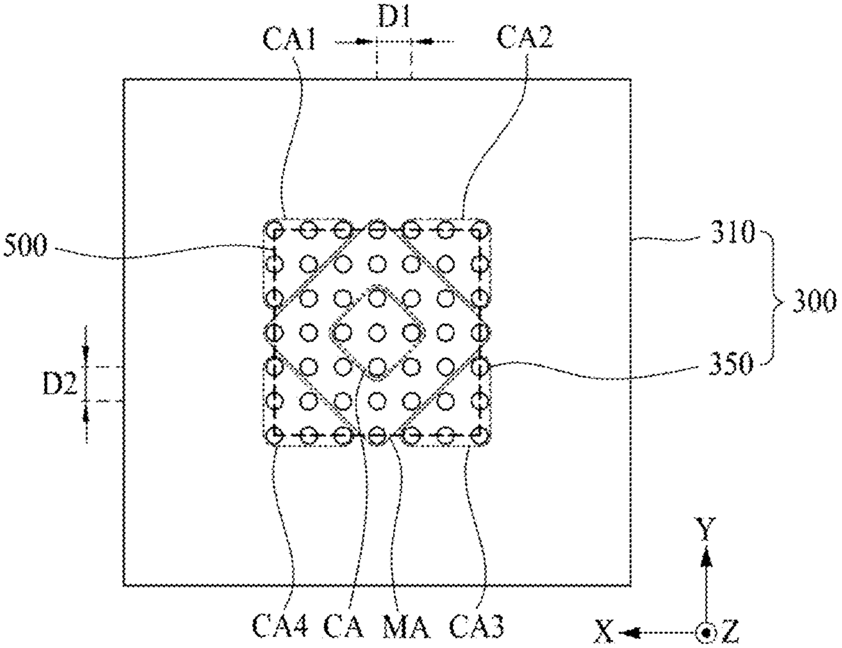
FIG. 3 illustrates an arrangement structure of a hole illustrated in FIG. 2 according to an embodiment of the present disclosure.

FIG. 1 is a perspective view illustrating an apparatus according to an embodiment of the present disclosure. FIG. 2 is a cross-sectional view taken along line I-I' illustrated in FIG. 1 according to an embodiment of the present disclosure. FIG. 3 illustrates an arrangement structure of a hole illustrated in FIG. 2 according to an embodiment of the present disclosure.

With reference to FIGS. 1 and 2, an apparatus 1 according to an embodiment of the present disclosure may implement or realize a sound apparatus, a sound output apparatus, a vibration apparatus, a vibration generating apparatus, a sound bar, a sound system, a sound apparatus for electronic apparatuses, a sound apparatus for displays, a sound apparatus for vehicular apparatuses, or a sound bar for vehicular apparatuses, or the like. For example, a vehicular apparatus may include one or more seats and one or more glass windows. For example, the vehicular apparatus may include a vehicle, a train, a ship, or an aircraft, but embodiments of the present disclosure are not limited thereto. Furthermore, the apparatus 1 according to an embodiment of the present disclosure may implement or realize an analog signage or a digital signage, or the like such as an advertising signboard, a poster, or a noticeboard, or the like.

The apparatus 1 according to an embodiment of the present disclosure may be a display apparatus which includes a plurality of pixels, but embodiments of the present disclosure are not limited thereto.

The display apparatus may include a display panel, which includes a plurality of pixels for configuring a black/white or a color image, and a driver configured to drive the display panel. The pixel may be a subpixel which configures one of a plurality of colors implementing a color image. The apparatus according to an embodiment of the present disclosure may include a set electronic apparatus or a set device (or a set apparatus) such as notebook computers, televisions (TVs), computer monitors, equipment apparatuses including an automotive apparatus or another type apparatus for vehicles, or mobile electronic apparatuses such as smartphones or electronic pads, which is a complete product (or a final product) including a liquid crystal display panel or an organic light emitting display panel, or the like.

The apparatus 1 according to an embodiment of the present disclosure may include a vibration member 100, a supporting member 300, and one or more vibration devices 500.

The vibration member 100 may generate a vibration or may output a sound (or a sound wave), based on a displacement (or driving) of the one or more vibration devices 500. The vibration member 100 may be a vibration object, a display member, a display panel, a signage panel, a passive vibration plate, a front member, a rear member, a vibration panel, a sound panel, a passive vibration panel, a sound output plate, a sound vibration plate, or an image screen, or the like, but embodiments of the present disclosure are not limited thereto.

The vibration member 100 according to an embodiment of the present disclosure may include a polygonal shape including a rectangular shape or a square shape, but embodiments of the present disclosure are not limited thereto. The vibration member 100 may include a widthwise length parallel to a first direction X and a lengthwise length parallel to a second direction Y. For example, with respect to a same plane, the first direction X may be a first horizontal direction or a first horizontal length direction of the vibration member 100, and the second direction Y may be a second horizontal direction or a second horizontal length direction of the vibration member 100 which are orthogonal to the first direction X.

The vibration member 100 according to an embodiment of the present disclosure may include a structure having totally a same thickness, but embodiments of the present disclosure are not limited thereto. For example, the vibration member 100 may include a plate structure having totally a same thickness, but embodiments of the present disclosure are not limited thereto. For example, the vibration member 100 may include a nonplanar structure.

According to an embodiment of the present disclosure, the vibration member 100 may include a first surface 100*a*, a second surface 100*b*, and a plurality of lateral surfaces 100*c*.

In the vibration member 100, the first surface 100*a* may be a front surface, a forward surface, a top surface, or an upper surface. The second surface 100*b* may be a rear surface, a rearward surface, a backside, a back surface, a bottom surface, or a lower surface. Each of the plurality of lateral surfaces 100*c* may be a side, an outer side, a sidewall, or an outer wall.

According to an embodiment of the present disclosure, each of the first surface 100*a* and the second surface 100*b* of the vibration member 100 may include a planar structure. The vibration member 100 may include a structure having a totally uniform thickness, but embodiments of the present disclosure are not limited thereto. For example, the vibration member 100 may include a plate structure having a totally uniform thickness, but embodiments of the present disclosure are not limited thereto.

According to an embodiment of the present disclosure, in the vibration member 100, each of the plurality of lateral surfaces 100*c* may include a vertical surface structure parallel to a third direction Z. The third direction Z may be a direction parallel to a thickness direction of the vibration member 100.

According to an embodiment of the present disclosure, in the vibration member 100, each of the plurality of lateral surfaces 100*c* may include one or more protrusion patterns which protrude along the first direction X or the second direction Y. For example, each of the plurality of lateral surfaces 100*c* may include one or more protrusion patterns which sharply protrude along the first direction X or the second direction Y. The vibration member 100 may include one or more protrusion patterns (or a triangular protrusion pattern) at a region between two adjacent corner portions (or vertexes).

The vibration member 100 according to an embodiment of the present disclosure may be configured to be transparent, translucent, or opaque. The vibration member 100 may include a metal material or a nonmetal material (or a composite nonmetal material) having a material characteristic suitable for outputting a sound based on a vibration. The metal material of the vibration member 100 may include any one or more materials of stainless steel, aluminum (Al), an Al alloy, a magnesium (Mg), a Mg alloy, and a magnesium-lithium (Mg—Li) alloy, but embodiments of the present disclosure are not limited thereto. The nonmetal material (or the composite nonmetal material) of the vibration member 100 may include one or more material (or substance) of plastic, fiber, leather, wood, cloth, rubber, carbon, glass, and paper, but embodiments of the present disclosure are not limited thereto. For example, the paper may be cone paper for speakers. For example, the cone paper may be a pulp or a foamed plastic, or the like, but embodiments of the present disclosure are not limited thereto.

The vibration member 100 according to an embodiment of the present disclosure may implement or realize a signage panel such as an analog signage or a digital signage, or the like such as an advertising signboard, a poster, or a noticeboard, or the like. For example, when the vibration member 100 implements the signage panel, the analog signage may include signage content such as a sentence, a picture, and a sign, or the like. The signage content may be disposed at the vibration member 100 to be visible or visual. For example, the signage content may be attached on one or more of the first surface 100*a* and the second surface 100*b* of the vibration member 100. For example, the signage content may be directly attached on one or more of the first surface 100*a* and the second surface 100*b* of the vibration member 100. For example, the signage content may be printed on a medium such as paper or the like, and the medium with the signage content printed thereon may be directly attached on one or more of the first surface 100*a* and the second surface 100*b* of the vibration member 100. For example, when the signage content is attached on the second surface 100*b* of the vibration member 100, the vibration member 100 may be configured as a transparent material.

The supporting member 300 may be configured or disposed at the second surface 100*b* of the vibration member 100. The supporting member 300 may be configured to support a periphery portion of the second surface 100*b* of the vibration member 100. The supporting member 300 may be configured to support a periphery portion of a rear surface of the vibration member 100. The supporting member 300 may be configured to cover the second surface 100*b* of the vibration member 100.

The supporting member 300 according to an embodiment of the present disclosure may include an internal space 300S which surrounds the second surface 100*b* of the vibration member 100. For example, the supporting member 300 may include a box shape where one side (or an upper side or an upper portion) of the internal space 300S is opened. For example, the supporting member 300 may be a case, an outer case, a case member, a housing, a housing member, a cabinet, an enclosure, a sealing member, a sealing cap, a sealing box, or a sound box, or the like, but embodiments of the present disclosure are not limited thereto. For example, the internal space 300S of the supporting member 300 may be an accommodation space, a storage space, a receiving space, a gap space, an air space, a vibration space, a sound space, a sound box, or a sealing space, or the like, but embodiments of the present disclosure are not limited thereto.

The supporting member 300 according to an embodiment of the present disclosure may include one or more of a metal material and a nonmetal material (or a composite nonmetal material), but embodiments of the present disclosure are not limited thereto. For example, the supporting member 300 may include one or more materials of a metal material, plastic, and wood, but embodiments of the present disclosure are not limited thereto. For example, the connector 400 may configure as a metal material such as aluminum (Al) or a plastic material such as plastic or styrene material, but embodiments of the present disclosure are not limited thereto. For example, the styrene material may be an ABS material. The ABS material may be acrylonitrile, butadiene, or styrene.

The supporting member 300 according to an embodiment of the present disclosure may include a first supporting part 310 and a second supporting part 330.

The first supporting part 310 may be disposed in parallel with the vibration member 100. The first supporting part 310 may be disposed to face the second surface 100*b* of the vibration member 100. The first supporting part 310 may be disposed to cover the second surface 100*b* of the vibration member 100. The first supporting part 310 may be spaced apart from the second surface 100*b* of the vibration member 100. For example, the first supporting part 310 may be spaced apart from the second surface 100*b* of the vibration member 100 with the internal space 300S therebetween. For example, the first supporting part 310 may be a floor part, a bottom part, a floor plate, a bottom plate, a supporting plate, a housing plate, or a housing floor part, or the like, but embodiments of the present disclosure are not limited thereto.

The second supporting part 330 may be connected to a periphery portion of the first supporting part 310. For example, the second supporting part 330 may include a structure bent from the periphery portion of the first supporting part 310. For example, the second supporting part 330 may be parallel to the third direction Z, or may be inclined from the third direction Z. For example, the supporting member 300 may include two or more second supporting parts 330. For example, the second supporting part 330 may be a lateral part, a sidewall, a supporting sidewall, a housing lateral surface, or a housing sidewall, or the like, but embodiments of the present disclosure are not limited thereto.

The second supporting part 330 may be integrated into the first supporting part 310. For example, the first supporting part 310 and the second supporting part 330 may be integrated as one body (a single body), and thus, the internal space 300S surrounded by the second supporting part 330 may be provided over the first supporting part 310. Accordingly, the supporting member 300 may include a box shape where one side (or an upper side or an upper portion) is opened by the first supporting part 310 and the second supporting part 330.

The supporting member 300 may be connected or coupled to the vibration member 100 by a coupling member 200. The supporting member 300 may be connected or coupled to the second surface 100*b* of the vibration member 100 by the coupling member 200. For example, the supporting member 300 may be connected or coupled to a periphery portion of the second surface 100*b* of the vibration member 100 by the coupling member 200.

The coupling member 200 may be configured to minimize or prevent the transfer of a vibration of the vibration member 100 to the supporting member 300. The coupling member 200 may include a material characteristic suitable for blocking a vibration. For example, the coupling member 200 may include a material having elasticity. For example, the coupling member 200 may include a material having elasticity for vibration absorption (or impact absorption). The coupling member 200 according to an embodiment of the present disclosure may be configured as polyurethane materials or polyolefin materials, but embodiments of the present disclosure are not limited thereto. For example, the coupling member 200 may include one or more of an adhesive, a double-sided tape, a double-sided foam tape, a double-sided foam pad, and a double-sided cushion tape, but embodiments of the present disclosure are not limited thereto.

The coupling member 200 according to an embodiment of the present disclosure may prevent a physical contact (or friction) between the vibration member 100 and the second supporting part 330 of the supporting member 300, and thus, may prevent the occurrence of noise (or a noise sound) caused by the physical contact (or friction) between the vibration member 100 and the supporting member 300. For example, the coupling member 200 may be a buffer member, an elastic member, a damping member, a vibration absorption member, a vibration prevention member, or a vibration blocking member, but embodiments of the present disclosure are not limited thereto.

The coupling member 200 according to another embodiment of the present disclosure may be configured to minimize or prevent the transfer of a vibration of the vibration member 100 to the supporting member 300 and to decrease the reflection of a sound wave which is generated and input based on a vibration of the vibration member 100.

The coupling member 200 according to another embodiment of the present disclosure may include a first coupling member 210 and a second coupling member 230.

The first coupling member 210 may be disposed between the vibration member 100 and the supporting member 300. The first coupling member 210 may be disposed or coupled between a rear periphery portion of the vibration member 100 and a second supporting part 330 of the supporting member 300. For example, the first coupling member 210 may be disposed inward (or an inner portion) of the second coupling member 230. The first coupling member 210 may be configured to have hardness which is smaller than that of the second coupling member 230, for example, a modulus (or a Young's modulus). For example, the first coupling member 210 may include a double-sided polyurethane tape, a double-sided polyurethane foam tape, or a double-sided sponge tape, or the like, but embodiments of the present disclosure are not limited thereto.

The second coupling member 230 may be disposed between the vibration member 100 and the supporting member 300 to surround the first coupling member 210. The second coupling member 230 may be disposed or coupled between the rear periphery portion of the vibration member 100 and the second supporting part 330 of the supporting member 300 to surround the first coupling member 210. For example, the second coupling member 230 may be disposed outward (or an outer portion) from the first coupling member 210. The second coupling member 230 may be configured to have hardness which is greater than that of the first coupling member 210, for example, a modulus (or a Young's modulus). For example, the second coupling member 230 may include a double-sided polyolefin tape, a double-sided polyolefin foam tape, a double-sided acrylic tape, or a double-sided acrylic foam tape, or the like, but embodiments of the present disclosure are not limited thereto.

The coupling member 200 according to another embodiment of the present disclosure may absorb a sound which is generated and input based on a vibration of the vibration member 100 by the first coupling member 210 which is relatively soft and is disposed inward from the second coupling member 230 which is relatively stiff (or harder), and thus, a reflected sound (or a reflected wave) generated by being reflected from the coupling member 200 may be minimized. Accordingly, each of a highest sound pressure level and a lowest sound pressure level generated in a reproduction frequency band of a sound generated based on a vibration of the vibration member 100 may be reduced, and thus, flatness of a sound pressure level may be reduced.

In the coupling member 200 according to another embodiment of the present disclosure, the second coupling member 230 which is relatively stiff may be disposed inward from the first coupling member 210 which is relatively soft. Accordingly, a sound pressure level in a specific pitched sound band of a sound may be reduced. For example, a sound pressure level in a pitched sound band of 2 kHz to 5 kHz and 7 kHz to 12 kHz may be reduced due to a reflected sound (or a reflected wave) generated by being reflected from the second coupling member 230 which is relatively stiff. Therefore, when a reduction in a sound pressure level in a pitched sound band of 2 kHz to 5 kHz and 7 kHz to 12 kHz is needed based on a shape and a size of the vibration member 100, the second coupling member 230 which is relatively stiff may be disposed inward from the first coupling member 210 which is relatively soft, and thus, flatness of a sound pressure level may be improved based on a reduction in a sound pressure level in a pitched sound band of 2 kHz to 5 kHz and 7 kHz to 12 kHz generated by the second coupling member 230.

The one or more vibration devices 500 may be configured to vibrate the vibration member 100. The one or more vibration devices 500 may be disposed or configured at the vibration member 100. The one or more vibration devices 500 may be configured to vibrate (or displace or drive) based on a driving signal (or an electrical signal or a voice signal) applied thereto to vibrate (or displace) the vibration member 100. For example, the one or more vibration devices 500 may be an active vibration member, a vibration generator, a vibration structure, a vibrator, a vibration generating device, a sound generator, a sound device, a sound element, a sound generating structure, or a sound generating device, but embodiments of the present disclosure are not limited thereto.

The one or more vibration devices 500 according to an embodiment of the present disclosure may include a piezoelectric material or an electroactive material which have a piezoelectric characteristic. The one or more vibration devices 500 may autonomously vibrate (or displace) based on a vibration (or displacement) of the piezoelectric material based on a driving signal applied to the piezoelectric material, or may vibrate (or displace) the vibration member 100 or the like. For example, the one or more vibration devices 500 may alternately repeat contraction and/or expansion based on a piezoelectric effect (or a piezoelectric characteristic) to vibrate (or displace or drive). For example, the one or more vibration devices 500 may vibrate (or displace or drive) in a vertical direction (or a thickness direction) Z as contraction and/or expansion are alternately repeated by an inverse piezoelectric effect.

The one or more vibration devices 500 according to an embodiment of the present disclosure may include a tetragonal shape which has a first length parallel to the first direction X and a second length parallel to the second direction Y. For example, the one or more vibration devices 500 may include a square shape where the first length is the same as the second length, but embodiments of the present disclosure are not limited thereto.

The one or more vibration devices 500 according to an embodiment of the present disclosure may be connected or coupled to the vibration member 100 by a connection member 400. For example, the one or more vibration devices 500 may be connected to or supported by the first surface **100*a* of the vibration member 100 by the connection member 400, but embodiments of the present disclosure are not limited thereto. For example, the connection member 400** may be a first connection member, an adhesive member, or a first adhesive member, but embodiments of the present disclosure are not limited thereto.

The connection member 400 may be disposed between the vibration device 500 and the vibration member 100 and may connect or couple the vibration device 500 to the vibration member 100. For example, the vibration device 500 may be connected or coupled to the first surface **100*a* of the vibration member 100 by the connection member 400, and thus, may be supported by or disposed at the first surface 100*a* of the vibration member 100**.

The connection member 400 according to an embodiment of the present disclosure may include an adhesive layer (or a tacky layer) which is good in attaching force or adhesive force. For example, the connection member 400 may be configured as a material including an adhesive layer which is good in attaching force or adhesive force, with respect to each of the vibration device 500 and the first surface **100*a* of the vibration member 100. For example, the connection member 400 may include a foam pad, a double-sided tape, a double-sided foam pad, a double-sided foam tape, an adhesive, a double-sided adhesive tape, a double-sided adhesive foam tape, or a tacky sheet, or the like, but embodiments of the present disclosure are not limited thereto. For example, when the connection member 400 includes the tacky sheet (or the tacky layer), the connection member 400** may include only an adhesive layer or a tacky layer without a base member such as a plastic material or the like.

The adhesive layer (or a tacky layer) of the connection member 400 according to an embodiment of the present disclosure may include epoxy, acrylic, silicone, or urethane, but embodiments of the present disclosure are not limited thereto. The adhesive layer (or a tacky layer) of the connection member 400 according to another embodiment of the present disclosure may include a pressure sensitive adhesive (PSA), an optically clear adhesive (OCA), or an optically clear resin (OCR), but embodiments of the present disclosure are not limited thereto. For example, the adhesive layer of the connection member 400 may include an acrylic-based a substance (or a material) having a characteristic where an adhesive force is relatively better and hardness is higher than the urethane material. Accordingly, a vibration of the vibration device 500 may be transferred to the vibration member 100 well.

The apparatus 1 or the supporting member 300 according to an embodiment of the present disclosure may further include a plurality of holes 350.

The plurality of holes 350 may be configured for decreasing an internal air pressure of the apparatus 1. For example, the plurality of holes 350 may be configured for reducing an air pressure of the internal space 300S of the apparatus 1 or an air pressure of the internal space 300S provided between the vibration member 100 and the supporting member 300. For example, the plurality of holes 350 may be configured at a certain region or a partial region of the first supporting part 310 of the supporting member 300. The plurality of holes 350 may be formed to pass through or vertically pass through the first supporting part 310 along the third direction Z or a thickness direction of the supporting member 300.

Therefore, the internal space 300S of the apparatus 1 or the internal space 300S provided between the vibration member 100 and the supporting member 300 may be connected or communicate with the outside by the plurality of holes 350, and thus, an air pressure of the internal space 300S of the apparatus 1 or an air pressure of the internal space 300S provided between the vibration member 100 and the supporting member 300 may be reduced. For example, when the supporting member 300 is a housing, the internal space 300S surrounded by the vibration member 100 and the housing may be connected to or communicate with an external space of the housing through or via or by the plurality of holes 350.

The plurality of holes 350 according to an embodiment of the present disclosure, as illustrated in FIG. 3, may be configured at the first supporting part 310 of the supporting member 300 to have certain intervals D1 and D2, but embodiments of the present disclosure are not limited thereto.

The plurality of holes 350 may be configured to have the certain intervals (or distances) D1 and D2 along each of the first direction X and the second direction Y. The plurality of holes 350 may be configured to have a first interval D1 along the first direction X and have a second interval D2 along the second direction Y. The first interval D1 and the second interval D2 may each be a shortest distance or a distance between center portions of two adjacent holes 350. For example, the first interval D1 may be the same as the second interval D2, but embodiments of the present disclosure are not limited thereto.

The plurality of holes 350 may be configured to correspond to a size of the vibration device 500. For example, the plurality of holes 350 may be configured at a region, overlapping the vibration device 500, of an entire region of the first supporting part 310. Each of the plurality of holes 350 may overlap the vibration device 500. Outermost holes of the plurality of holes 350 may overlap an end of the vibration device 500, but embodiments of the present disclosure are not limited thereto. For example, a hole region HA of the first supporting part 310 where the plurality of holes 350 are configured may overlap the vibration device 500 and may have a size which is smaller than that of the vibration device 500. For example, the hole region HA may be a hole arrangement region, an air duct region, an air duct portion, an air entrance region, an air pressure control region, or a vent region (or a vent area), but embodiments of the present disclosure are not limited thereto.

A size (or a diameter) of each of the plurality of holes 350 may be smaller than that of the first interval D1 or the second interval D2. The size (or diameter) of each of the plurality of holes 350 may be smaller than or equal to half of the first interval D1 or the second interval D2, but embodiments of the present disclosure are not limited thereto and may be changed based on a size of the vibration device 500.

According to an embodiment of the present disclosure, each of the plurality of holes 350 may have the same size. For example, in the hole region HA of the first supporting part 310, the number and density of holes 350 per unit area may be equal.

According to another embodiment of the present disclosure, one or more of the plurality of holes 350 may have different sizes (or diameters), or may have different intervals D1 and D2. For example, one or more of the number and density of holes 350 per unit area configured at the hole region HA of the first supporting part 310 may differ. For example, one or more of the number and density of holes 350 per unit area may be configured to be changed toward a periphery portion of the hole region HA from a center portion of the hole region HA. For example, one or more of the number and density of holes 350 per unit area may be configured to decrease or increase toward the periphery portion of the hole region HA from the center portion of the hole region HA.

According to an embodiment of the present disclosure, the hole region HA may include a center region CA, a plurality of corner regions CA1 to CA4, and a middle region MA.

The center region (or a first hole region) CA may overlap a center region of the vibration device 500. For example, with respect to the third direction Z, a center portion or a central portion of the center region CA may be disposed or aligned at a center portion of the vibration device 500. For example, the center region CA may have a tetragonal shape or a lozenge shape including a center portion or a central portion of the hole region HA. One or more holes, disposed at the center region CA, of the plurality of holes 350 configured at the hole region HA may contribute to increase or enhance a sound pressure level of a high-pitched sound band. The one or more holes disposed at the center region CA may contribute to increase or enhance a sound pressure level in about 2 kHz to about 2.6 kHz or more.

The plurality of corner regions (or a plurality of second hole regions) CA1 to CA4 may respectively overlap a plurality of corner regions of the vibration device 500. For example, with respect to the third direction Z, the center portion of the center region CA may be disposed or aligned at the center portion of the vibration device 500. For example, the plurality of corner regions CA1 to CA4 may have a triangular shape or a right-triangular shape including each corner of the hole region HA. One or more holes, disposed at each of the plurality of corner regions CA1 to CA4, of the plurality of holes 350 configured at the hole region HA may contribute to decrease or improve a dip phenomenon of a sound (or a sound pressure level) generated in a low-pitched sound band. For example, the one or more holes disposed at each of the plurality of corner regions CA1 to CA4 may increase or enhance a sound pressure level in about 110 Hz to about 230 Hz, and thus, may contribute to decrease or improve a dip phenomenon of a sound (or a sound pressure level) generated in about 110 Hz to about 230 Hz.

The middle region (or a third hole region) MA may be configured at a region between the center region CA and each of the plurality of corner regions CA1 to CA4 and may overlap a region between a center region and each of a plurality of corner regions of the vibration device 500. For example, the middle region MA may have a tetragonal ring shape or a lozenge ring shape including the other region except the center region CA of the hole region HA and the plurality of corner regions CA1 to CA4, but embodiments of the present disclosure are not limited thereto. One or more holes, disposed at the middle region MA, of the plurality of holes 350 configured at the hole region HA may contribute to decrease a peak phenomenon of a sound (or a sound pressure level) generated in a middle-pitched sound band to improve a flatness of a sound pressure level in the middle-pitched sound band. For example, the one or more holes disposed at the middle region MA may reduce a sound pressure level in about 1 kHz to about 3 kHz or about 1.7 kHz to about 2.7 kHz, and thus, may decrease a peak phenomenon of a sound (or a sound pressure level) generated in about 1 kHz to about 3 kHz or about 1.7 kHz to about 2.7 kHz, thereby contributing to improve the flatness of a sound pressure level.

According to an embodiment of the present disclosure, the plurality of holes 350 may communicate (or connect) the internal space 300S of the apparatus 1 with an external space to reduce an air pressure of the internal space 300S, and thus, may increase or expand a band of a low-pitched sound band of a sound generated based on a vibration of the vibration member 100, thereby improving a sound characteristic and/or a sound pressure level characteristic of the low-pitched sound band. For example, an air pressure (or pressure) of the internal space 300S of the apparatus 1 may be reduced by the plurality of holes 350, and thus, the amount of displacement (or a bending force) of the vibration member 100 or the vibration device 500 may increase, and thus, a band of the low-pitched sound band may increase or be expanded, thereby enhancing a sound characteristic and/or a sound pressure level characteristic of the low-pitched sound band.

According to another embodiment of the present disclosure, in an apparatus including a closed internal space 300S where the hole 350 is not configured at the supporting member 300, a largest variation of pressure may occur in the internal space 300S where a volume variation is largest, based on a vibration of the vibration member 100 (or the vibration device 500), and thus, the amount of displacement (or a bending force) of the vibration member 100 (or the vibration device 500) may decrease, whereby a sound characteristic and/or a sound pressure level characteristic of the low-pitched sound band may decrease or be reduced. For example, in the apparatus including the closed internal space 300S, a pressure (or an air pressure) of the internal space 300S may increase based on a sound wave or a sound generated by a vibration of the vibration member 100 (or the vibration device 500), and thus, the amount of displacement (or a bending force) of the vibration member 100 (or the vibration device 500) may decrease, whereby a sound characteristic and/or a sound pressure level characteristic of the low-pitched sound band may decrease or be reduced.

The apparatus 1 according to an embodiment of the present disclosure may include an open internal space 300S where the plurality of holes 350 is configured at the supporting member 300, and thus, a sound wave or a sound generated in the internal space 300S by a vibration of the vibration member 100 (or the vibration device 500) may be discharged (or emitted) to the outside through the plurality of holes 350, whereby a pressure (or an air pressure) of the internal space 300S may be lowered. For example, the air of the internal space 300S may be discharged (or emitted) to the outside through the plurality of holes 350, based on a vibration of the vibration member 100 (or the vibration device 500), and thus, a pressure (or an air pressure) of the internal space 300S may be lowered. Therefore, because the apparatus 1 according to an embodiment of the present disclosure includes the open internal space 300S based on the plurality of holes 350, a band of the low-pitched sound band may increase or be expanded, a sound characteristic and/or a sound pressure level characteristic of the low-pitched sound band may be improved, and a sound generated based on a vibration of the vibration member 100 (or the vibration device 500) may be output in a forward direction SOD1 of the vibration member 100 and a rearward direction SOD2 of the supporting member 300. Accordingly, the apparatus 1 according to an embodiment of the present disclosure may output a sound, where a band of the low-pitched sound band may increase or expand and a sound characteristic and/or a sound pressure level characteristic of the low-pitched sound band are/is improved, in both directions SOD1 and SOD2, thereby implementing a sound output apparatus for outputting a sound in both directions (or forward and rearward direction).

FIGS. 4 to 11 illustrate an arrangement structure of the holes according to another embodiment of the present disclosure. FIGS. 4 to 11 illustrate an embodiment implemented by modifying an arrangement structure of the holes illustrated in FIGS. 2 and 3.

Figure 4:
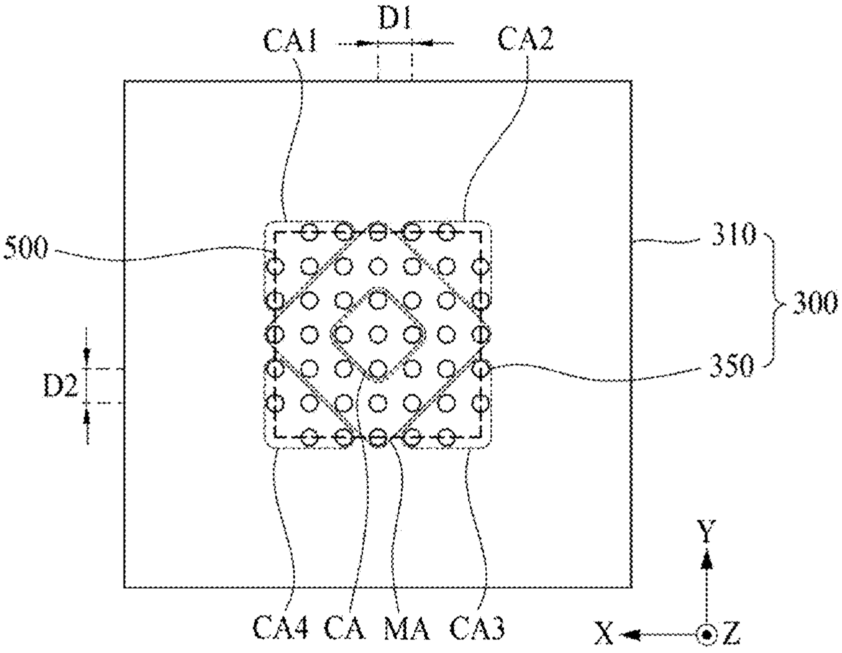
FIG. 4 illustrates an arrangement structure of a hole according to another embodiment of the present disclosure.

With reference to FIGS. 2 and 4, a plurality of holes 350 according to another embodiment of the present disclosure may be configured to have a first interval D1 along a first direction X and have a second interval D2 along a second direction Y at the other region, except a corner, of the hole region HA of the first supporting part 310. For example, the plurality of holes 350 may be disposed at a center region CA, a middle region MA, and a plurality of corner regions CA1 to CA4 of the hole region HA of the first supporting part 310 and may not be disposed at corners of each of the plurality of corner regions CA1 to CA4 of the hole region HA. The plurality of holes 350 may be disposed at the hole region HA of the first supporting part 310 not to overlap each corner of the vibration device 500. According to an embodiment of the present disclosure, when an arrangement structure of the plurality of holes 350 illustrated in FIG. 3 is a first structure (or a first hole arrangement structure), a second structure (or a second hole arrangement structure) illustrated in FIG. 4 may be a structure where holes 350 overlapping each corner of the vibration device 500 are removed or omitted in the first structure. According to the second structure according to an embodiment of the present disclosure, a sound pressure level of a sound of a high-pitched sound band may increase or be enhanced, a peak phenomenon of a sound of a middle-pitched sound band may be reduced, and thus, a flatness of a sound pressure level may be improved, and a peak phenomenon of a sound of a low-pitched sound band may be reduced or improved.

Figure 5:
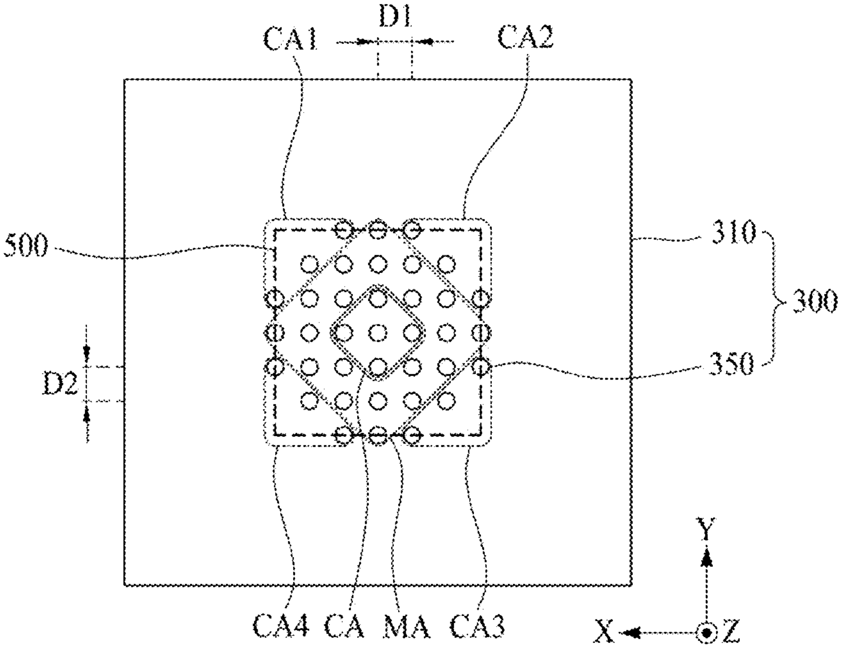
FIG. 5 illustrates an arrangement structure of a hole according to another embodiment of the present disclosure.

With reference to FIGS. 2 and 5, a plurality of holes 350 according to another embodiment of the present disclosure may be configured to have a first interval D1 along a first direction X and have a second interval D2 along a second direction Y at the other region, except a portion of each of a plurality of corner regions CA1 to CA4, of the hole region HA of the first supporting part 310. For example, the plurality of holes 350 may be disposed at a center region CA, a middle region MA, and the plurality of corner regions CA1 to CA4 of the hole region HA of the first supporting part 310 and may not be disposed at corners of each of the plurality of corner regions CA1 to CA4 and a region adjacent to each of the corners of the hole region HA. The plurality of holes 350 may be disposed at the hole region HA of the first supporting part 310 not to overlap each corner of the vibration device 500 and a region adjacent to each of the corners. According to an embodiment of the present disclosure, a third structure (or a third hole arrangement structure) illustrated in FIG. 5 may be a structure where holes 350 overlapping each corner of the vibration device 500 and a region adjacent to each of the corners are removed or omitted in the first structure illustrated in FIG. 3. According to the third structure according to an embodiment of the present disclosure, a sound pressure level of a sound of a high-pitched sound band may increase or be enhanced, a peak phenomenon of a sound of a middle-pitched sound band may be reduced, and thus, a flatness of a sound pressure level may be improved, and a peak phenomenon of a sound of a low-pitched sound band may be reduced or improved.

Figure 6:
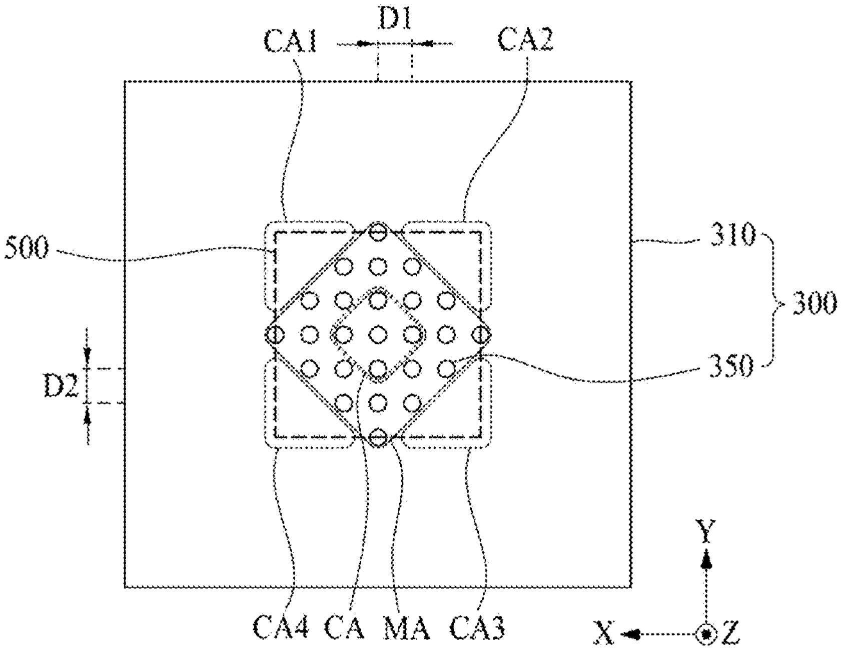
FIG. 6 illustrates an arrangement structure of a hole according to another embodiment of the present disclosure.

With reference to FIGS. 2 and 6, a plurality of holes 350 according to another embodiment of the present disclosure may be configured to have a first interval D1 along a first direction X and have a second interval D2 along a second direction Y at the other region, except each of a plurality of corner regions CA1 to CA4, of the hole region HA of the first supporting part 310. For example, the plurality of holes 350 may be disposed at a center region CA and a middle region MA of the hole region HA of the first supporting part 310 and may not be disposed at each of the plurality of corner regions CA1 to CA4 of the hole region HA. The plurality of holes 350 may be disposed at the hole region HA of the first supporting part 310 not to overlap each corner regions of the vibration device 500. According to an embodiment of the present disclosure, a fourth structure (or a fourth hole arrangement structure) illustrated in FIG. 6 may be a structure where holes 350 overlapping each of the corner regions of the vibration device 500 are removed or omitted in the first structure illustrated in FIG. 3. According to the fourth structure according to an embodiment of the present disclosure, a sound pressure level of a sound of a high-pitched sound band may increase or be enhanced, a peak phenomenon of a sound of a middle-pitched sound band may be reduced to improve a flatness of a sound pressure level.

Figure 7:
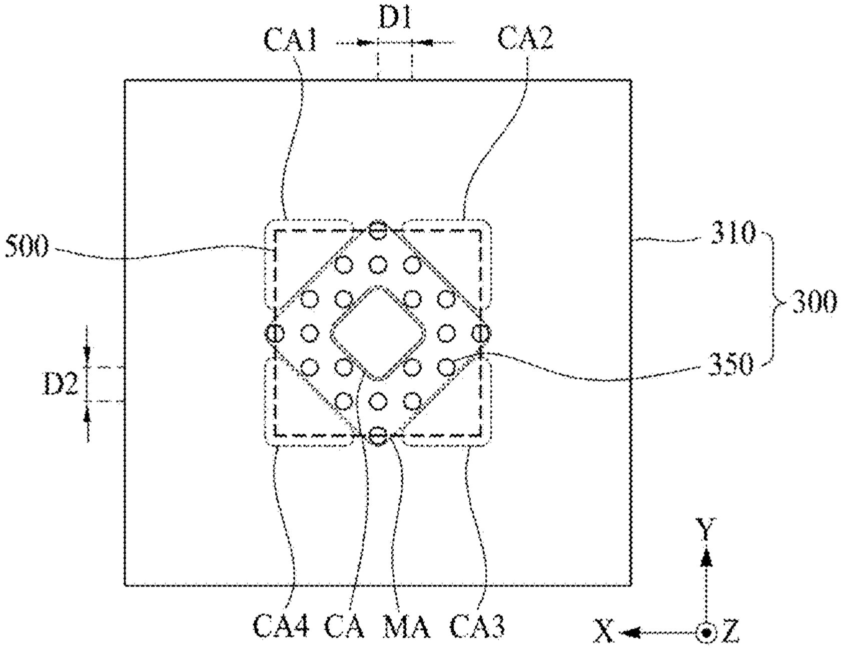
FIG. 7 illustrates an arrangement structure of a hole according to another embodiment of the present disclosure.

With reference to FIGS. 2 and 7, a plurality of holes 350 according to another embodiment of the present disclosure may be configured to have a first interval D1 along a first direction X and have a second interval D2 along a second direction Y at the middle region MA, except a center region CA and a plurality of corner regions CA1 to CA4, of the hole region HA of the first supporting part 310. For example, the plurality of holes 350 may be disposed at only the middle region MA of the hole region HA of the first supporting part 310 and may not be disposed at the center region CA and the plurality of corner regions CA1 to CA4 of the hole region HA. The plurality of holes 350 may be disposed at the hole region HA of the first supporting part 310 not to overlap a center region and each corner region of the vibration device 500. According to an embodiment of the present disclosure, a fifth structure (or a fifth hole arrangement structure) illustrated in FIG. 7 may be a structure where holes 350 overlapping the center region and each of the plurality of corner regions of the vibration device 500 are removed or omitted in the first structure illustrated in FIG. 3. According to the fifth structure according to an embodiment of the present disclosure, a peak phenomenon of a sound of a middle-pitched sound band may be reduced, and thus, a flatness of a sound pressure level may be improved.

Figure 8:
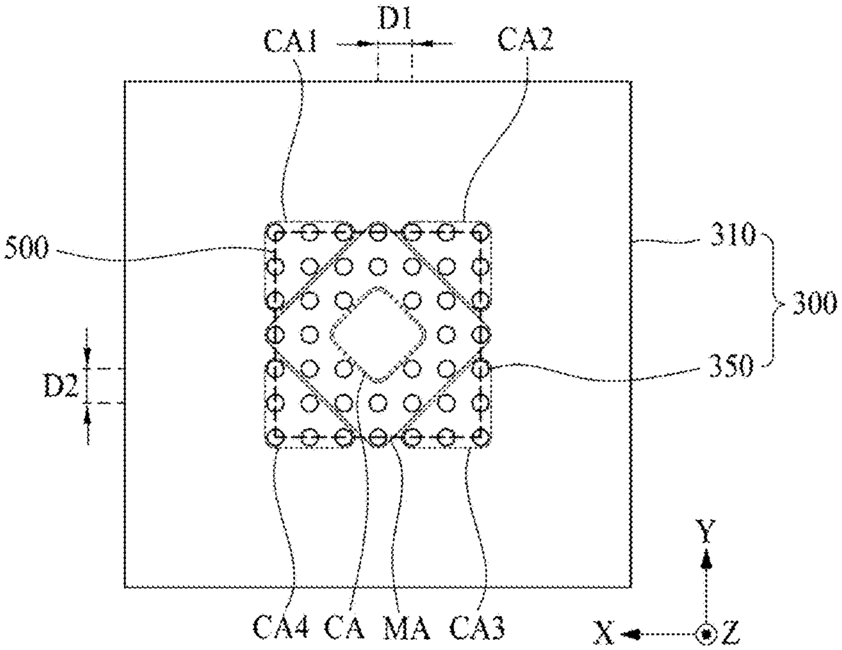
FIG. 8 illustrates an arrangement structure of a hole according to another embodiment of the present disclosure.

With reference to FIGS. 2 and 8, a plurality of holes 350 according to another embodiment of the present disclosure may be configured to have a first interval D1 along a first direction X and have a second interval D2 along a second direction Y at a plurality of corner regions CA1 to CA4 and a middle region MA, except a center region CA, of the hole region HA of the first supporting part 310. For example, the plurality of holes 350 may be disposed at the middle region MA and each of the plurality of corner regions CA1 to CA4 of the hole region HA of the first supporting part 310 and may not be disposed at the center region CA of the hole region HA. The plurality of holes 350 may be disposed at the hole region HA of the first supporting part 310 not to overlap a center region of the vibration device 500. A sixth structure (or a sixth hole arrangement structure) illustrated in FIG. 8 may be a structure where holes 350 overlapping the center region of the vibration device 500 are removed or omitted in the first structure illustrated in FIG. 3. According to the sixth structure according to an embodiment of the present disclosure, a peak phenomenon of a sound of a middle-pitched sound band may be reduced, and thus, a flatness of a sound pressure level may be improved, and a peak phenomenon of a sound of a low-pitched sound band may be reduced or improved.

Figure 9:
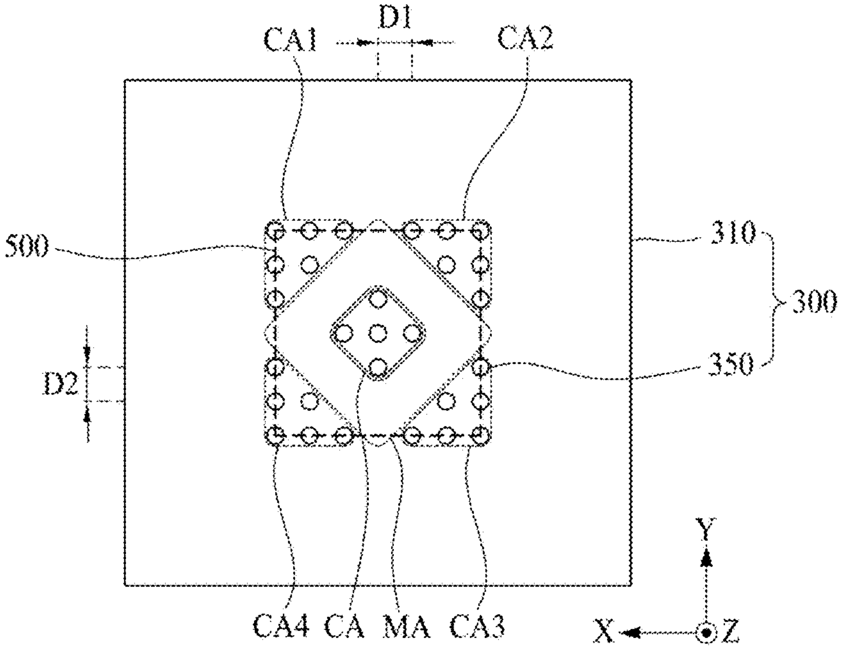
FIG. 9 illustrates an arrangement structure of a hole according to another embodiment of the present disclosure.

With reference to FIGS. 2 and 9, a plurality of holes 350 according to another embodiment of the present disclosure may be configured to have a first interval D1 along a first direction X and have a second interval D2 along a second direction Y at a plurality of corner regions CA1 to CA4 and a center region CA, except a middle region MA, of the hole region HA of the first supporting part 310. For example, the plurality of holes 350 may be disposed at the center region CA and each of the plurality of corner regions CA1 to CA4 of the hole region HA of the first supporting part 310 and may not be disposed at the middle region MA of the hole region HA. The plurality of holes 350 may be disposed at the hole region HA of the first supporting part 310 not to overlap a middle region of the vibration device 500. According to an embodiment of the present disclosure, a seventh structure (or a seventh hole arrangement structure) illustrated in FIG. 9 may be a structure where holes 350 overlapping the middle region of the vibration device 500 are removed or omitted in the first structure illustrated in FIG. 3. According to the seventh structure according to an embodiment of the present disclosure, a sound pressure level of a sound of a high-pitched sound band may increase or be enhanced and a peak phenomenon of a sound of a low-pitched sound band may be reduced or improved.

Figure 10:
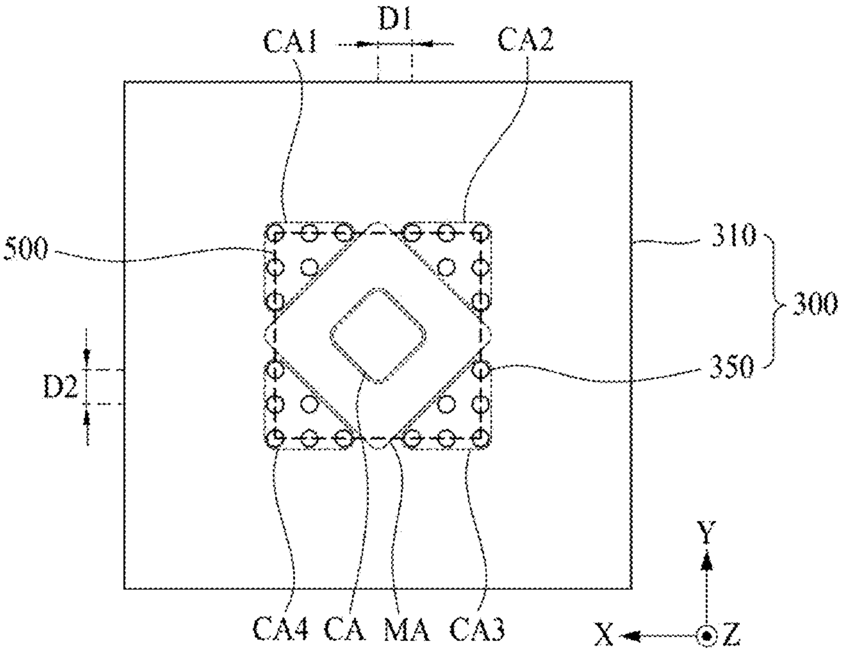
FIG. 10 illustrates an arrangement structure of a hole according to another embodiment of the present disclosure.

With reference to FIGS. 2 and 10, a plurality of holes 350 according to another embodiment of the present disclosure may be configured to have a first interval D1 along a first direction X and have a second interval D2 along a second direction Y at a plurality of corner regions CA1 to CA4, except a center region CA and a middle region MA, of the hole region HA of the first supporting part 310. For example, the plurality of holes 350 may be disposed at each of the plurality of corner regions CA1 to CA4 of the hole region HA of the first supporting part 310 and may not be disposed at the center region CA and the middle region MA of the hole region HA. The plurality of holes 350 may be disposed at the hole region HA of the first supporting part 310 not to overlap a center region and a middle region of the vibration device 500. According to an embodiment of the present disclosure, an eighth structure (or an eighth hole arrangement structure) illustrated in FIG. 10 may be a structure where holes 350 overlapping each of the center region and the middle region of the vibration device 500 are removed or omitted in the first structure illustrated in FIG. 3. According to the eighth structure according to an embodiment of the present disclosure, a peak phenomenon of a sound of a low-pitched sound band may be reduced or improved.

Figure 11:
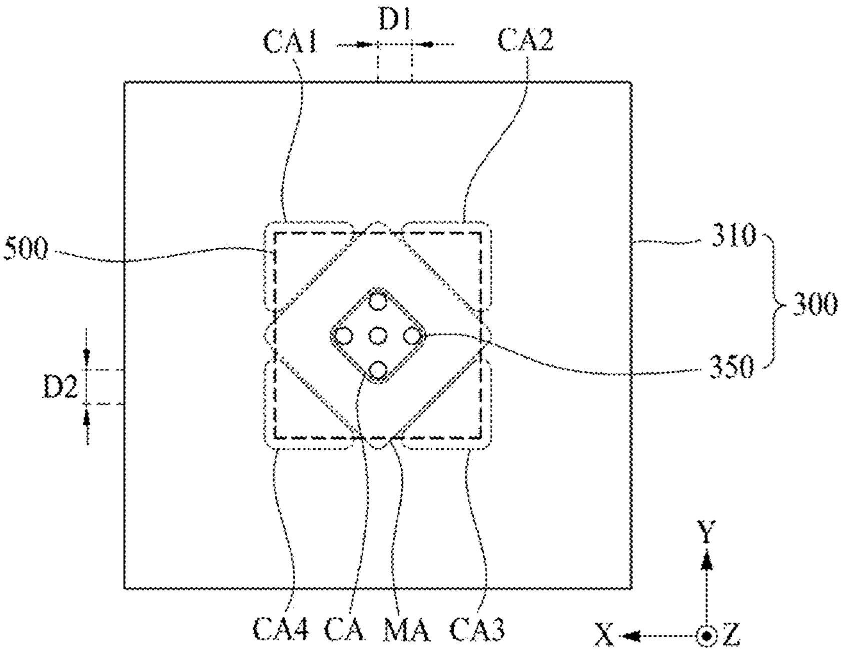
FIG. 11 illustrates an arrangement structure of a hole according to another embodiment of the present disclosure.

With reference to FIGS. 2 and 11, a plurality of holes 350 according to another embodiment of the present disclosure may be configured to have a first interval D1 along a first direction X and have a second interval D2 along a second direction Y at the center region CA, except a middle region MA and a plurality of corner regions CA1 to CA4, of the hole region HA of the first supporting part 310. For example, the plurality of holes 350 may be disposed at the center region CA of the hole region HA of the first supporting part 310 and may not be disposed at the middle region MA and each of the plurality of corner regions CA1 to CA4 of the hole region HA. The plurality of holes 350 may be disposed at the hole region HA of the first supporting part 310 not to overlap a middle region and each corner regions of the vibration device 500. According to an embodiment of the present disclosure, a ninth structure (or a ninth hole arrangement structure) illustrated in FIG. 11 may be a structure where holes 350 overlapping the middle region and each corner regions of the vibration device 500 are removed or omitted in the first structure illustrated in FIG. 3. According to the ninth structure according to an embodiment of the present disclosure, a sound pressure level of a sound of a high-pitched sound band may increase or be enhanced.

As described above, one or more of the first to ninth structures described above with reference to FIGS. 3 to 11 may be applied to the supporting member 300, based on one or more of a reproduction band, a sound characteristic, and a sound pressure level characteristic needed for a sound output from the apparatus 1 according to an embodiment of the present disclosure.

Figure 12A:
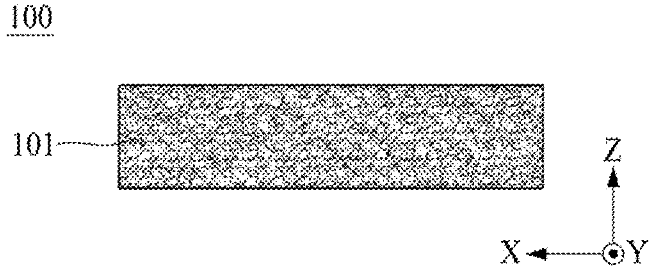
FIG. 12A is a cross-sectional view illustrating a vibration member according to an embodiment of the present disclosure.
Figure 12B:
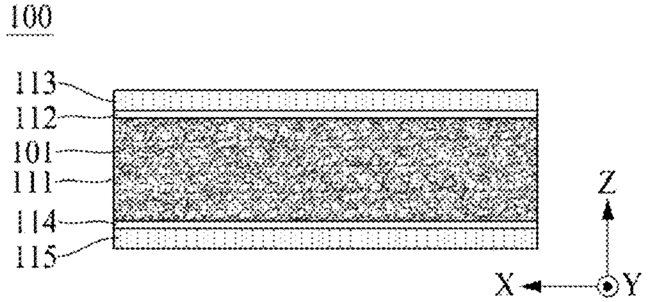
FIG. 12B is a cross-sectional view illustrating a vibration member according to another embodiment of the present disclosure.

FIGS. 12A and 12B are a cross-sectional view illustrating a vibration member according to another embodiment of the present disclosure. FIGS. 12A and 12B illustrate another embodiment of the vibration member illustrated in FIGS. 1 and 2.

With reference to FIGS. 1, 2, and 12A, a vibration member 100 according to another embodiment of the present disclosure may include a material (or a substance) which is relatively lightweight and is relatively large in amount of displacement (or bending force), so that the vibration member 100 easily vibrates (or displaces or drives) based on a vibration (or displacement or driving) of a vibration device 500 which is relatively small. For example, the vibration member 100 may include a material (or a substance) which is low in density and high in elastic force. For example, the vibration member 100 may include a material (or a substance) which is high in stiffness, has low elasticity, and does not well stretch.

The vibration member 100 according to another embodiment of the present disclosure may include a porous pattern (or a foam pattern) 101. The vibration member 100 may include a plastic material including the porous pattern 101. The porous pattern 101 may be a bubble, a micro bubble, or a foam, but embodiments of the present disclosure are not limited thereto. The vibration member 100 may be configured as a micro foamable and rollable plastic material. For example, the vibration member 100 may include a porous plastic material or a micro cellular plastic material. For example, the vibration member 100 may be configured as a polyethylene terephthalate (PET) material or a polycarbonate (PC) material. For example, the vibration member 100 may be configured as a Micro Cellular polyethylene terephthalate (MCPET) material. The vibration member 100 configured the MCPET may have capability to reproduce a high original sound because having a low density and an excellent elastic force and may have a heat resistance and a moisture resistance, and thus, the dissipation or delay of a sound caused by the elapse of a vibration time may be very small, thereby enhancing the quality of a sound. The vibration member 100 configured the MCPET may be relatively lightweight compared to a vibration member configured a metal material, and thus, may be easily displaced (or bent) by a vibration of the vibration device 500 which is relatively insufficient in displacement (or bending force).

The vibration member 100 according to another embodiment of the present disclosure may have the relatively large amount of displacement (or bending force) with respect to a vibration (or displacement) of the vibration device 500, based on the porous pattern 101, and thus, a sound characteristic and/or a sound pressure level characteristic of a low-pitched sound band may be improved. For example, the vibration member 100 according to another embodiment of the present disclosure may be reduced in dip phenomenon and peak phenomenon in a sound of the low-pitched sound band and may increase in sound pressure level of the low-pitched sound band. For example, in the vibration member 100 according to another embodiment of the present disclosure, the number of dip portions and peak portions of a sound pressure level may decrease in about 1 kHz or less, and a sound pressure level may increase in about 50 Hz to about 70 Hz, thereby outputting a sound of a reproduction band of a woofer.

The vibration member 100 according to another embodiment of the present disclosure may have a thickness of about 0.1 mm to about 1 mm. For example, a peak portion of a sound generated based on a vibration of the vibration member 100 may move to a low-pitched sound band region as a thickness of the vibration member 100 is progressively reduced. Accordingly, the vibration member 100 may have a thickness of about 0.1 mm to about 1 mm, based on a reproduction band, a sound characteristic, and a sound pressure level characteristic needed for a sound output from the apparatus 1 according to an embodiment of the present disclosure. For example, in a case where the apparatus 1 according to an embodiment of the present disclosure outputs a sound including a reproduction band of a woofer speaker, the vibration member 100 may have a relatively thin thickness, and for example, may have a thickness of about 0.1 mm to about 0.5 mm. For example, in a case where the apparatus 1 according to an embodiment of the present disclosure implements a woofer speaker, the vibration member 100 may have a relatively thick thickness, and for example, may have a thickness of about 0.5 mm to about 1 mm.

With reference to FIGS. 1, 2, and 12B, a vibration member 100 according to another embodiment of the present disclosure may include a base member 111, a first surface member 113, and a second surface member 115.

The base member 111 may include a porous pattern (or a foam pattern) 101. The base member 111 may include a plastic material including the porous pattern 101. For example, the base member 111 may be substantially the same as the vibration member 100 described above with reference to FIG. 12A, and thus, the repetitive description thereof may be omitted.

The first surface member 113 may be connected or coupled to a first surface (or a front surface) of the base member 111. The first surface member 113 may be attached on or coupled to a first surface of the base member 111 by a first adhesive member 112. The first surface member 113 may have a thickness which is relatively thinner than the base member 111. For example, the first surface member 113 may be a first plate, an upper plate, a top plate, a front plate, a first front layer, a top layer, or an upper layer.

The first surface member 113 according to an embodiment of the present disclosure may include a metal material or a nonmetal material (or a composite nonmetal material). The metal material of the first surface member 113 may include one or more materials of stainless steel, aluminum (Al), an Al alloy, a magnesium (Mg), a Mg alloy, and a magnesium-lithium (Mg—Li) alloy, but embodiments of the present disclosure are not limited thereto. The nonmetal material (or the composite nonmetal material) of the first surface member 113 may include one or more material (or substance) of plastic, fiber, leather, wood, cloth, rubber, carbon, glass, mirror, and paper, but embodiments of the present disclosure are not limited thereto. For example, the first surface member 113 may be configured as a material having the same stiffness as that of the base member 111, or may be configured as a material having stiffness which is smaller than that of the base member 111. For example, the first surface member 113 may be configured as the same material as that of the base member 111. For example, the base member 111 may be configured as a Micro Cellular polyethylene terephthalate (MCPET) material, and the first surface member 113 may be configured as a polyethylene terephthalate (PET) material, but embodiments of the present disclosure are not limited thereto.

The second surface member 115 may be connected or coupled to a second surface (or a rear surface) of the base member 111. The second surface member 115 may be attached on or coupled to a second surface of the base member 111 by a second adhesive member 114. The second surface member 115 may have a thickness which is relatively thinner than that of the base member 111. For example, the second surface member 115 may be a second plate, a lower plate, a bottom plate, a rear plate, a second front layer, a bottom layer, or a lower layer.

The second surface member 115 according to an embodiment of the present disclosure may include a metal material or a nonmetal material (or a composite nonmetal material). For example, the second surface member 115 may be configured as the same material as or a different material from the first surface member 113 of the metal material or the nonmetal material (or the composite nonmetal material). For example, the second surface member 115 may be configured as a material having the same stiffness as that of the base member 111, or may be configured as a material having stiffness which is smaller than that of the base member 111. For example, the second surface member 115 may be configured as the same material as that of the base member 111.

According to an embodiment of the present disclosure, each of the first surface member 113 and the second surface member 115 may be configured as the material having stiffness which is smaller than or equal to that of the base member 111, and thus, a sound characteristic and/or a sound pressure level characteristic of a low-pitched sound band generated based on a vibration of the vibration member 100 may be enhanced. For example, when each of the first surface member 113 and the second surface member 115 is configured as a material having stiffness which is greater than that of the base member 111, the stiffness of the vibration member 100 may increase, and thus, a sound characteristic and/or a sound pressure level characteristic of the low-pitched sound band may be enhanced.

Each of the first adhesive member 112 and the second adhesive member 114 may include an adhesive layer (or a tacky layer) which is good in attaching force or adhesive force. For example, the adhesive layer (or a tacky layer) of each of the first adhesive member 112 and the second adhesive member 114 may include epoxy, acrylic, silicone, or urethane, but embodiments of the present disclosure are not limited thereto. The adhesive layer (or a tacky layer) of each of the first adhesive member 112 and the second adhesive member 114 according to another embodiment of the present disclosure may include a pressure sensitive adhesive (PSA), an optically clear adhesive (OCA), or an optically clear resin (OCR), but embodiments of the present disclosure are not limited thereto. For example, the adhesive layer of each of the first adhesive member 112 and the second adhesive member 114 may include an acrylic-based a substance (or a material) having a characteristic where an adhesive force is relatively better and hardness is higher than the urethane material. Accordingly, a vibration of the vibration member 100 based on a vibration of the vibration device 500 may be well output without loss.

Figure 13:
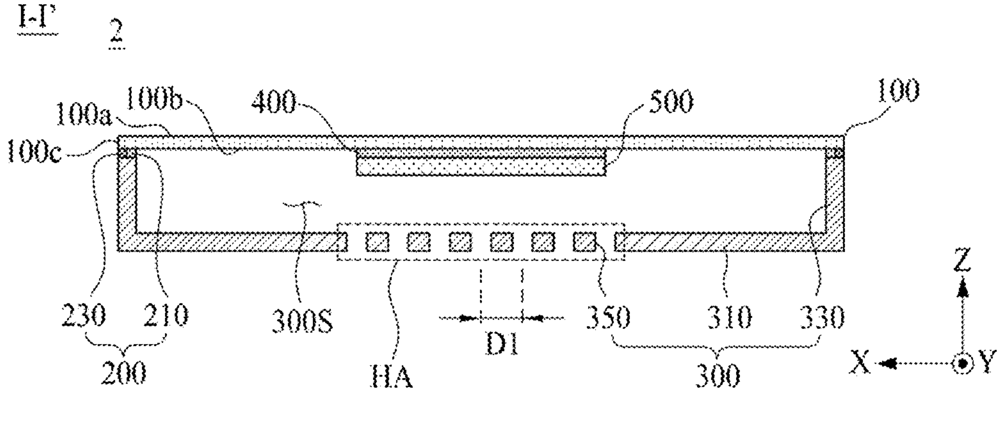
FIG. 13 is another cross-sectional view taken along line I-I' illustrated in FIG. 1 according to another embodiment of the present disclosure.

FIG. 13 is another cross-sectional view taken along line I-I' illustrated in FIG. 1. FIG. 13 illustrates an embodiment implemented by changing an arrangement position of the vibration device in the apparatus 1 described above with reference to FIGS. 1 to 12B. Therefore, in the following description, the repetitive descriptions of the same elements other than an arrangement position of the vibration device and relevant elements thereto may be omitted or will be briefly given.

With reference to FIG. 13, in an apparatus 2 according to another embodiment of the present disclosure, a vibration device 500 may be connected with or supported by a second surface 100*b* of a vibration member 100 by a connection member 400. The vibration device 500 may be disposed at an internal space 300S and may be surrounded by a supporting member 300, and thus, the vibration device 500 may be protected from an external impact.

The connection member 400 may be disposed between the vibration device 500 and the vibration member 100 and may connect or couple the vibration device 500 with the vibration member 100. For example, the vibration device 500 may be connected or coupled to the second surface 100*b* of the vibration member 100 by the connection member 400, and thus, the vibration device 500 may be supported by and disposed at the second surface 100*b* of the vibration member 100.

The apparatus 2 according to another embodiment of the present disclosure may have the same effect as that of the apparatus 1 described above with reference to FIGS. 1 to 12B and may be accommodated into the internal space 300S of the supporting member 300, and thus, the damage of the vibration device 500 caused by an external impact may be prevented.

Figure 14:
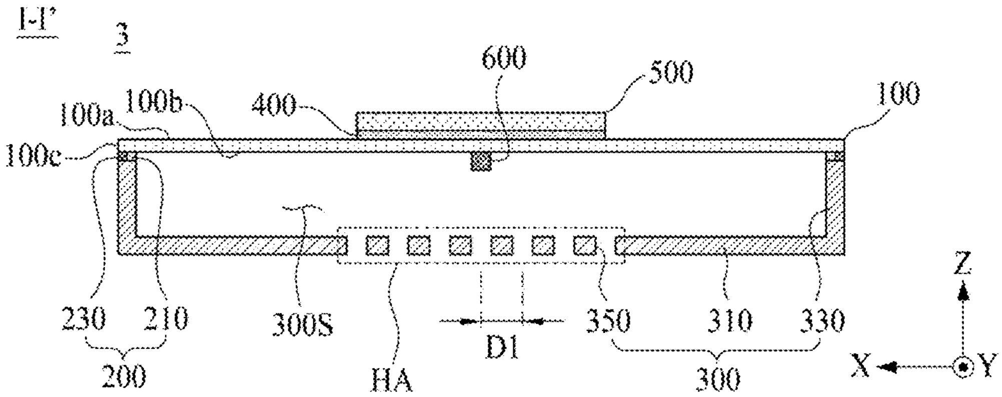
FIG. 14 is another cross-sectional view taken along line I-I' illustrated in FIG. 1 according to another embodiment of the present disclosure.

FIG. 14 is another cross-sectional view taken along line I-I' illustrated in FIG. 1 according to another embodiment of the present disclosure. FIG. 14 illustrates an embodiment where one or more weight members are added to the apparatus described above with reference to FIGS. 1 to 12B. Therefore, in the following description, the repetitive descriptions of the same elements other than the one or more weight members and relevant elements thereto may be omitted or will be briefly given.

With reference to FIG. 14, an apparatus 3 according to another embodiment of the present disclosure may include a vibration member 100, a supporting member 300, one or more vibration devices 500, and one or more weight members 600.

Each of the vibration member 100, the supporting member 300, and the one or more vibration devices 500 may be the same as described above with reference to FIGS. 1 to 12B, and thus, the repetitive description thereof may be omitted or will be briefly given.

The one or more weight members 600 may be disposed at the vibration member 100 to overlap the vibration device 500. The one or more weight members 600 may be disposed at or attached on a second surface 100*b* of the vibration member 100 between the vibration device 500 and a hole region HA of the supporting member 300. For example, the one or more weight members 600 may have a polygonal pillar shape or a circular pillar shape. For example, the one or more weight members 600 may be configured as an elastic material having stiffness which is less than a bending stiffness of the vibration device 500, but embodiments of the present disclosure are not limited thereto and the one or more weight members 600 may be configured as a weight material having a weight.

The one or more weight members 600 may increase a mass (or a weight) in a region of the vibration member 100 overlapping the vibration device 500, and thus, may reduce a lowest resonance frequency (or a lowest natural frequency) of the vibration member 100. Therefore, the vibration device 500 may vibrate at a relatively low frequency due to a lowest resonance frequency (or a lowest natural frequency) based on an increase in mass caused by the one or more weight members 600. Accordingly, a sound characteristic and/or a sound pressure level characteristic of a low-pitched sound band generated based on a vibration of the vibration device 500 may be enhanced. For example, the one or more weight members 600 may be a local mass, a point mass, a resonance pad, a weight clapper, or a mass member. For example, the low-pitched sound band may be about 300 Hz or less or about 500 Hz or less, but embodiments of the present disclosure are not limited thereto.

The one or more weight members 600 may be configured to correct a mode shape of each of a primary vibration mode and a secondary vibration mode of the vibration member 100 based on a vibration of the vibration device 500. The one or more weight members 600 may be configured to accelerate a primary peak vibration mode of the vibration member 100. For example, the one or more weight members 600 may move a primary peak of a sound (or a sound pressure level), generated based on a vibration of the vibration member 100, to a low-pitched sound band, and thus, may increase or enhance a sound characteristic and/or a sound pressure level characteristic of a low-pitched sound band and may extend a low-pitched sound band of a sound generated based on a vibration of the vibration member 100.

The apparatus 3 according to another embodiment of the present disclosure may have the same effect as that of the apparatus 1 described above with reference to FIGS. 1 to 12B and may further include the one or more weight members 600 attached on or coupled to the vibration member 100, and thus, a sound characteristic and/or a sound pressure level characteristic of a low-pitched sound band may be increased or improved and a low-pitched sound band of a sound generated based on a vibration of the vibration member 100 may be expanded.

Figure 15:
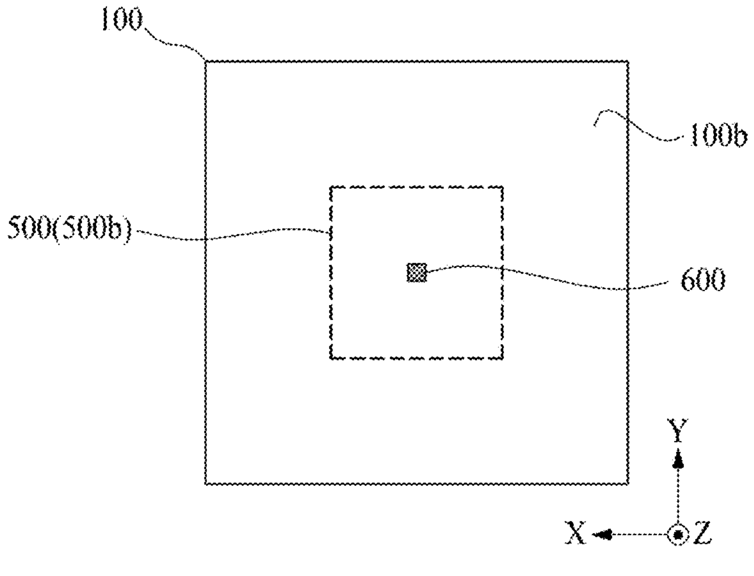
FIG. 15 illustrates an arrangement structure of one or more weight members illustrated in FIG. 14 according to another embodiment of the present disclosure.

FIG. 15 illustrates an arrangement structure of one or more weight members illustrated in FIG. 14. FIGS. 16 to 19 illustrate another arrangement structure of one or more weight members illustrated in FIG. 14.

With reference to FIGS. 14 and 15, the apparatus 3 according to another embodiment of the present disclosure may include one or more weight member 600. For example, the apparatus 3 according to another embodiment of the present disclosure may include one weight member 600. The one weight member 600 may be disposed at the vibration member 100 to overlap a center portion of the vibration device 500. For example, the one weight member 600 may be attached on or coupled to the second surface 100*b* of the vibration member 100 overlapping the center portion of the vibration device 500. The one weight member 600 may be attached on or coupled to the second surface 100*b* of the vibration member 100 overlapping the center portion of the vibration device 500, so as to accelerate a primary peak vibration mode of the vibration member 100.

Figure 16:
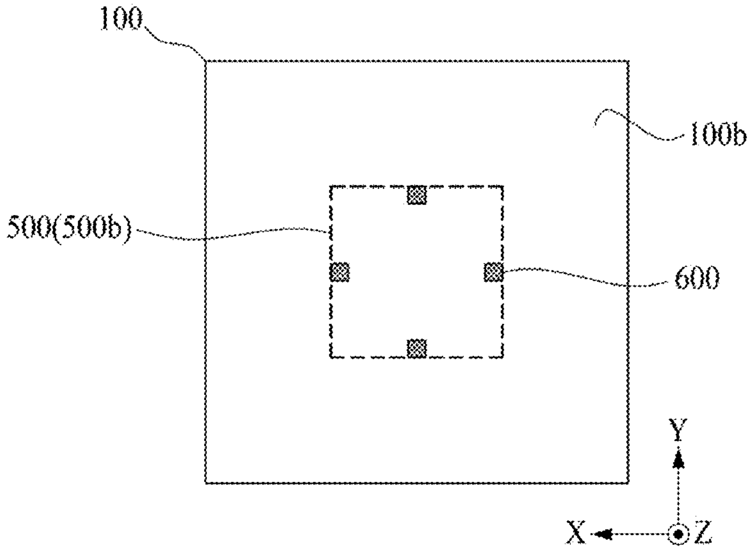
FIG. 16 illustrates an arrangement structure of one or more weight members illustrated in FIG. 14. according to another embodiment of the present disclosure

With reference to FIGS. 14 and 16, the apparatus 3 according to another embodiment of the present disclosure may include a plurality of weight members 600. For example, the apparatus 3 according to another embodiment of the present disclosure may include four weight members 600 or first to fourth weight members 600. The plurality of weight members 600 may be attached on or coupled to the second surface 100*b* of the vibration member 100 to respectively overlap first to fourth periphery portions of the vibration device 500. For example, the four weight members 600 may be attached on or coupled to the second surface 100*b* of the vibration member 100 to respectively overlap the first to fourth periphery portions, each disposed between two adjacent corners, of the vibration device 500. For example, the four weight members 600 may be attached on or coupled to the second surface 100*b* of the vibration member 100 to respectively overlap upper, lower, left, and right periphery portions of the vibration device 500.

Figure 17:
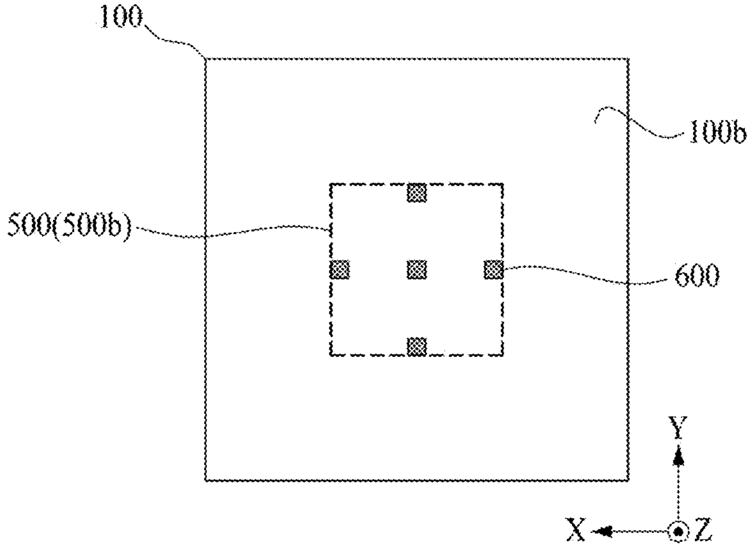
FIG. 17 illustrates an arrangement structure of one or more weight members illustrated in FIG. 14 according to another embodiment of the present disclosure.

With reference to FIGS. 14 and 17, the apparatus 3 according to another embodiment of the present disclosure may include a plurality of weight members 600. For example, the apparatus 3 according to another embodiment of the present disclosure may include five weight members 600 or first to fifth weight members 600. The plurality of weight members 600 may be attached on or coupled to the second surface 100*b* of the vibration member 100 to overlap with each of a center portion and first to fourth periphery portions of the vibration device 500. For example, the five weight members 600 may be attached on or coupled to the second surface 100*b* of the vibration member 100 to respectively overlap the first to fourth periphery portions, each disposed between two adjacent corners, of the vibration device 500 and overlap the center portion of the vibration device 500. For example, the five weight members 600 may be attached on or coupled to the second surface 100*b* of the vibration member 100 to overlap with each of the center portion and upper, lower, left, and right periphery portions of the vibration device 500.

Figure 18:
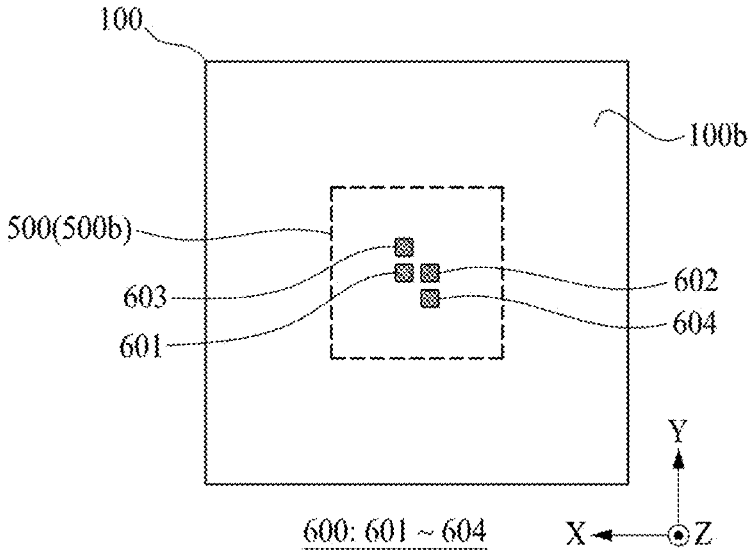
FIG. 18 illustrates an arrangement structure of one or more weight members illustrated in FIG. 14 according to another embodiment of the present disclosure.

With reference to FIGS. 14 and 18, the apparatus 3 according to another embodiment of the present disclosure may include a plurality of weight members 601 to 604. For example, the apparatus 3 according to another embodiment of the present disclosure may include four weight members 601 to 604 or first to fourth weight members 601 to 604. Each of the plurality of weight members 601 to 604 may be attached on or coupled to the second surface 100*b* of the vibration member 100 to overlap a center region of the vibration device 500. For example, the four weight members 601 to 604 may be attached on or coupled to the second surface 100*b* of the vibration member 100 to overlap the center region of the vibration device 500 and have a "└┐"-shape. For example, the first and second weight members 601 and 602 may be disposed spaced apart from each other along a first direction X with the center portion of the vibration device 500 therebetween. The third weight member 603 may be disposed spaced apart from the first weight member 601 along a second direction Y. The fourth weight member 604 may be disposed spaced apart from the second weight member 602 along the second direction Y. For example, intervals between the first to fourth weight members 601 to 604 along the first direction X and the second direction Y may be equal to one another, but embodiments of the present disclosure are not limited thereto.

Figure 19:
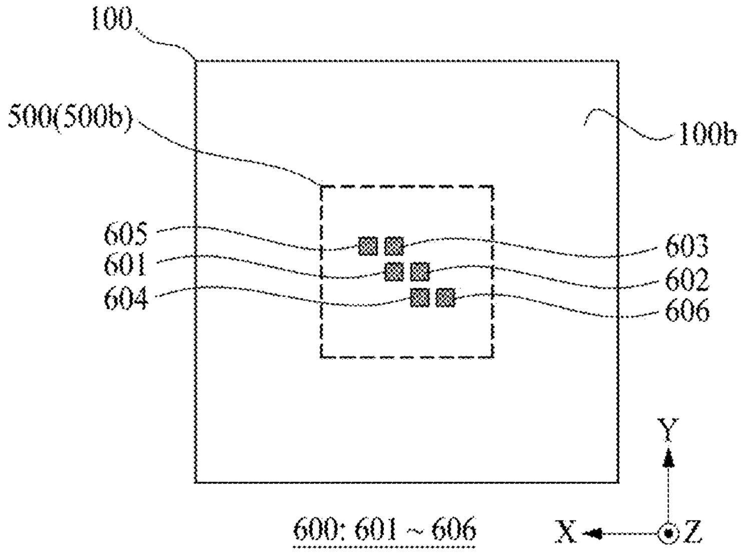
FIG. 19 illustrates an arrangement structure of one or more weight members illustrated in FIG. 14 according to another embodiment of the present disclosure.

With reference to FIGS. 14 and 19, the apparatus 3 according to another embodiment of the present disclosure may include a plurality of weight members 601 to 606. For example, the apparatus 3 according to another embodiment of the present disclosure may include six weight members 601 to 606 or first to sixth weight members 601 to 606. Each of the plurality of weight members 601 to 606 may be attached on or coupled to the second surface 100*b* of the vibration member 100 to overlap a center region of the vibration device 500. For example, the six weight members 601 to 606 may be attached on or coupled to the second surface 100*b* of the vibration member 100 to overlap the center region of the vibration device 500 and have a zigzag shape having a staircase shape. For example, the first and second weight members 601 and 602 may be disposed spaced apart from each other along a first direction X with the center portion of the vibration device 500 therebetween. The third weight member 603 may be disposed spaced apart from the first weight member 601 along a second direction Y. The fourth weight member 604 may be disposed spaced apart from the second weight member 602 along the second direction Y. The fifth weight member 605 may be disposed spaced apart from the third weight member 603 along the first direction X. The sixth weight member 606 may be disposed spaced apart from the fourth weight member 604 along the first direction X. For example, intervals between the first to sixth weight members 601 to 606 along the first direction X and the second direction Y may be equal to one another, but embodiments of the present disclosure are not limited thereto.

Figure 20:
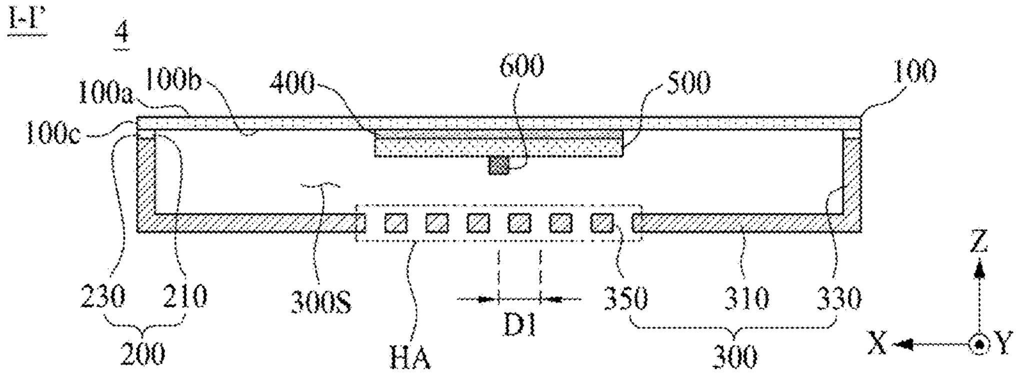
FIG. 20 is another cross-sectional view taken along line I-I' illustrated in FIG. 1 according to another embodiment of the present disclosure.

FIG. 20 is another cross-sectional view taken along line I-I' illustrated in FIG. 1 according to another embodiment of the present disclosure. FIG. 20 illustrates an embodiment where the weight member described above with reference to FIGS. 14 to 19 are added to the apparatus 2 described above with reference to FIG. 13. Therefore, in the following description, the repetitive descriptions of the same elements other than the weight member and relevant elements thereto may be omitted or will be briefly given.

With reference to FIG. 20, in an apparatus 4 according to another embodiment of the present disclosure, a vibration device 500 may be connected with or supported by a second surface 100*b* (or a lower surface or a rear surface) of a vibration member 100 by a connection member 400. The vibration device 500 may be disposed at an internal space 300S and may be surrounded by a supporting member 300, and thus, the vibration device 500 may be protected from an external impact.

The apparatus 4 according to another embodiment of the present disclosure may include one or more weight members 600 which are attached on or coupled to the vibration device 500.

The one or more weight members 600 may be attached on or directly coupled to a rear surface (or a backside surface) of the vibration device 500. The one or more weight members 600 may be directly attached on or directly coupled to the rear surface (or the backside surface) of the vibration device 500. The one or more weight members 600 may directly increase a weight of the vibration device 500, and thus, may reduce a lowest resonance frequency (or a lowest natural frequency) of the vibration device 500. Therefore, the vibration device 500 may vibrate at a relatively low frequency due to a lowest resonance frequency (or a lowest natural frequency) based on an increase in mass caused by the one or more weight members 600. Accordingly, a sound characteristic and/or a sound pressure level characteristic of a low-pitched sound band generated based on a vibration of the vibration device 500 may be enhanced.

The apparatus 4 according to another embodiment of the present disclosure, as illustrated in FIG. 15, may include one weight member 600 which is attached on or coupled to a center portion of a rear surface 500*b* of the vibration device 500.

The apparatus 4 according to another embodiment of the present disclosure, as illustrated in FIG. 16, may include a plurality of weight members 600 or four weight members 600 which are attached on or coupled to the rear surface 500*b* of the vibration device 500. For example, the four weight members 600 may be attached on or coupled to each of the first to fourth periphery portions, each disposed between two adjacent corners, of the vibration device 500. For example, the four weight members 600 may be attached on or coupled to upper, lower, left, and right periphery portions among the rear surface 500*b* of the vibration device 500, respectively.

The apparatus 4 according to another embodiment of the present disclosure, as illustrated in FIG. 17, may include a plurality of weight members 600 or five weight members 600 which are attached on or coupled to the rear surface 500*b* of the vibration device 500. For example, the five weight members 600 may be attached on or coupled to the first to fourth periphery portions, each disposed between two adjacent corners, of the vibration device 500 and the center portion of the vibration device 500, among the rear surface 500*b* of the vibration device, respectively. For example, the five weight members 600 may be attached on or coupled to the center portion and each of upper, lower, left, and right periphery portions of the rear surface 500*b* of the vibration device 500.

The apparatus 4 according to another embodiment of the present disclosure, as illustrated in FIG. 18, may include a plurality of weight members 601 to 604 or first to fourth weight members 601 to 604 which are attached on or coupled to the rear surface 500*b* of the vibration device 500. For example, the first to fourth weight members 601 to 604 may be attached on or coupled to the center region of the vibration device 500 to have a "└┐"-shape. For example, the first and second weight members 601 and 602 may be disposed spaced apart from each other along a first direction X with the center portion of the rear surface 500*b* of the vibration device 500 therebetween. The third weight member 603 may be disposed spaced apart from the first weight member 601 along a second direction Y. The fourth weight member 604 may be disposed spaced apart from the second weight member 602 along the second direction Y. For example, intervals between the first to fourth weight members 601 to 604 along the first direction X and the second direction Y may be equal to one another, but embodiments of the present disclosure are not limited thereto.

The apparatus 4 according to another embodiment of the present disclosure, as illustrated in FIG. 19, may include a plurality of weight members 601 to 606 or first to sixth weight members 601 to 606 which are attached on or coupled to the rear surface 500*b* of the vibration device 500. For example, the first to sixth weight members 601 to 606 may be attached on or coupled to the center region of the rear surface 500*b* of the vibration device 500 to have a zigzag shape having a staircase shape. For example, the first and second weight members 601 and 602 may be disposed spaced apart from each other along a first direction X with the center portion of the rear surface 500*b* of the vibration device 500 therebetween. The third weight member 603 may be disposed spaced apart from the first weight member 601 along a second direction Y. The fourth weight member 605 may be disposed spaced apart from the second weight member 602 along the second direction Y. The fifth weight member 604 may be disposed spaced apart from the third weight member 603 along the first direction X. The sixth weight member 606 may be disposed spaced apart from the fourth weight member 604 along the first direction X. For example, intervals between the first to sixth weight members 601 to 606 along the first direction X and the second direction Y may be equal to one another, but embodiments of the present disclosure are not limited thereto.

The apparatus 4 according to another embodiment of the present disclosure may have the same effect as that of the apparatus 3 described above with reference to FIG. 13 and may further include the one or more weight members 600 attached on or coupled to the vibration device 500, and thus, a sound characteristic and/or a sound pressure level characteristic of a low-pitched sound band may be increased or improved and a low-pitched sound band of a sound generated based on a vibration of the vibration member 100 may be expanded.

Figure 21:
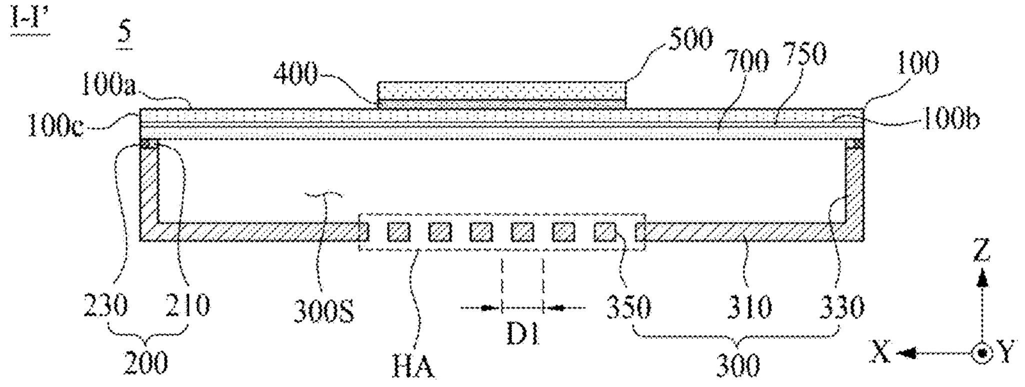
FIG. 21 is another cross-sectional view taken along line I-I' illustrated in FIG. 1 according to another embodiment of the present disclosure.
Figure 22:
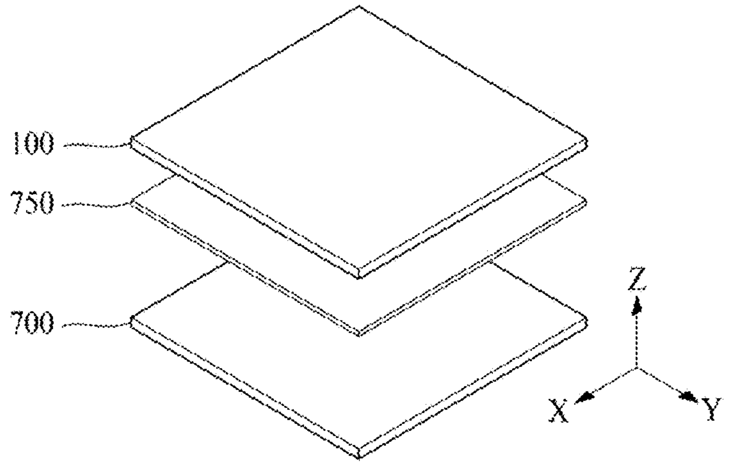
FIG. 22 is an exploded perspective view illustrating a vibration member and a reinforcement member illustrated in FIG. 21 according to another embodiment of the present disclosure.

FIG. 21 is another cross-sectional view taken along line I-I' illustrated in FIG. 1 according to another embodiment of the present disclosure. FIG. 22 is an exploded perspective view illustrating a vibration member and a reinforcement member illustrated in FIG. 21 according to another embodiment of the present disclosure. FIGS. 21 and 22 illustrate an embodiment where the reinforcement member is added to the apparatus 1 described above with reference to FIGS. 1 to 12B. Therefore, in the following description, the repetitive descriptions of the same elements other than the reinforcement member and relevant elements thereto may be omitted or will be briefly given.

With reference to FIGS. 1, 21, and 22, an apparatus 5 according to another embodiment of the present disclosure may include a vibration member 100, a supporting member 300, one or more vibration devices 500, and a reinforcement member 700.

Each of the vibration member 100, the supporting member 300, and the one or more vibration devices 500 may be the same as described above with reference to FIGS. 1 to 12B, and thus, the repetitive description thereof may be omitted or will be briefly given.

The reinforcement member 700 may be configured to reinforce the stiffness of the vibration member 100. The reinforcement member 700 may be disposed at or attached on a second surface 100*b* of the vibration member 100. For example, the reinforcement member 700 may be disposed at or attached on a rear surface 100*b* of the vibration member 100.

The reinforcement member 700 according to an embodiment of the present disclosure may include a metal material or a nonmetal material (or a composite nonmetal material). For example, the reinforcement member 700 may be configured as the same material as or a different material from the vibration member 100 of the metal material or the nonmetal material (or the composite nonmetal material). The metal material of the reinforcement member 700 may include any one or more materials of stainless steel, aluminum (Al), an Al alloy, a magnesium (Mg), a Mg alloy, and a magnesium-lithium (Mg—Li) alloy, but embodiments of the present disclosure are not limited thereto. The nonmetal material (or the composite nonmetal material) of the reinforcement member 700 may include one or more material (or substance) of plastic, fiber, leather, wood, cloth, rubber, carbon, glass, and paper, but embodiments of the present disclosure are not limited thereto. For example, the reinforcement member 700 may include the same material as that of the vibration member 100, or may be implemented in the same structure as that of the vibration member 100 described above with reference to FIGS. 12A and 12B. For example, the reinforcement member 700 may be a second vibration plate, a rear vibration plate, a reinforcement plate, a stiff member, a stiff plate, a dummy member, a dummy plate, an auxiliary member, an auxiliary plate, a secondary member, or a secondary plate, but embodiments of the present disclosure are not limited thereto.

The reinforcement member 700 may be attached on or coupled to the second surface 100*b* of the vibration member 100 by a second connection member 750. The reinforcement member 700 may be attached on or coupled to the entire second surface 100*b* of the vibration member 100 by a second connection member 750.

The second connection member 750 according to an embodiment of the present disclosure may be disposed between an entire rear surface of the reinforcement member 700 and the entire second surface 100*b* of the vibration member 100. The second connection member 750 may include an adhesive layer (or a tacky layer) which is good in attaching force or adhesive force. For example, the adhesive layer (or a tacky layer) of the second connection member 750 may include epoxy, acrylic, silicone, or urethane, but embodiments of the present disclosure are not limited thereto. The adhesive layer (or a tacky layer) of the second connection member 750 according to another embodiment of the present disclosure may include a pressure sensitive adhesive (PSA), an optically clear adhesive (OCA), or an optically clear resin (OCR), but embodiments of the present disclosure are not limited thereto.

The second connection member 750 according to another embodiment of the present disclosure may include a plurality of hollow portions. The plurality of hollow portions may be arranged in a mesh shape, but embodiments of the present disclosure are not limited thereto. The plurality of hollow portions may configure a plurality of air gaps (or air pockets) between the rear surface of the reinforcement member 700 and the second surface 100*b* of the vibration member 100. The plurality of air gaps may each be a space through which a sound wave generated based on a vibration of the vibration device 500 or the vibration member 100 is propagated. The plurality of air gaps may be a space on which air bubbles occurring in attaching the reinforcement member 700 on the vibration member 100 with the second connection member 750 concentrates. The plurality of air gaps may be a sound pressure level generating space, a sound space, a sound pressure level space, a sounding part, or a sounding box, but embodiments of the present disclosure are not limited thereto.

The second connection member 750 according to another embodiment of the present disclosure may include a first connection pattern and a second connection pattern. The first connection pattern may be disposed between a center portion of the rear surface of the reinforcement member 700 and a center portion of the second surface 100*b* of the vibration member 100 to overlap the vibration device 500. The second connection pattern may be disposed between a periphery portion of the rear surface of the reinforcement member 700 and a periphery portion of the second surface 100*b* of the vibration member 100. The first connection pattern may include an adhesive layer (or a tacky layer) having a material (or a soft material) which is relatively softer than that of the second connection pattern. The second connection pattern may include an adhesive layer (or a tacky layer) having a material (or a hard material) which is relatively stiff (or harder) than that of the first connection pattern. The first connection pattern may be a center connection member, a center connection pattern, or a first connection member pattern. The second connection pattern may be a periphery connection member, an edge connection pattern, a second edge connection pattern, or a second connection member pattern.

According to an embodiment of the present disclosure, the reinforcement member 700 may be coupled to or supported by the supporting member 300 by a coupling member

200. Except for that the coupling member 200 is disposed between a second supporting part 330 of the supporting member 300 and the reinforcement member 700, the coupling member 200 may be the same as the coupling member 200 described above with reference to FIG. 2, and thus, the repetitive description thereof may be omitted.

According to another embodiment of the present disclosure, the reinforcement member 700 may have a size corresponding to the other portion, except a periphery portion coupled to the coupling member 200, of the second surface 100_b_ of the vibration member 100. The reinforcement member 700 may have a size which is smaller than that of the vibration member 100. For example, the reinforcement member 700 may be attached on or coupled to the other portion, except a periphery portion, of the second surface 100_b_ of the vibration member 100 by the second connection member 750. Accordingly, the vibration member 100 may be coupled to or supported by the supporting member 300 by the coupling member 200. The coupling member 200 may be configured to surround lateral surfaces of the reinforcement member 700. For example, the coupling member 200 may contact or may be spaced apart from a lateral surface of the reinforcement member 700 by a certain interval.

The reinforcement member 700 according to an embodiment of the present disclosure may reinforce the stiffness of the vibration member 100 and may minimize a partial vibration (or a partial vibration mode) of the vibration member 100, and thus, may increase or enhance a sound characteristic and/or a sound pressure level characteristic of a sound generated based on a vibration of the vibration member 100.

The apparatus 5 according to another embodiment of the present disclosure may have the same effect as that of the apparatus 1 described above with reference to FIGS. 1 to 12B and may further include the reinforcement member 700 which is coupled to all of the second surface 100_b_ of the vibration member 100, and thus, a sound characteristic and/or a sound pressure level characteristic of a sound generated based on a vibration of the vibration member 100 may increase or be enhanced.

The apparatus 5 according to another embodiment of the present disclosure may include one or more weight members which are attached on or coupled to a rear surface of the reinforcement member 700 overlapping the vibration device 500. Except for that the one or more weight members are attached on or coupled to the rear surface of the reinforcement member 700 overlapping the vibration device 500, the one or more weight members may be substantially the same as the one or more weight members 600 described above with reference to FIGS. 14 to 19, and thus, the repetitive description thereof may be omitted. Therefore, the apparatus 5 according to another embodiment of the present disclosure may further include one or more weight members which are attached on or coupled to the rear surface of the reinforcement member 700 overlapping the vibration device 500, and thus, a sound characteristic and/or a sound pressure level characteristic of a low-pitched sound band may be increased or improved and a low-pitched sound band of a sound generated based on a vibration of the vibration member 100 may be expanded.

Figure 23:
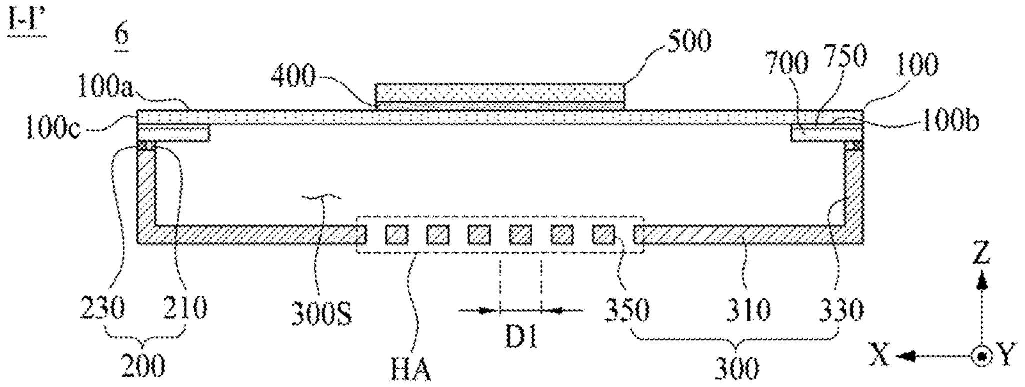
FIG. 23 is another cross-sectional view taken along line I-I' illustrated in FIG. 1 according to another embodiment of the present disclosure.
Figure 24:
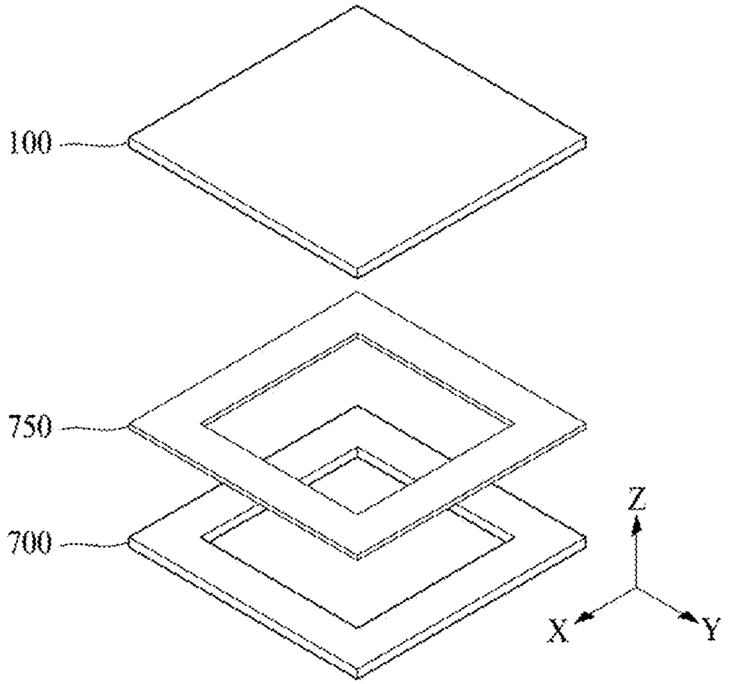
FIG. 24 is an exploded perspective view illustrating a vibration member and a reinforcement member illustrated in FIG. 23 according to another embodiment of the present disclosure.

FIG. 23 is another cross-sectional view taken along line I-I' illustrated in FIG. 1 according to another embodiment of the present disclosure. FIG. 24 is an exploded perspective view illustrating a vibration member and a reinforcement member illustrated in FIG. 23 according to another embodiment of the present disclosure. FIGS. 23 and 24 illustrate an embodiment implemented by modifying the reinforcement member of the apparatus 5 described above with reference to FIGS. 21 and 22. Therefore, in the following description, the repetitive descriptions of the same elements other than the reinforcement member and relevant elements thereto may be omitted or will be briefly given.

With reference to FIGS. 1, 23, and 24, in an apparatus 6 according to another embodiment of the present disclosure, a reinforcement member 700 may be configured to reinforce the stiffness of a periphery portion (or an outer portion) of a vibration member 100. The reinforcement member 700 may be disposed at or attached on a periphery portion of a second surface 100_b_ of the vibration member 100. For example, the reinforcement member 700 may be disposed at or attached on a periphery portion of a second surface 100_b_ of the vibration member 100 except a center region of the vibration member 100.

The reinforcement member 700 according to an embodiment of the present disclosure may have a tetragonal ring shape corresponding to the periphery portion of the second surface 100_b_ of the vibration member 100, but embodiments of the present disclosure are not limited thereto and the reinforcement member 700 may have a circular ring shape or an oval ring shape.

The reinforcement member 700 may be attached on or coupled to the second surface 100_b_ of the vibration member 100 by a second connection member 750. The reinforcement member 700 may be attached on or coupled to the periphery portion of the second surface 100_b_ of the vibration member 100 by the second connection member 750.

The second connection member 750 may be provided to have the same shape as a shape of the reinforcement member 700. The second connection member 750 may be disposed or connected between the periphery portion of the second surface 100_b_ of the vibration member 100 and the reinforcement member 700.

The reinforcement member 700 according to an embodiment of the present disclosure may reinforce the stiffness of the periphery portion of the vibration member 100 and may minimize a partial vibration (or a partial vibration mode) of the vibration member 100, and thus, may increase or enhance a sound characteristic and/or a sound pressure level characteristic of a sound generated based on a vibration of the vibration member 100.

The apparatus 6 according to another embodiment of the present disclosure may include one or more weight members which are attached on or coupled to a second surface 100_b_ of the vibration member 100 overlapping the vibration device 500. The one or more weight members may be substantially the same as the one or more weight members 600 described above with reference to FIGS. 14 to 19, and thus, the repetitive description thereof may be omitted. Therefore, the apparatus 6 according to another embodiment of the present disclosure may further include one or more weight members which are attached on or coupled to the second surface 100_b_ of the vibration member 100 overlapping the vibration device 500, and thus, a sound characteristic and/or a sound pressure level characteristic of a low-pitched sound band may be increased or improved and a low-pitched sound band of a sound generated based on a vibration of the vibration member 100 may be expanded.

Figure 25:
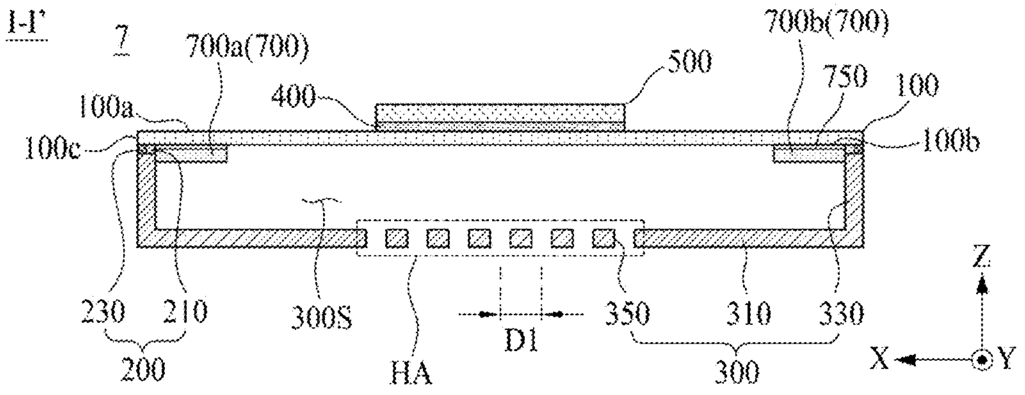
FIG. 25 is another cross-sectional view taken along line I-I' illustrated in FIG. 1 according to another embodiment of the present disclosure.
Figure 26:
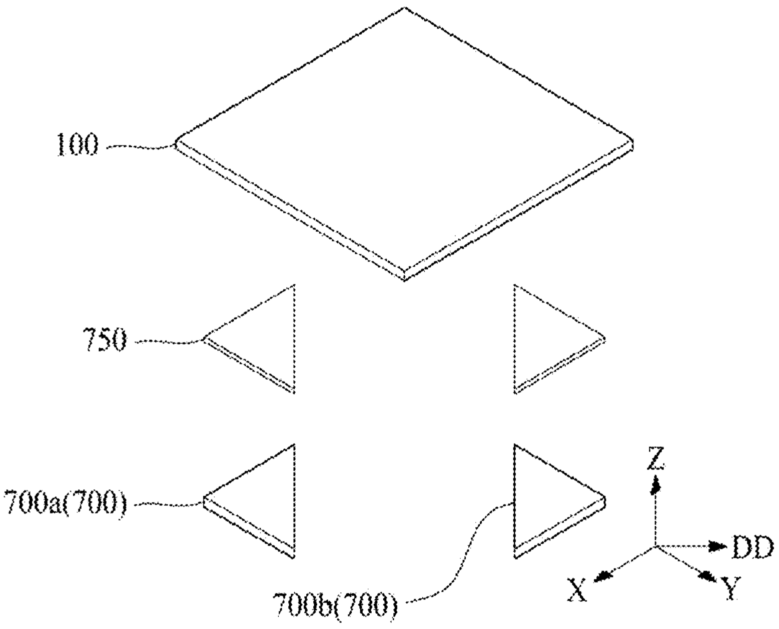
FIG. 26 is an exploded perspective view illustrating a vibration member and a reinforcement member illustrated in FIG. 25 according to another embodiment of the present disclosure.

FIG. 25 is another cross-sectional view taken along line I-I' illustrated in FIG. 1 according to another embodiment of the present disclosure. FIG. 26 is an exploded perspective view illustrating a vibration member and a reinforcement member illustrated in FIG. 25 according to another embodiment of the present disclosure. FIGS. 25 and 26 illustrate an embodiment implemented by modifying the reinforcement member of the apparatus 6 described above with reference to FIGS. 23 and 24. Therefore, in the following description, the repetitive descriptions of the same elements other than the reinforcement member and relevant elements thereto may be omitted or will be briefly given.

With reference to FIGS. 1, 25, and 26, in an apparatus 7 according to another embodiment of the present disclosure, a reinforcement member 700 may be configured to reinforce the stiffness of a plurality of corner portions of a vibration member 100. The reinforcement member 700 may be configured to reinforce the stiffness of a pair of corner portions of the plurality of corner portions of a vibration member 100. For example, the reinforcement member 700 may be configured to reinforce the stiffness of a pair of corner portions, facing one another, of a plurality of corner portions of a vibration member 100.

The reinforcement member 700 may include a pair of reinforcement patterns 700*a* and 700*b*. The pair of reinforcement patterns 700*a* and 700*b* may be attached on or coupled to each of a pair of corner portions, facing one another, of a plurality of corner portions in a second surface 100*b* of the vibration member 100. The pair of reinforcement patterns 700*a* and 700*b* may have a symmetrical structure with respect to a center portion of the second surface 100*b* of the vibration member 100. For example, the pair of reinforcement patterns 700*a* and 700*b* may face each other in a diagonal direction DD between a first direction X and a second direction Y.

The pair of reinforcement patterns 700*a* and 700*b* may be attached on or coupled to each of a pair of corner portions, facing one another, of a plurality of corner portions of the second surface 100*b* of the vibration member 100 by a second connection member 750.

The second connection member 750 may be provided to have the same shape as a shape of the pair of reinforcement patterns 700*a* and 700*b*. The second connection member 750 may be disposed or connected between the second surface 100*b* of the vibration member 100 and the pair of reinforcement patterns 700*a* and 700*b*.

The reinforcement member 700 according to an embodiment of the present disclosure may reinforce the stiffness of the pair of corner portions, facing one another, of the plurality of corner portions of the vibration member 100 and may minimize a partial vibration (or a partial vibration mode) of the vibration member 100, and thus, may increase or enhance a sound characteristic and/or a sound pressure level characteristic of a sound generated based on a vibration of the vibration member 100.

The apparatus 7 according to another embodiment of the present disclosure may include one or more weight members which are attached on or coupled to a second surface 100*b* of the vibration member 100 overlapping the vibration device 500. The one or more weight members may be substantially the same as the one or more weight members 600 described above with reference to FIGS. 14 to 19, and thus, the repetitive description thereof may be omitted. Therefore, the apparatus 7 according to another embodiment of the present disclosure may further include one or more weight members which are attached on or coupled to the second surface 100*b* of the vibration member 100 overlapping the vibration device 500, and thus, a sound characteristic and/or a sound pressure level characteristic of a low-pitched sound band may be increased or improved and a low-pitched sound band of a sound generated based on a vibration of the vibration member 100 may be expanded.

Figure 27:
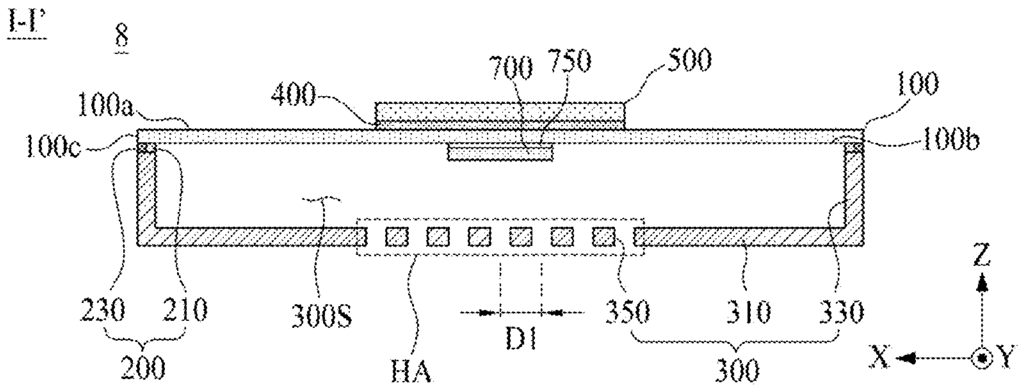
FIG. 27 is another cross-sectional view taken along line I-I' illustrated in FIG. 1 according to another embodiment of the present disclosure.
Figure 28:
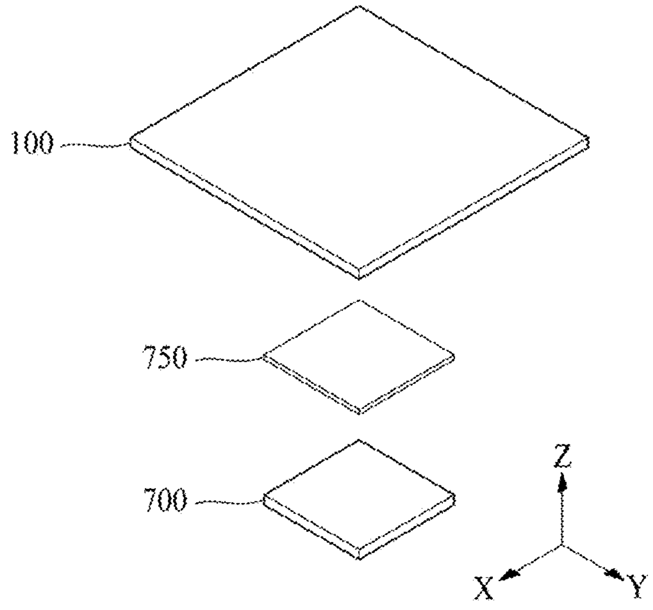
FIG. 28 is an exploded perspective view illustrating a vibration member and a reinforcement member illustrated in FIG. 27 according to another embodiment of the present disclosure.

FIG. 27 is another cross-sectional view taken along line I-I' illustrated in FIG. 1 according to another embodiment of the present disclosure. FIG. 28 is an exploded perspective view illustrating a vibration member and a reinforcement member illustrated in FIG. 27 according to another embodiment of the present disclosure. FIGS. 27 and 28 illustrate an embodiment implemented by modifying the reinforcement member of the apparatus 6 and 7 described above with reference to FIGS. 23 to 26. Therefore, in the following description, the repetitive descriptions of the same elements other than the reinforcement member and relevant elements thereto may be omitted or will be briefly given.

With reference to FIGS. 1, 27, and 28, in an apparatus 8 according to another embodiment of the present disclosure, a reinforcement member 700 may be configured to reinforce the stiffness of a center portion of a vibration member 100. The reinforcement member 700 may be disposed at or attached on a center portion of a second surface 100*b* of the vibration member 100. For example, the reinforcement member 700 may be disposed at or attached on a center portion of a rear surface 100*b* of a vibration member 100 except a periphery portion of the vibration member 100.

The reinforcement member 700 according to an embodiment of the present disclosure may have a tetragonal shape corresponding to the center portion of the rear surface 100*b* of the vibration member 100, but embodiments of the present disclosure are not limited thereto and the reinforcement member 700 may have a circular shape, an oval shape, or a three or more-angled polygonal shape.

The reinforcement member 700 may be attached on or coupled to the rear surface 100*b* of the vibration member 100 by a second connection member 750. The reinforcement member 700 may be attached on or coupled to the center portion of the rear surface 100*b* of the vibration member 100 by a second connection member 750.

The second connection member 750 may be provided to have the same shape as a shape of the reinforcement member 700. The second connection member 750 may be disposed or connected between the second surface 100*b* of the vibration member 100 and the reinforcement member 700.

The reinforcement member 700 according to an embodiment of the present disclosure may reinforce the stiffness of the center portion of the vibration member 100 and may minimize a partial vibration (or a partial vibration mode) of the vibration member 100, and thus, may increase or enhance a sound characteristic and/or a sound pressure level characteristic of a sound generated based on a vibration of the vibration member 100.

The apparatus 8 according to another embodiment of the present disclosure may include one or more weight members which are attached on or coupled to one or more of a second surface 100*b* of the vibration member 100 overlapping the vibration device 500 and a rear surface of the reinforcement member 700. The one or more weight members may be substantially the same as the one or more weight members 600 described above with reference to FIGS. 14 to 19, and thus, the repetitive description thereof may be omitted. Therefore, the apparatus 8 according to another embodiment of the present disclosure may further include one or more weight members which are attached on or coupled to one or more of the second surface 100*b* of the vibration member 100 overlapping the vibration device 500 and the rear surface of the reinforcement member 700, and thus, a sound characteristic and/or a sound pressure level characteristic of a low-pitched sound band may be increased or improved and a low-pitched sound band of a sound generated based on a vibration of the vibration member 100 may be expanded.

Figure 29:
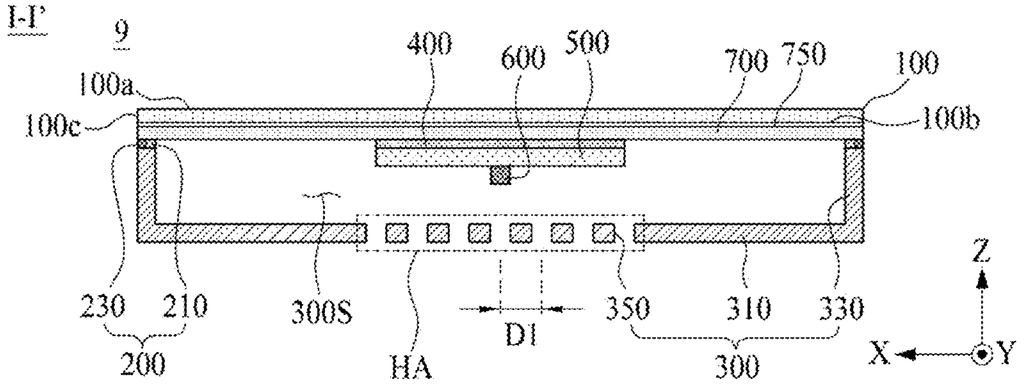
FIG. 29 is another cross-sectional view taken along line I-I' illustrated in FIG. 1 according to another embodiment of the present disclosure.

FIG. 29 is another cross-sectional view taken along line I-I' illustrated in FIG. 1 according to another embodiment of the present disclosure. FIG. 29 illustrates an embodiment implemented by changing an arrangement position of the vibration device in the apparatus 5 described above with reference to FIGS. 21 and 22. Therefore, in the following description, the repetitive descriptions of the same elements other than an arrangement position of the vibration device and relevant elements thereto may be omitted or will be briefly given.

With reference to FIG. 29, in an apparatus 9 according to another embodiment of the present disclosure, a vibration device 500 may be connected with or supported by a rear surface (or a lower surface) of a reinforcement member 700 by a connection member 400. The vibration device 500 may be disposed at an internal space 300S and may be surrounded by a supporting member 300, and thus, the vibration device 500 may be protected from an external impact.

The connection member 400 may be disposed between the vibration device 500 and the reinforcement member 700 and may connect or couple the vibration device 500 to a vibration member 100. For example, the vibration device 500 may be connected or coupled to the rear surface of the reinforcement member 700 by the connection member 400, and thus, the vibration device 500 may be supported by and disposed at the rear surface of the reinforcement member 700.

The apparatus 9 according to another embodiment of the present disclosure may have the same effect as that of the apparatus 5 described above with reference to FIGS. 21 and 22 and the vibration device 500 may be accommodated into the internal space 300S of the supporting member 300, and thus, the damage of the vibration device 500 caused by an external impact may be prevented.

The apparatus 9 according to another embodiment of the present disclosure, as described above with reference to FIG. 20, may further include one or more weight members 600 attached on or coupled to a rear surface (or a backside surface) of the vibration device 500, which may be the same as described above with reference to FIG. 20, and thus, the repetitive description thereof may be omitted.

In the apparatus 9 according to another embodiment of the present disclosure, the reinforcement member 700 may be replaced with the reinforcement member 700 described above with reference to FIGS. 23 to 26. Therefore, the vibration device 500 may be connected to or supported by a second surface (or a lower surface or a rear surface) 100*b* of the vibration member 100 by a connection member 400.

Figure 30:
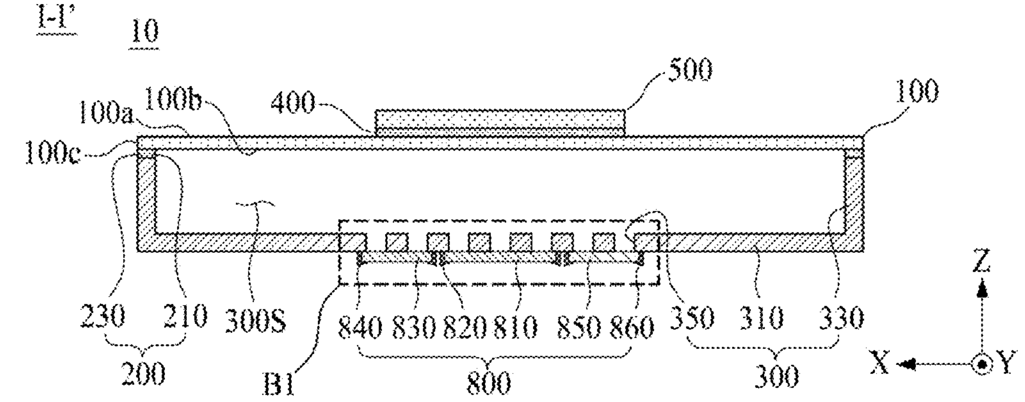
FIG. 30 is another cross-sectional view taken along line I-I' illustrated in FIG. 1 according to another embodiment of the present disclosure.
Figure 31:
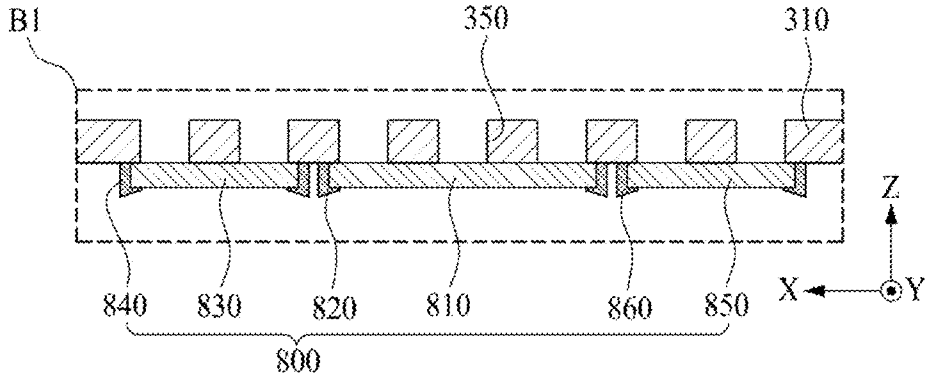
FIG. 31 is an enlarged view of a region 'B1' illustrated in FIG. 30 according to another embodiment of the present disclosure.

FIG. 30 is another cross-sectional view taken along line I-I' illustrated in FIG. 1 according to another embodiment of the present disclosure. FIG. 31 is an enlarged view of a region 'B1' illustrated in FIG. 30 according to another embodiment of the present disclosure. FIGS. 30 and 31 illustrate an embodiment where a hole cover part is added to the apparatus 1 described above with reference to FIGS. 1 and 2. The hole cover part illustrated in FIGS. 30 and 31 may be identically applied to the apparatuses 2 to 9 described above with reference to FIGS. 13 to 29. Therefore, in the following description, the repetitive descriptions of the same elements other than the hole cover part and relevant elements thereto may be omitted or will be briefly given.

With reference to FIGS. 30 and 31, the apparatus 10 according to another embodiment of the present disclosure may include a vibration member 100, a supporting member 300, one or more vibration devices 500, a plurality of holes 350, and a hole cover part 800.

Each of the vibration member 100, the supporting member 300, the one or more vibration devices 500, and the plurality of holes 350 may be substantially the same as described above with reference to FIGS. 1 to 29, and thus, the repetitive description thereof may be omitted or will be briefly given.

The hole cover part 800 may be configured to adjust (or control) a pressure (or air pressure) of an internal space 300S of the apparatus 10. The hole cover part 800 may be configured to cover at least a portion of the plurality of holes 350. The hole cover part 800 may be configured to be detachable from a first supporting part 310 of a supporting member 300, and thus, may cover at least a portion of the plurality of holes 350. For example, the hole cover part 800 may be configured to cover a portion of the center region CA, the corner regions CA1 to CA4, and the middle region MA of a hole region HA illustrated in FIG. 3.

In the apparatus 10 according to another embodiment of the present disclosure, the plurality of holes 350 may be configured at two or more regions among the center region CA, the corner regions CA1 to CA4, and the middle region MA of the hole region HA. For example, the plurality of holes 350, as illustrated in FIGS. 3 to 5, may be respectively configured at the center region CA, the corner regions CA1 to CA4, and the middle region MA of the hole region HA, or as illustrated in FIGS. 6, 8, and 9, the plurality of holes 350 may be configured at two regions among the center region CA, the corner regions CA1 to CA4, and the middle region MA of the hole region HA.

With reference to FIGS. 3, 30, and 31, the hole cover part 800 according to an embodiment of the present disclosure may include one or more hole covers 810 and 830. For example, the hole cover part 800 may include a plurality of hole covers 810 and 830. For example, the hole cover part 800 may include any one or two of a first hole cover 810 covering the center region CA of the hole region HA, a second hole cover 830 covering the corner regions CA1 to CA4 of the hole region HA, and a third hole cover 850 covering the middle region MA of the hole region HA.

The first hole cover 810 may be configured to cover one or more holes 350 disposed at the center region CA of the hole region HA. The first hole cover 810 may include a shape corresponding to the center region CA of the hole region HA. The first hole cover 810 may be detachably attached on the first supporting part 310 of the supporting member 300 to cover the center region CA of the hole region HA. The first hole cover 810 may cover one or more holes 350 disposed at the center region CA of the hole region HA, and thus, may decrease or adjust a sound characteristic and/or a sound pressure level characteristic of a high-pitched sound band in a pitched sound band of a sound generated based on a vibration of the vibration member 100 and may prevent external particles from penetrating into the internal space 300S through the one or more holes 350 disposed at the center region CA of the hole region HA.

The first hole cover 810 according to an embodiment of the present disclosure may be configured to be detachably attached on the first supporting part 310 of the supporting member 300 by a plurality of first hook portions 820, and thus, may cover the one or more holes 350 disposed at the center region CA of the hole region HA. Each of the plurality of first hook portions 820 may be configured at the first supporting part 310 of the supporting member 300 corresponding to a periphery of the center region CA of the hole region HA.

The second hole cover 830 may be configured to cover one or more holes 350 disposed at the corner regions CA1 to CA4 of the hole region HA. The second hole cover 830 may include a shape corresponding to the corner regions CA1 to CA4 of the hole region HA. The second hole cover 830 may be detachably attached on the first supporting part 310 of the supporting member 300 to cover the corner regions CA1 to CA4 of the hole region HA. The second hole cover 830 may cover one or more holes 350 disposed at the corner regions CA1 to CA4 of the hole region HA, and thus, may decrease or adjust a sound characteristic and/or a sound pressure level characteristic of a high-pitched sound band in a pitched sound band of a sound generated based on a vibration of the vibration member 100 and may prevent external particles from penetrating into the internal space 300S through the one or more holes 350 disposed at the corner regions CA1 to CA4 of the hole region HA.

The second hole cover 830 according to an embodiment of the present disclosure may be configured to be detachably attached on the first supporting part 310 of the supporting member 300 by a plurality of second hook portions 840, and thus, may cover the one or more holes 350 disposed at the corner regions CA1 to CA4 of the hole region HA. Each of the plurality of second hook portions 840 may be configured at the first supporting part 310 of the supporting member 300 corresponding to a periphery of the corner regions CA1 to CA4 of the hole region HA.

The third hole cover 850 may be configured to cover one or more holes 350 disposed at the middle region MA of the hole region HA. The third hole cover 850 may include a shape corresponding to the middle region MA of the hole region HA. The third hole cover 850 may be detachably attached on the first supporting part 310 of the supporting member 300 to cover the middle region MA of the hole region HA. The third hole cover 850 may cover one or more holes 350 disposed at the middle region MA of the hole region HA, and thus, may decrease or adjust a sound characteristic and/or a sound pressure level characteristic of a high-pitched sound band in a pitched sound band of a sound generated based on a vibration of the vibration member 100 and may prevent external particles from penetrating into the internal space 300S through or by or via the one or more holes 350 disposed at the middle region MA of the hole region HA.

The third hole cover 850 according to an embodiment of the present disclosure may be configured to be detachably attached on the first supporting part 310 of the supporting member 300 by a plurality of third hook portions 860, and thus, may cover the one or more holes 350 disposed at the middle region MA of the hole region HA. Each of the plurality of third hook portions 860 may be configured at the first supporting part 310 of the supporting member 300 corresponding to a periphery of the middle region MA of the hole region HA.

The apparatus 10 according to another embodiment of the present disclosure may adjust (or control) a pressure (or air pressure) of the internal space 300S by the hole cover part 800 covering a portion of the plurality of holes 350 disposed at the supporting member 300, and thus, a sound characteristic and/or a sound pressure level characteristic of a specific pitched sound band in a pitched sound band of a sound generated based on a vibration of the vibration member 100 may be reduced or adjusted.

Figure 32:
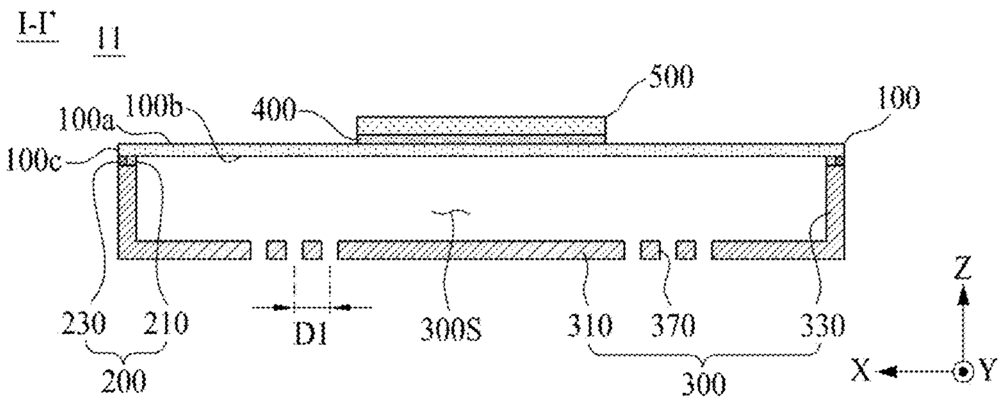
FIG. 32 is another cross-sectional view taken along line I-I' illustrated in FIG. 1 according to another embodiment of the present disclosure.
Figure 33:
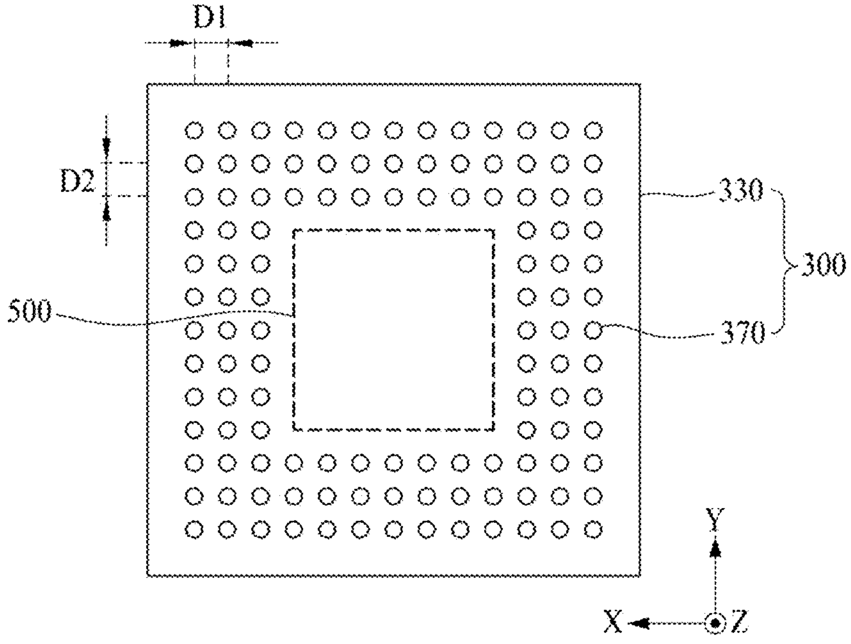
FIG. 33 illustrates an arrangement structure of a hole illustrated in FIG. 32 according to another embodiment of the present disclosure.

FIG. 32 is another cross-sectional view taken along line I-I' illustrated in FIG. 1 according to another embodiment of the present disclosure. FIG. 33 illustrates an arrangement structure of a hole illustrated in FIG. 32 according to another embodiment of the present disclosure. FIGS. 32 and 33 illustrate an embodiment implemented by changing a plurality of holes in the apparatus 1 described above with reference to FIGS. 1 and 2. The plurality of holes illustrated in FIGS. 32 and 33 may be identically applied to the apparatuses 2 to 9 described above with reference to FIGS. 13 to 29. Therefore, in the following description, the repetitive descriptions of the same elements other than the plurality of holes and relevant elements thereto may be omitted or will be briefly given.

With reference to FIGS. 1, 32, and 33, an apparatus 11 according to another embodiment of the present disclosure may include a vibration member 100, a supporting member 300, one or more vibration devices 500, and a plurality of holes 370.

Each of the vibration member 100, the supporting member 300, and the one or more vibration devices 500 may be substantially the same as described above with reference to FIGS. 1 to 29, and thus, the repetitive description thereof may be omitted or will be briefly given.

The plurality of holes 370 may be configured for decreasing an internal air pressure of the apparatus 11. The plurality of holes 370 may be configured at a first supporting part 310 of the supporting member 300 to overlap a periphery portion of the vibration member 100. For example, the plurality of holes 370 may be configured at the first supporting part 310 of the supporting member 300 to overlap a region between the vibration device 500 and a lateral surface 100*c* of the vibration member 100. For example, the plurality of holes 370 may be configured at the first supporting part 310 of the supporting member 300 not to overlap the one or more vibration devices 500.

The plurality of holes 370 may be configured to surround a region of the first supporting part 310 overlapping the one or more vibration devices 500. For example, the first supporting part 310 of the supporting member 300 may include a center portion overlapping the one or more vibration devices 500 and a periphery portion surrounding the center portion. For example, the plurality of holes 370 may be configured at the periphery portion of the first supporting part 310.

The plurality of holes 370 according to an embodiment of the present disclosure may be configured at a periphery portion of the first supporting part 310 to have certain intervals D1 and D2 along each of a first direction X and a second direction Y. The plurality of holes 370 may be formed to pass through or vertically pass through the first supporting part 310 along the third direction Z or a thickness direction of the supporting member 300. Therefore, the internal space 300S of the apparatus 11 or the internal space 300S provided between the vibration member 100 and the supporting member 300 may be connected or communicate with the outside by the plurality of holes 370, and thus, an air pressure of the internal space 300S of the apparatus 11 or an air pressure of the internal space 300S provided between the vibration member 100 and the supporting member 300 may be reduced.

According to an embodiment of the present disclosure, the plurality of holes 370 may communicate (or connect) the internal space 300S of the apparatus 11 with an external space to reduce an air pressure of the internal space 300S, and thus, may increase or expand a band of a low-pitched sound band of a sound generated based on a vibration of the vibration member 100, thereby improving a sound characteristic and/or a sound pressure level characteristic of the low-pitched sound band. For example, an air pressure (or pressure) of the internal space 300S of the apparatus 11 may be reduced by the plurality of holes 370, and thus, the amount of displacement (or a bending force) of the vibration member 100 or the vibration device 500 may increase, and thus, a band of the low-pitched sound band may increase or be expanded, thereby enhancing a sound characteristic and/or a sound pressure level characteristic of the low-pitched sound band.

According to another embodiment of the present disclosure, the plurality of holes 370 may overlap a periphery portion of the vibration member 100, and thus, may increase the amount of displacement (or a bending force) of the periphery portion of the vibration member 100, thereby extending a band of a high-pitched sound band and enhancing a sound characteristic and/or a sound pressure level characteristic of the high-pitched sound band.

The apparatus 11 according to another embodiment of the present disclosure may include an open internal space 300S where the plurality of holes 370 is configured at the supporting member 300, and thus, may include the same effect as the apparatus 1 described above with reference to FIGS. 1 and 2. Also, the apparatus 11 according to another embodiment of the present disclosure may include a plurality of holes 370 overlapping a periphery portion of the vibration member 100, and thus, the amount of displacement (or a bending force) of the periphery portion of the vibration member 100 may increase, thereby extending the band of the high-pitched sound band and enhancing a sound characteristic and/or a sound pressure level characteristic of the high-pitched sound band.

The apparatus 11 according to another embodiment of the present disclosure may further include a hole cover part which covers at least a portion of the plurality of holes 370. The hole cover part may be configured to be similar to the hole cover part described above with reference to FIGS. 30 and 31, and thus, the repetitive description thereof may be omitted.

Figure 34:
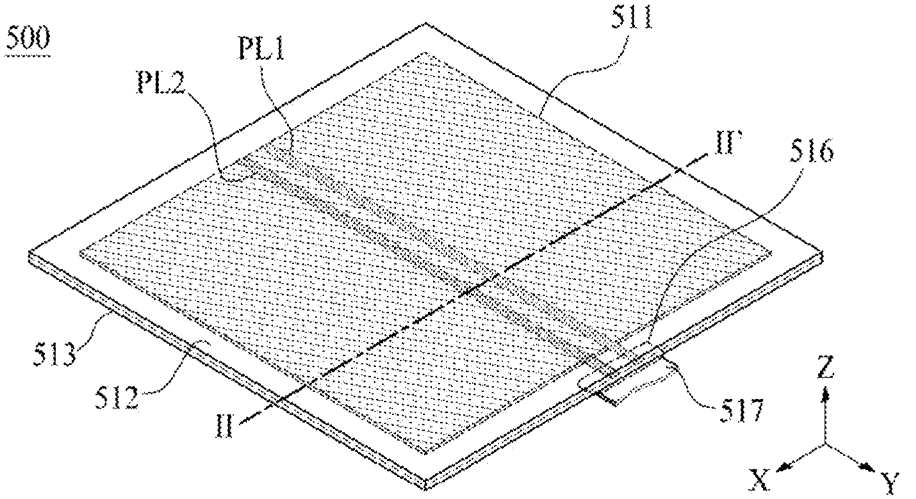
FIG. 34 illustrates a vibration device according to an embodiment of the present disclosure.
Figure 35:
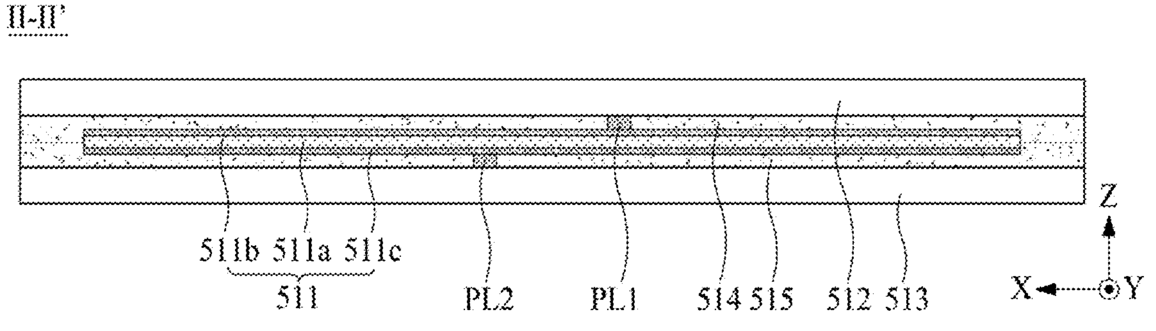
FIG. 35 is a cross-sectional view taken along line II-II' illustrated in FIG. 34 according to an embodiment of the present disclosure.
Figure 36:
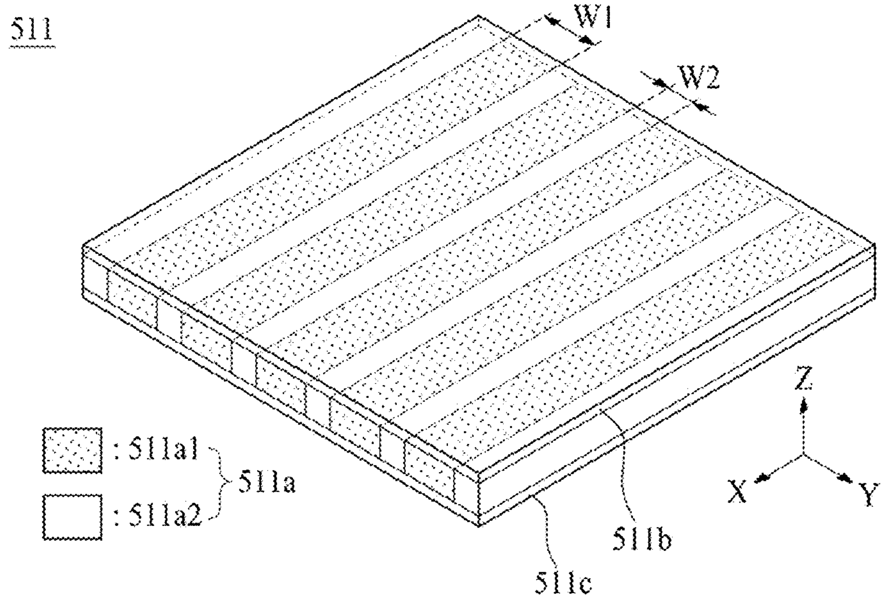
FIG. 36 illustrates a vibration device illustrated in FIG. 34 according to an embodiment of the present disclosure.

FIG. 34 illustrates a vibration device according to an embodiment of the present disclosure. FIG. 35 is a cross-sectional view taken along line II-II' illustrated in FIG. 34 according to an embodiment of the present disclosure. FIG. 36 illustrates a vibration device illustrated in FIG. 34 according to an embodiment of the present disclosure. FIGS. 34 to 36 illustrate one or more vibration device described above with reference to FIGS. 1 to 33.

With reference to FIGS. 34 to 36, one or more vibration device 500 according to an embodiment of the present disclosure may be referred to as an active vibration member, a vibration apparatus, a flexible vibration apparatus, a flexible vibration structure, a flexible vibrator, a flexible vibration generating device, a flexible vibration generator, a flexible sounder, a flexible sound device, a flexible sound generating device, a flexible sound generator, a flexible actuator, a flexible speaker, a flexible piezoelectric speaker, a film actuator, a film-type piezoelectric composite actuator, a film speaker, a film-type piezoelectric speaker, or a film-type piezoelectric composite speaker, or the like, but embodiments of the present disclosure are not limited thereto.

The vibration device 500 according to an embodiment of the present disclosure may include a vibration part 511. For example, the vibration part 511 may be a piezoelectric vibration part or a piezoelectric-type vibration part. The vibration part 511 may include a vibration layer 511*a*, a first electrode layer 511*b*, and a second electrode layer 511*c*.

The vibration layer 511*a* may include a piezoelectric material (or an electroactive material) which includes a piezoelectric effect. For example, the piezoelectric material may have a characteristic in which, when pressure or twisting phenomenon is applied to a crystalline structure by an external force, a potential difference occurs due to dielectric polarization caused by a relative position change of a positive (+) ion and a negative (−) ion, and a vibration is generated by an electric field based on a reverse voltage applied thereto. The vibration layer 511*a* may be referred to as a piezoelectric layer, a piezoelectric material layer, an electroactive layer, a piezoelectric material portion, an electroactive portion, a piezoelectric structure, a piezoelectric composite layer, a piezoelectric composite, or a piezoelectric ceramic composite, or the like, but embodiments of the present disclosure are not limited thereto. The vibration layer 511*a* may be formed of a transparent piezoelectric material, semitransparent piezoelectric material, or opaque piezoelectric material. The vibration layer 511*a* may be transparent, semitransparent, or opaque.

The vibration layer 511*a* according to an embodiment of the present disclosure may include a plurality of inorganic material portions and an organic material portion between the plurality of inorganic material portions. For example, each of the plurality of inorganic material portions may have a piezoelectric characteristic. For example, each of the plurality of inorganic material portions may be a first portion 511*a*1, and the organic material portion may be a second portion 511*a*2. For example, the vibration layer 511*a* may include a plurality of first portions 511*a*1 and a plurality of second portions 511*a*2. For example, the plurality of first portions 511*a*1 and the plurality of second portions 511*a*2 may be alternately and repeatedly disposed along a second direction Y (or a first direction X). For example, the first direction X may be a widthwise direction of the vibration layer 511*a*, the second direction Y may be a lengthwise direction of the vibration layer 511*a* crossing the first direction (X), but embodiments of the present disclosure are not limited thereto, the first direction X may be the lengthwise direction of the vibration layer 511*a*, and the second direction Y may be the widthwise direction of the vibration layer 511*a*.

Each of the plurality of first portions 511*a*1 may be configured as an inorganic material portion. The inorganic material portion may include a piezoelectric material, a composite piezoelectric material, or an electroactive material which includes a piezoelectric effect, but embodiments of the present disclosure are not limited thereto.

Each of the plurality of first portions 511*a*1 may be configured as a ceramic-based material for generating a relatively high vibration, or may be configured as a piezoelectric ceramic having a perovskite crystalline structure. The perovskite crystalline structure may have a piezoelectric effect and an inverse piezoelectric effect, and may be a structure having orientation. The perovskite crystalline structure may be represented by a chemical formula "$ABO_3$." In the chemical formula, "A" may include a divalent metal element, and "B" may include a tetravalent metal element. As an embodiment of the present disclosure, in the chemical formula "$ABO_3$," "A" and "B" may be cations, and "O" may be anions. For example, each of the plurality of first portions 511*a*1 may include at least one or more of lead (II) titanate ($PbTiO_3$), lead zirconate ($PbZrO_3$), lead zirconate titanate ($PbZrTiO_3$), barium titanate ($BaTiO_3$), and strontium titanate ($SrTiO_3$), but embodiments of the present disclosure are not limited thereto.

In a case where the perovskite crystalline structure includes a center ion (for example, $PbTiO_3$), a position of a Ti ion may be changed by an external stress or a magnetic field, and thus, polarization (or poling) may be changed, thereby generating a piezoelectric effect. For example, in the perovskite crystalline structure, a cubic shape corresponding to a symmetric structure may be changed to a tetragonal (e.g., quadrilateral), orthorhombic, or rhombohedral structure corresponding to an unsymmetric structure, and thus, a piezoelectric effect may be generated. In a tetragonal, orthorhombic, or rhombohedral structure corresponding to an unsymmetric structure, polarization may be high in a morphotropic phase boundary, and realignment of polarization may be easy, whereby the perovskite crystalline structure may have a high piezoelectric characteristic.

The vibration layer 511*a* or first portions 511*a*1 according to another embodiment of the present disclosure may include one or more of lead (Pb), zirconium (Zr), titanium (Ti), zinc (Zn), nickel (Ni), and niobium (Nb), but embodiments of the present disclosure are not limited thereto.

The vibration layer 511*a* or first portions 511*a*1 according to another embodiment of the present disclosure may include a lead zirconate titanate (PZT)-based material, including lead (Pb), zirconium (Zr), and titanium (Ti), or may include a lead zirconate nickel niobate (PZNN)-based material, including lead (Pb), zirconium (Zr), nickel (Ni), and niobium (Nb), but embodiments of the present disclosure are not limited thereto. Also, the vibration layer 511*a* or first portions 511*a*1 may include at least one or more of calcium titanate ($CaTiO_3$), $BaTiO_3$, and $SrTiO_3$, each without lead (Pb), but embodiments of the present disclosure are not limited thereto.

Each of the plurality of first portions 511*a*1 according to an embodiment of the present disclosure may be disposed between the plurality of second portions 511*a*2 and may have a first width W1 parallel to the second direction Y (or the first direction X) and a length parallel to the first direction X (or the second direction Y). Each of the plurality of second portions 511*a*2 may have a second width W2 parallel to the second direction Y (or the first direction X) and may have a length parallel to the first direction X (or the second direction Y). The first width W1 may be the same as or different from the second width W2. For example, the first width W1 may be greater than the second width W2. For example, the first portion 511*a*1 and the second portion 511*a*2 may include a line shape or a stripe shape which has the same size or different sizes. Therefore, the vibration layer 511*a* may include a 2-2 composite structure having a piezoelectric characteristic of a 2-2 vibration mode, and thus, may have a resonance frequency of 20 kHz or less, but embodiments of the present disclosure are not limited thereto. For example, a resonance frequency of the vibration layer 511*a* may vary based on at least one or more of a shape, a length, and a thickness, or the like of first portions 511*a*1.

In the vibration layer 511*a*, each of the plurality of first portions 511*a*1 and the plurality of second portions 511*a*2 may be disposed (or arranged) at the same plane (or the same layer) in parallel. Each of the plurality of second portions 511*a*2 may be configured to fill a gap between two adjacent first portions of the plurality of first portions 511*a*1, and thus, may be connected to or attached on the first portion 511*a*1 adjacent thereto. Therefore, the vibration layer 511*a* may be extended by a desired size or length based on a lateral coupling (or a lateral connection) of the first portion 511*a*1 and the second portion 511*a*2.

In the vibration layer 511*a*, a width W2 of each of the plurality of second portions 511*a*2 may progressively decrease in a direction from a center portion to both peripheries (or both ends) of the vibration layer 511*a* or the vibration device 500.

According to an embodiment of the present disclosure, a second portion 511*a*2, having a largest width W2 of the plurality of second portions 511*a*2, may be located at a portion at which a highest stress may concentrate when the vibration layer 511*a* or the vibration device 500 is vibrating in a vertical direction Z (or a thickness direction). A second portion 511*a*2, having a smallest width W2 of the plurality of second portions 511*a*2, may be located at a portion where a relatively low stress may occur when the vibration layer 511*a* or the vibration device 500 is vibrating in the vertical direction Z. For example, the second portion 511*a*2, having the largest width W2 of the plurality of second portions 511*a*2, may be disposed at the center portion of the vibration layer 511*a*, and the second portion 511*a*2, having the smallest width W2 of the plurality of second portions 511*a*2 may be disposed at each of the both peripheries of the vibration layer 511*a*. Therefore, when the vibration layer 511*a* or the vibration device 500 is vibrating in the vertical direction Z, interference of a sound wave or overlapping of a resonance frequency, each occurring in the portion on which the highest stress concentrates, may be reduced or minimized. Thus, dipping phenomenon of a sound pressure level occurring in the low-pitched sound band may be reduced, thereby improving a flatness of a sound characteristic in the low-pitched sound band. For example, a flatness of a sound characteristic may be a level of a deviation between a highest sound pressure level and a lowest sound pressure level.

In the vibration layer 511*a*, each of the plurality of first portions 511*a*1 may have different sizes (or widths). For example, a size (or a width) of each of the plurality of first portions 511*a*1 may progressively decrease or increase in a direction from the center portion to the both peripheries (or both ends) of the vibration layer 511*a* or the vibration device 500. For example, in the vibration layer 511*a*, a sound pressure level characteristic of a sound may be enhanced and a sound reproduction band may increase or be expanded, based on various natural vibration frequencies according to a vibration of each of the plurality of first portions 511*a*1 having different sizes.

The plurality of second portions 511*a*2 may be disposed between the plurality of first portions 511*a*1. Therefore, in the vibration layer 511*a* or the vibration device 500, vibration energy by a link in a unit lattice of each first portion 511*a*1 may increase by a corresponding second portion 511*a*2, and thus, a vibration characteristic may increase, and a piezoelectric characteristic and flexibility may be secured. For example, the second portion 511*a*2 may be one or more of an epoxy-based polymer, an acrylic-based polymer, and a silicone-based polymer, but embodiments of the present disclosure are not limited thereto.

The plurality of second portions 511*a*2 according to an embodiment of the present disclosure may be configured as an organic material portion. For example, the organic material portion may be disposed between the inorganic material portions, and thus, may absorb an impact applied to the inorganic material portion (or the first portion), may release a stress concentrating on the inorganic material portion to enhance the total durability of the vibration layer 511*a* or the vibration device 500, and may provide flexibility to the vibration layer 511*a* or the vibration device 500. Thus, the vibration device 500 may be configured to have flexibility.

The plurality of second portions 511*a*2 according to an embodiment of the present disclosure may have modulus (or Young's modulus) and viscoelasticity that are lower in comparison with the first portions 511*a*1, and thus, the second portion 511*a*2 may enhance the reliability of each first portion 511*a*1 vulnerable to an impact due to a fragile characteristic. For example, the second portion 511*a*2 may be configured as a material having a loss coefficient of about 0.01 to about 1 and modulus of about 0.1 GPa (Giga Pascal) to about 10 GPa (Giga Pascal).

The organic material portion configured at the second portion 511*a*2 may include an organic material, an organic polymer, an organic piezoelectric material, or an organic non-piezoelectric material that has a flexible characteristic in comparison with the inorganic material portion of the first portions 511*a*1. For example, the second portion 511*a*2 may be referred to as an adhesive portion, an elastic portion, a bending portion, a damping portion, a ductility portion, or a flexible portion, or the like having flexibility, but embodiments of the present disclosure are not limited thereto.

The plurality of first portions 511*a*1 and the second portion 511*a*2 may be disposed on (or connected to) the same plane, and thus, the vibration layer 511*a* according to an embodiment of the present disclosure may have a single thin film type. For example, the vibration layer 511*a* may have a structure in which a plurality of first portions 511*a*1 are connected to one side (or one portion). For example, the plurality of first portions 511*a*1 may have a connection structure throughout the vibration layer 511*a*. For example, the vibration layer 511*a* may be vibrated in a vertical direction by the first portion 511*a*1 having a vibration characteristic and may be bent in a curved shape by the second portion 511*a*2 having flexibility. And, in the vibration layer 511*a* according to an embodiment of the present disclosure, a size of the first portion 511*a*1 and a size of the second portion 511*a*2 may be adjusted based on a piezoelectric characteristic and flexibility needed for the vibration layer 511*a* or the vibration device 500. As an embodiment of the present disclosure, when the vibration layer 511*a* needs a piezoelectric characteristic rather than flexibility, a size of the first portion 511*a*1 may be configured to be greater than that of the second portion 511*a*2. As another embodiment of the present disclosure, when the vibration layer 511*a* needs flexibility rather than a piezoelectric characteristic, a size of the second portion 511*a*2 may be configured to be greater than that of the first portion 511*a*1. Accordingly, a size of the vibration layer 511*a* may be adjusted based on a characteristic needed therefor, and thus, the vibration layer 511*a* may be easy to design.

The first electrode layer 511*b* may be disposed at a first surface (or an upper surface) of the vibration layer 511*a*. The first electrode layer 511*b* may be disposed at or coupled (or connected) to a first surface of each of the plurality of first portions 511*a*1 and a first surface of each of the plurality of second portions 511*a*2 in common and may be electrically connected to the first surface of each of the plurality of first portions 511*a*1. For example, the first electrode layer 511*b* may have a single-body electrode (or one electrode) shape which is disposed at an entire first surface of the vibration layer 511*a*. For example, the first electrode layer 511*b* may have substantially the same shape as that of the vibration layer 511*a*, but embodiments of the present disclosure are not limited thereto.

The second electrode layer 511*c* may be disposed at a second surface (or a rear surface) different from (or opposite to) the first surface of the vibration layer 511*a*. The second electrode layer 511*c* may be disposed at or coupled to a second surface of each of the plurality of first portions 511*a*1 and a second surface of each of the plurality of second portions 511*a*2 in common and may be electrically connected to the second surface of each of the plurality of first portions 511*a*1. For example, the second electrode layer 511*c* may have a single-body electrode (or one electrode) shape which is disposed at an entire second surface of the vibration layer 511*a*. For example, the second electrode layer 511*c* may have the same shape as the vibration layer 511*a*, but embodiments of the present disclosure are not limited thereto.

One or more of the first electrode layer 511*b* and the second electrode layer 511*c* according to an embodiment of the present disclosure may be formed of a transparent conductive material, a semitransparent conductive material, or an opaque conductive material. For example, the transparent conductive material or the semitransparent conductive material may include indium tin oxide (ITO) or indium zinc oxide (IZO), but embodiments of the present disclosure are not limited thereto. The opaque conductive material may include aluminum (Al), copper (Cu), gold (Au), silver (Ag), molybdenum (Mo), or a magnesium (Mg), or the like, or an alloy thereof, but embodiments of the present disclosure are not limited thereto.

The vibration layer 511*a* may be polarized (or poling) by a certain voltage applied to the first electrode layer 511*b* and the second electrode layer 511*c* in a certain temperature atmosphere, or a temperature atmosphere that may be changed from a high temperature to a room temperature, but embodiments of the present disclosure are not limited thereto. For example, the vibration layer 511*a* may alternately and repeatedly contract and/or expand based on an inverse piezoelectric effect according to a sound signal (or a voice signal or a driving signal) applied to the first electrode layer 511*b* and the second electrode layer 511*c* from the outside to vibrate. For example, the vibration layer 511*a* may vibrate based on a vibration of a vertical direction and a vibration of a planar direction by the sound signal applied to the first electrode layer 511*b* and the second electrode layer 511*c*. The vibration layer 511*a* may increase the displacement of a vibration member by contraction and/or expansion of the planar direction, thereby further improving the vibration of the vibration member.

The vibration device 500 according to an embodiment of the present disclosure may further include a first cover member 512 and a second cover member 513.

The first cover member 512 may be disposed at a first surface of the vibration part 511. For example, the first cover member 512 may be configured to cover the first electrode layer 511*b*. Accordingly, the first cover member 512 may protect the first electrode layer 511*b*.

The second cover member 513 may be disposed at a second surface of the vibration part 511. For example, the second cover member 513 may be configured to cover the second electrode layer 511*c*. Accordingly, the second cover member 513 may protect the second electrode layer 511*c*.

Each of the first cover member 512 and the second cover member 513 according to an embodiment of the present disclosure may include one or more material of plastic, fiber, leather, wood, cloth, rubber, carbon, glass, and paper, but embodiments of the present disclosure are not limited thereto. For example, each of the first cover member 512 and the second cover member 513 may include the same material or different material. For example, each of the first cover member 512 and the second cover member 513 may be a polyimide film or a polyethylene terephthalate film, but embodiments of the present disclosure are not limited thereto.

The first cover member 512 according to an embodiment of the present disclosure may be connected or coupled to the first electrode layer 511*b* by a first adhesive layer 514. For example, the first cover member 512 may be connected or coupled to the first electrode layer 511*b* by a film laminating process by the first adhesive layer 514.

The second cover member 513 according to an embodiment of the present disclosure may be connected or coupled to the second electrode layer 511*c* by a second adhesive layer 515. For example, the second cover member 513 may be connected or coupled to the second electrode layer 511*c* by a film laminating process by the second adhesive layer 515. For example, the vibration device 500 may be implemented as one film by the first cover member 512 and the second cover member 513.

The first adhesive layer 514 may be disposed between the first electrode layer 511*b* and the first cover member 512. The second adhesive layer 515 may be disposed between the second electrode layer 511*c* and the second cover member 513. For example, the first adhesive layer 514 and second adhesive layer 515 may be configured between the first cover member 512 and the second cover member 513 to surround the vibration layer 511*a*, the first electrode layer 511*b*, and the second electrode layer 511*c*. For example, the first adhesive layer 514 and second adhesive layer 515 may be configured between the first cover member 512 and the second cover member 513 to completely surround the vibration layer 511*a*, the first electrode layer 511*b*, and the second electrode layer 511*c*. For example, the vibration layer 511*a*, the first electrode layer 511*b*, and the second electrode layer 511*c* may be embedded or built-in between the first adhesive layer 514 and the second adhesive layer 515.

Each of the first adhesive layer 514 and second adhesive layer 515 according to an embodiment of the present disclosure may include an electrically insulating material which has adhesiveness and is capable of compression and decompression. For example, each of the first adhesive layer 514 and the second adhesive layer 515 may include an epoxy resin, an acrylic resin, a silicone resin, or a urethane resin, but embodiments of the present disclosure are not limited thereto.

The vibration device 500 according to an embodiment of the present disclosure may further include a first power supply line PL1 disposed at the first cover member 512, a second power supply line PL2 disposed at the second cover member 513, and a pad part 516 electrically connected to the first power supply line PL1 and the second power supply line PL2.

The first power supply line PL1 may be disposed between the first electrode layer 511*b* and the first cover member 512 and may be electrically connected to the first electrode layer 511*b*. The first power supply line PL1 may be extended long along the second direction Y and may be electrically connected to a central portion of the first electrode layer 511*b*. As an embodiment of the present disclosure, the first power supply line PL1 may be electrically connected to the first electrode layer 511*b* by an anisotropic conductive film. As another embodiment of the present disclosure, the first power supply line PL1 may be electrically connected to the first electrode layer 511*b* through a conductive material (or particle) included in the first adhesive layer 514.

The second power supply line PL2 may be disposed between the second electrode layer 511*c* and the second cover member 513 and may be electrically connected to the second electrode layer 511*c*. The second power supply line PL2 may be extended long along the second direction Y and may be electrically connected to a central portion of the second electrode layer 511*c*. As an embodiment of the present disclosure, the second power supply line PL2 may be electrically connected to the second electrode layer 511*c* by an anisotropic conductive film. As another embodiment of the present disclosure, the second power supply line PL2 may be electrically connected to the second electrode layer 511*c* through a conductive material (or particle) included in the second adhesive layer 515.

According to an embodiment of the present disclosure, the first power supply line PL1 may be disposed not to overlap the second power supply line PL2. When the first power supply line PL1 is disposed not to overlap the second power supply line PL2, a short circuit between the first power supply line PL1 and the second power supply line PL2 may be prevented.

The pad part 516 may be configured at one periphery portion of any one of the first cover member 512 and the second cover member 513 to be electrically connected to one portion (or one end) of each of the first power supply line PL1 and the second power supply line PL2.

The pad part 516 according to an embodiment of the present disclosure may include a first pad electrode electrically connected to the one end of the first power supply line PL1, and a second pad electrode electrically connected to the one end of the second power supply line PL2.

The first pad electrode may be disposed at one periphery portion of any one of the first cover member 512 and the second cover member 513 to be electrically connected to the one end of the first power supply line PL1. For example, the first pad electrode may pass through any one of the first cover member 512 and the second cover member 513 to be electrically connected to the one end of the first power supply line PL1.

The second pad electrode may be disposed in parallel with the first pad electrode to be electrically connected to the one end of the second power supply line PL2. For example, the second pad electrode may pass through any one of the first cover member 512 and the second cover member 513 to be electrically connected to the one end of the second power supply line PL2.

According to an embodiment of the present disclosure, each of the first power supply line PL1, the second power supply line PL2, and the pad part 516 may be configured to be transparent, translucent, or opaque.

The pad part 516 according to an embodiment of the present disclosure may be electrically connected to a signal cable 517.

The signal cable 517 may be electrically connected to the pad part 516 disposed at the vibration device 500 and may supply the vibration device 500 with a vibration driving signal (or a sound signal or a voice signal) provided from a sound processing circuit. The signal cable 517 according to an embodiment of the present disclosure may include a first terminal electrically connected to the first pad electrode of the pad part 516 and a second terminal electrically connected to the second pad electrode of the pad part 516. For example, the signal cable 517 may be a flexible printed circuit cable, a flexible flat cable, a single-sided flexible printed circuit, a single-sided flexible printed circuit board, a flexible multilayer printed circuit, or a flexible multilayer printed circuit board, but embodiments of the present disclosure are not limited thereto.

The sound processing circuit may generate a vibration driving signal of an alternating current (AC) type including a first vibration driving signal and a second vibration driving signal based on a sound data provided from an external sound data generating circuit part. The first vibration driving signal may be any one of a positive (+) vibration driving signal and a negative (−) vibration driving signal, and the second vibration driving signal may be any one of a positive (+) vibration driving signal and a negative (−) vibration driving signal. For example, the first vibration driving signal may be supplied to the first electrode layer 511*b* through the first terminal of the signal cable 517, the first pad electrode of the pad part 516, and the first power supply line PL1. The second vibration driving signal may be supplied to the second electrode layer 511*c* through the second terminal of the signal cable 517, the second pad electrode of the pad part 516, and the second power supply line PL2.

According to an embodiment of the present disclosure, the signal cable 517 may be configured to be transparent, semitransparent, or opaque.

The vibration device 500 according to an embodiment of the present disclosure may be implemented as a thin film type, where the first portion 511*a*1 having a piezoelectric characteristic and a second portion 511*a*2 having flexibility are alternately repeated and connected. Accordingly, in the vibration device 500 according to an embodiment of the present disclosure, a vibration width (or a displacement width) may be increased due to the flexible second portion 511*a*2 having flexibility. Thus, a sound characteristic and/or a sound pressure level characteristic of a low-pitched sound band generated based on a vibration of the vibration member may be enhanced.

Figure 37:
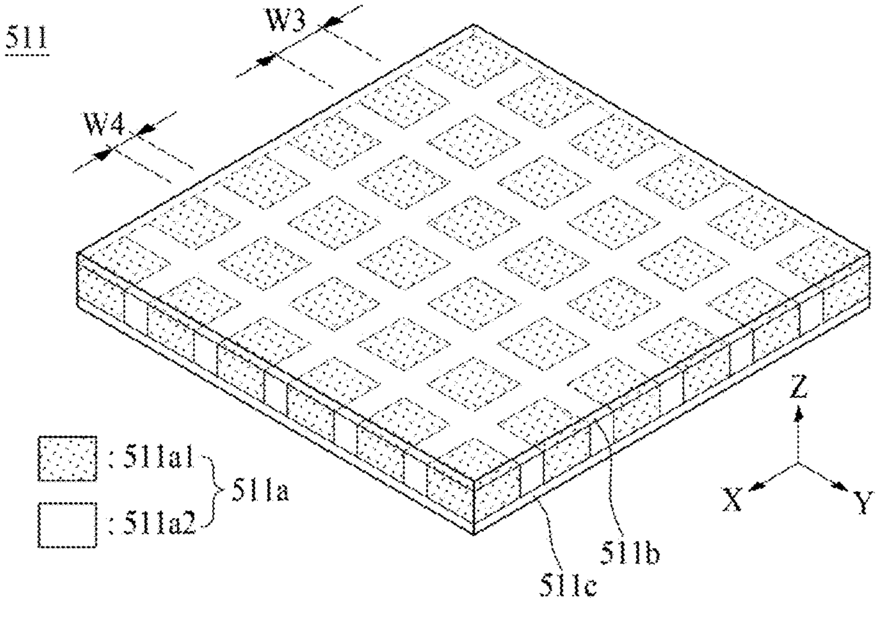
FIG. 37 illustrates a vibration device illustrated in FIG. 36 according to another embodiment of the present disclosure.

FIG. 37 illustrates a vibration part illustrated in FIG. 36 according to another embodiment of the present disclosure.

With reference to FIG. 37, the vibration layer 511*a* according to another embodiment of the present disclosure may include a plurality of first portions 511*a*1, which are spaced apart from one another along each of a first direction X and a second direction Y, and a second portion 511*a*2 disposed between the plurality of first portions 511*a*1.

Each of the plurality of first portions 511*a*1 may be disposed to be spaced apart from one another along each of the first direction X and the second direction Y. For example, each of the plurality of first portions 511*a*1 may have a hexahedral shape having the same size and may be disposed in a lattice shape. Each of the plurality of first portions 511*a*1 may include a piezoelectric material which may be substantially the same as the first portion 511*a*1 described above with reference to FIGS. 34 to 36, and thus, like reference numeral refer to like element and the repetitive description thereof may be omitted.

The second portion 511*a*2 may be disposed between the plurality of first portions 511*a*1 along each of the first direction X and the second direction Y. The second portion 511*a*2 may be configured to fill a gap between two adjacent first portions 511*a*1 or to surround each of the plurality of first portions 511*a*1, and thus, may be connected to or attached on an adjacent first portion 511*a*1. According to an embodiment of the present disclosure, a width W4 of a second portion 511*a*2 disposed between two first portions 511*a*1 adjacent to each other along the first direction X may be the same as or different from that of a width W3 of the first portion 511*a*1, and the width W4 of a second portion 511*a*2 disposed between two first portions 511*a*1 adjacent to each other along the second direction Y may be the same as or different from that of the width W3 of the first portion 511*a*1. The second portion 511*a*2 may include an organic material which may be substantially the same as the second portion 511*a*2 described above with reference to FIGS. 34 to 36, and thus, like reference numeral refer to like element and the repetitive description thereof may be omitted.

The vibration layer 511*a* according to another embodiment of the present disclosure may include a 1-3 composite structure having a piezoelectric characteristic of a 1-3 vibration mode, and thus, may have a resonance frequency of 30 MHz or less, but embodiments of the present disclosure are not limited thereto. For example, a resonance frequency of the vibration layer 511*a* may vary based on at least one or more of a shape, a length, and a thickness, or the like of the first portion 511*a*1.

Figure 38:
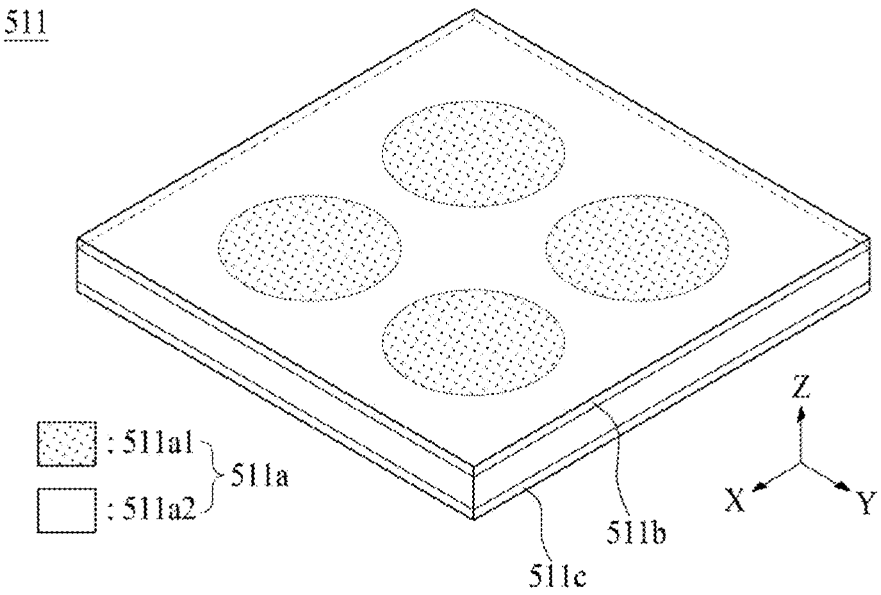
FIG. 38 illustrates a vibration device illustrated in FIG. 36 according to another embodiment of the present disclosure.

FIG. 38 illustrates a vibration part illustrated in FIG. 36 according to another embodiment of the present disclosure.

With reference to FIG. 38, the vibration layer 511*a* according to another embodiment of the present disclosure may include a plurality of first portions 511*a*1, which are spaced apart from one another along each of a first direction X and a second direction Y, and a second portion 511*a*2 disposed between the plurality of first portions 511*a*1.

Each of the plurality of first portions 511*a*1 may have a flat structure of a circular shape. For example, each of the plurality of first portions 511*a*1 may have a circular plate shape, but embodiments of the present disclosure are not limited thereto. For example, each of the plurality of first portions 511*a*1 may have a dot shape including an oval shape, a polygonal shape, or a donut shape, or the like. Each of the plurality of first portions 511*a*1 may include a piezoelectric material which may be substantially the same as the first portion 511*a*1 described above with reference to FIGS. 34 to 36, and thus, like reference numeral refer to like element and the repetitive description thereof may be omitted.

The second portion 511*a*2 may be disposed between the plurality of first portions 511*a*1 along each of the first direction X and the second direction Y. The second portion 511*a*2 may be configured to surround each of the plurality of first portions 511*a*1, and thus, may be connected to or attached on a lateral surface of each of the plurality of first portions 511*a*1. Each of the plurality of first portions 511*a*1 and the second portion 511*a*2 may be disposed (or arranged) in parallel on the same plane (or the same layer). The second portion 511*a*2 may include an organic material which may be substantially the same as the second portion 511*a*2 described above with reference to FIGS. 34 to 36, and thus, like reference numeral refer to like element and the repetitive description thereof may be omitted.

Figure 39:
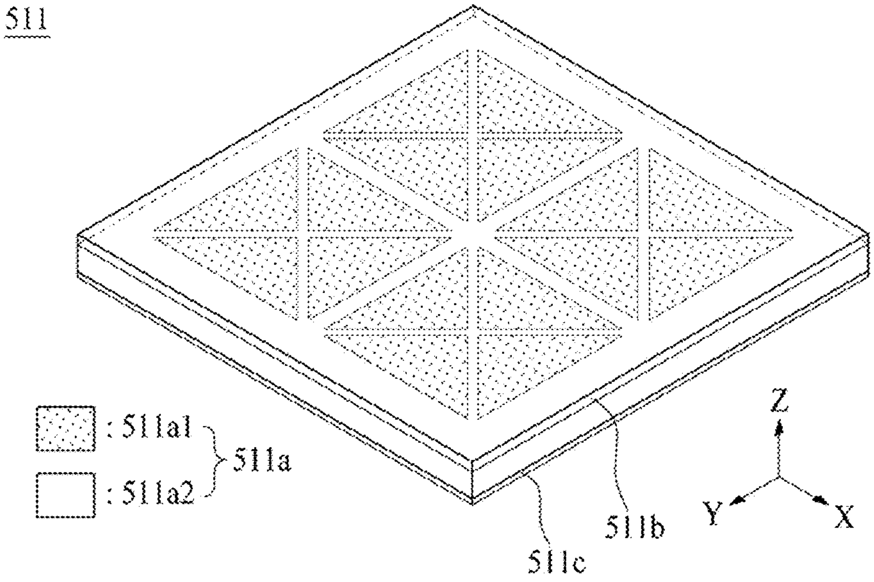
FIG. 39 illustrates a vibration device illustrated in FIG. 36 according to another embodiment of the present disclosure.

FIG. 39 illustrates a vibration part illustrated in FIG. 36 according to another embodiment of the present disclosure.

With reference to FIG. 39, the vibration layer 511*a* according to another embodiment of the present disclosure may include a plurality of first portions 511*a*1, which are spaced apart from one another along each of a first direction X and a second direction Y, and a second portion 511*a*2 disposed between the plurality of first portions 511*a*1.

Each of the plurality of first portions 511*a*1 may have a flat structure of a triangular shape. For example, each of the plurality of first portions 511*a*1 may have a triangular plate shape. Each of the plurality of first portions 511*a*1 may include a piezoelectric material which may be substantially the same as the first portion 511*a*1 described above with reference to FIGS. 34 to 36, and thus, like reference numeral refer to like element and the repetitive description thereof may be omitted.

According to an embodiment of the present disclosure, four adjacent first portions 511*a*1 of the plurality of first portions 511*a*1 may be disposed adjacent to one another to form a tetragonal shape (or a square shape). Vertices of the four adjacent first portions 511*a*1 forming the tetragonal shape may be disposed adjacent to one another at a center portion (or a central portion) of the tetragonal shape.

The second portion 511*a*2 may be disposed between the plurality of first portions 511*a*1 along each of the first direction X and the second direction Y. The second portion 511*a*2 may be configured to surround each of the plurality of first portions 511*a*1, and thus, may be connected to or attached on a lateral surface of each of the plurality of first portions 511$a$1. Each of the plurality of first portions 511$a$1 and the second portion 511$a$2 may be disposed (or arranged) in parallel on the same plane (or the same layer). The second portion 511$a$2 may include an organic material which may be substantially the same as the second portion 511$a$2 described above with reference to FIGS. 34 to 36, and thus, like reference numeral refer to like element and the repetitive description thereof may be omitted.

According to another embodiment of the present disclosure, 2N (where N is a natural number greater than or equal to 2) adjacent first portions 511$a$1 of the plurality of first portions 511$a$1 having the triangular shape may be disposed adjacent to one another to form a 2N-angular shape. For example, six adjacent first portions 511$a$1 of the plurality of first portions 511$a$1 may be disposed adjacent to one another to form a hexagonal shape (or a regularly hexagonal shape). Vertices of the six adjacent first portions 511$a$1 forming a hexagonal shape may be disposed adjacent to one another in a center portion (or a central portion) of the hexagonal shape. The second portion 511$a$2 may be configured to surround each of the plurality of first portions 511$a$1, and thus, may be connected to or attached on a side surface of each of the plurality of first portions 511$a$1. Each of the plurality of first portions 511$a$1 and the second portion 511$a$2 may be disposed (or arranged) in parallel on the same plane (or the same layer).

Figure 40:
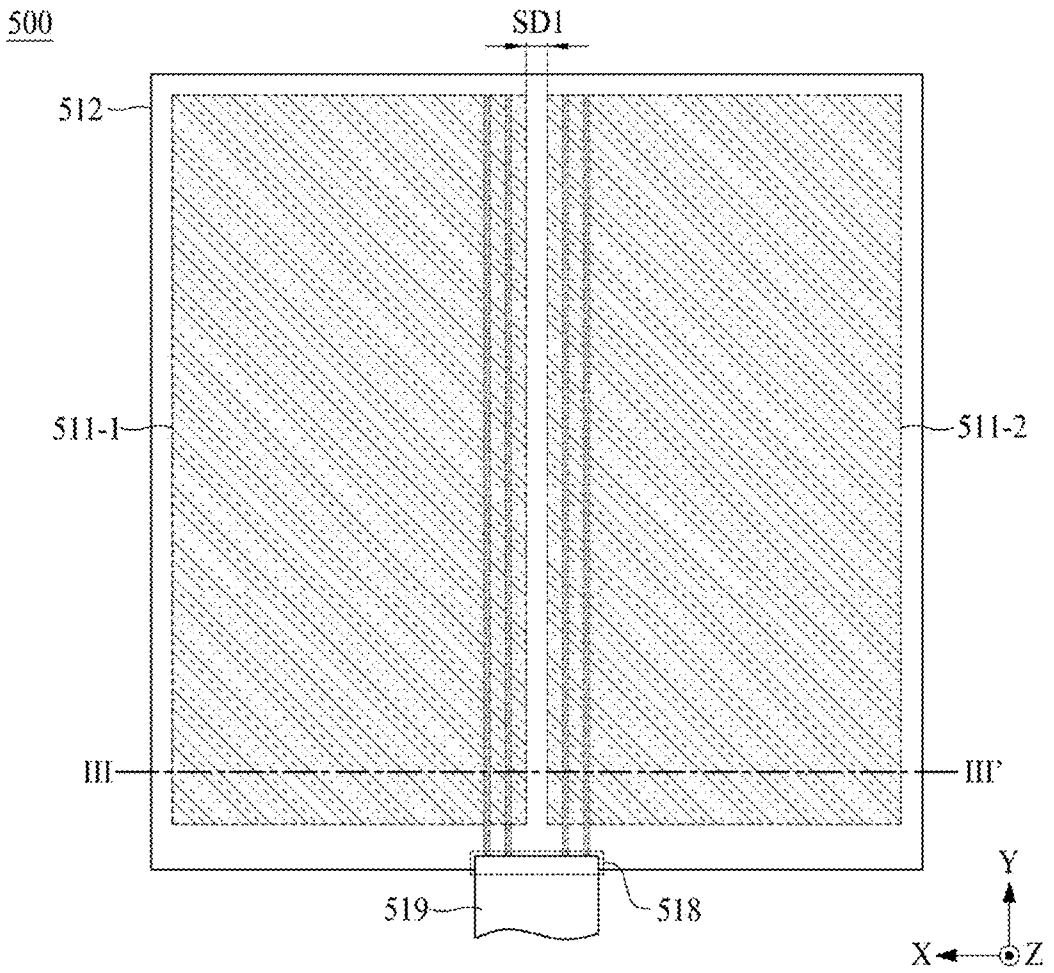
FIG. 40 illustrates a vibration device according to another embodiment of the present disclosure.
Figure 41:
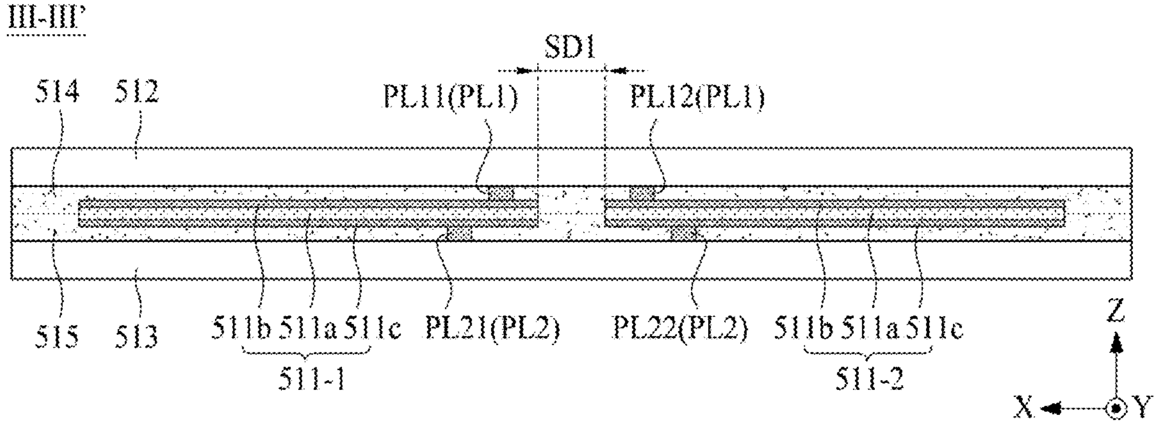
FIG. 41 is a cross-sectional view taken along line III-III' illustrated in FIG. 40 according to another embodiment of the present disclosure.

FIG. 40 illustrates a vibration device according to another embodiment of the present disclosure. FIG. 41 is a cross-sectional view taken along line III-III' illustrated in FIG. 40 according to another embodiment of the present disclosure. FIGS. 40 and 41 illustrate another embodiment of one or more vibration device described with reference to FIGS. 1 to 33.

With reference to FIGS. 40 and 41, a vibration device 500 according to another embodiment of the present disclosure may include at least two or more vibration parts. The vibration device 500 according to another embodiment of the present disclosure may include first and second vibration parts 511-1 and 511-2.

Each of the first and second vibration parts 511-1 and 511-2 may be electrically separated and disposed while being spaced apart from each other along a first direction X. Each of the first and second vibration parts 511-1 and 511-2 may alternately and repeatedly contract and/or expand based on a piezoelectric effect to vibrate. For example, the first and second vibration parts 511-1 and 511-2 may be disposed or tiled at a certain separation distance SD1 along the first direction X. Thus, the vibration device 500 in which the first and second vibration parts 511-1 and 511-2 are tiled may be a vibration array, a vibration array portion, a vibration module array portion, a vibration array structure, a tiling vibration array, a tiling vibration array module, or a tiling vibration film.

Each of the first and second vibration parts 511-1 and 511-2 according to an embodiment of the present disclosure may have a tetragonal shape. For example, each of the first and second vibration parts 511-1 and 511-2 may have a tetragonal shape having a width of about 5 cm or more. For example, each of the first and second vibration parts 511-1 and 511-2 may have a square shape having a size of 5 cm×5 cm or more, but embodiments of the present disclosure are not limited thereto.

Each of the first and second vibration parts 511-1 and 511-2 may be disposed or tiled on the same plane, and thus, the vibration device 500 may have an enlarged area by tiling of the first and second vibration parts 511-1 and 511-2 having a relatively small size.

Each of the first and second vibration parts 511-1 and 511-2 may be disposed or tiled to have a certain separation distance SD1, and thus, may be implemented as one vibration apparatus (or a single vibration apparatus) which is driven as one complete single-body without being independently driven. According to an embodiment of the present disclosure, with respect to the first direction X, the separation distance SD1 between the first and second vibration parts 511-1 and 511-2 may be 0.1 mm or more and less than 3 cm, but embodiments of the present disclosure are not limited thereto.

According to an embodiment of the present disclosure, each of the first and second vibration parts 511-1 and 511-2 may be disposed or tiled to have the separation distance (or an interval) SD1 of 0.1 mm or more and less than 3 cm, and thus, may be driven as one vibration apparatus, thereby increasing a reproduction band of a sound and a sound pressure level characteristic of a sound which is generated based on a single-body vibration of the first and second vibration parts 511-1 and 511-2. For example, the first and second vibration parts 511-1 and 511-2 may be disposed in the separation distance SD1 of 0.1 mm or more and less than 5 mm, in order to increase a reproduction band of a sound generated based on a single-body vibration of the first and second vibration parts 511-1 and 511-2 and to increase a sound of a low-pitched sound band (For example, a sound pressure level characteristic in 500 Hz or less).

According to an embodiment of the present disclosure, when the first and second vibration parts 511-1 and 511-2 are disposed with the separation distance SD1 of less than 0.1 mm or without the separation distance SD1, the reliability of the first and second vibration parts 511-1 and 511-2 or the vibration device 500 may be reduced due to damage or a crack caused by a physical contact therebetween which occurs when each of the first and second vibration parts 511-1 and 511-2 vibrates.

According to an embodiment of the present disclosure, when the first and second vibration parts 511-1 and 511-2 are disposed with the separation distance SD1 of 3 cm or more, the first and second vibration parts 511-1 and 511-2 may not be driven as one vibration apparatus due to an independent vibration of each of the first and second vibration parts 511-1 and 511-2. Therefore, a reproduction band of a sound and a sound pressure level characteristic of a sound which is generated based on vibrations of the first and second vibration parts 511-1 and 511-2 may be reduced. For example, when the first and second vibration parts 511-1 and 511-2 are disposed with the separation distance SD1 of 3 cm or more, a sound characteristic and a sound pressure level characteristic of the low-pitched sound band (For example, in 500 Hz or less) may each be reduced.

According to an embodiment of the present disclosure, when the first and second vibration parts 511-1 and 511-2 are disposed with the separation distance SD1 of 5 mm, each of the first and second vibration parts 511-1 and 511-2 may not be driven as one vibration apparatus, and thus, a sound characteristic and a sound pressure level characteristic of the low-pitched sound band (For example, in 200 Hz or less) may each be reduced.

According to another embodiment of the present disclosure, when the first and second vibration parts 511-1 and 511-2 are disposed with the separation distance SD1 of 1 mm, each of the first and second vibration parts 511-1 and 511-2 may be driven as one vibration apparatus, and thus, a reproduction band of a sound may increase and a sound of the low-pitched sound band (For example, a sound pressure level characteristic in 500 Hz or less) may increase. For example, when the first and second vibration parts 511-1 and 511-2 are disposed with the separation distance SD1 of 1 mm, the vibration device 500 may be implemented as a large-area vibrator which is enlarged based on optimization of a separation distance between the first and second vibration parts 511-1 and 511-2. Therefore, the vibration device 500 may be driven as a large-area vibrator based on a single-body vibration of the first and second vibration parts 511-1 and 511-2, and thus, a sound characteristic and a sound pressure level characteristic may each increase a reproduction band of a sound and in the low-pitched sound band generated based on a large-area vibration of the vibration device 500.

Therefore, to implement a single-body vibration (or one vibration apparatus) of the first and second vibration parts 511-1 and 511-2, the separation distance SD1 between the first and second vibration parts 511-1 and 511-2 may be adjusted to 0.1 mm or more and less than 3 cm. And, to implement a single-body vibration (or one vibration apparatus) of the first and second vibration parts 511-1 and 511-2 and to increase a sound pressure level characteristic of a sound of the low-pitched sound band, the separation distance SD1 between the first and second vibration parts 511-1 and 511-2 may be adjusted to 0.1 mm or more and less than 5 mm.

Each of the first and second vibration parts 511-1 and 511-2 according to an embodiment of the present disclosure may include a vibration layer 511*a*, a first electrode layer 511*b*, and a second electrode layer 511*c*.

The vibration layer 511*a* of each of the first and second vibration parts 511-1 and 511-2 may include a piezoelectric material (or an electroactive material) which includes a piezoelectric effect. For example, the vibration layer 511*a* of each of the first and second vibration parts 511-1 and 511-2 may be configured substantially the same as any one of the vibration layer 511*a* described above with reference to FIGS. 34 to 39, and thus, like reference numeral refer to like element and the repetitive description thereof may be omitted.

According to an embodiment of the present disclosure, each of the first and second vibration parts 511-1 and 511-2 may include any one vibration part of the vibration part 511 described above with reference to FIGS. 11 to 16, or may include different vibration part 511.

The first electrode layer 511*b* may be disposed at a first surface of the vibration layer 511*a* and electrically connected to the first surface of the vibration layer 511*a*. The first electrode layer 511*b* may be substantially the same as the first electrode layer 511*b* described above with reference to FIGS. 34 to 39, and thus, like reference numeral refer to like element and the repetitive description thereof may be omitted.

The second electrode layer 511*c* may be disposed at a second surface of the vibration layer 511*a* and electrically connected to the second surface of the vibration layer 511*a*. The second electrode layer 511*c* may be substantially the same as the second electrode layer 511*c* described above with reference to FIGS. 34 to 39, and thus, like reference numeral refer to like element and the repetitive description thereof may be omitted.

The vibration device 500 according to another embodiment of the present disclosure may further include a first cover member 512 and a second cover member 513.

The first cover member 512 may be disposed at a first surface of the vibration device 500. For example, the first cover member 512 may cover the first electrode layer 511*b* which is disposed at a first surface of each of the first and second vibration parts 511-1 and 511-2, and thus, the first cover member 512 may be connected to the first surface of each of the first and second vibration parts 511-1 and 511-2 in common or may support the first surface of each of the first and second vibration parts 511-1 and 511-2 in common. Accordingly, the first cover member 512 may protect the first surface or the first electrode layer 511*b* of each of the first and second vibration parts 511-1 and 511-2.

The second cover member 513 may be disposed at a second surface of the vibration device 500. For example, the second cover member 513 may cover the second electrode layer 511*c* which is disposed at a second surface of each of the first and second vibration parts 511-1 and 511-2, and thus, the second cover member 513 may be connected to the second surface of each of the first and second vibration parts 511-1 and 511-2 in common or may support the second surface of each of the first and second vibration parts 511-1 and 511-2 in common. Accordingly, the second cover member 513 may protect the second surface or the second electrode layer 511*c* of each of the first and second vibration parts 511-1 and 511-2.

Each of the first cover member 512 and the second cover member 513 according to an embodiment of the present disclosure may include one or more material of plastic, fiber, leather, rubber, wood, cloth, carbon, and paper, but embodiments of the present disclosure are not limited thereto. For example, each of the first cover member 512 and the second cover member 513 may include the same material or different material. For example, each of the first cover member 512 and the second cover member 513 may be a polyimide film or a polyethylene terephthalate film, but embodiments of the present disclosure are not limited thereto.

The first cover member 512 according to an embodiment of the present disclosure may be disposed at the first surface of each of the first and second vibration parts 511-1 and 511-2 by a first adhesive layer 514. For example, the first cover member 512 may be directly disposed at the first surface of each of the first and second vibration parts 511-1 and 511-2 by a film laminating process by the first adhesive layer 514. Accordingly, each of the first and second vibration parts 511-1 and 511-2 may be integrated (or disposed) or tiled with the first cover member 512 to have a certain separation distance SD1.

The second cover member 513 according to an embodiment of the present disclosure may be disposed at the second surface of each of the first and second vibration parts 511-1 and 511-2 by a second adhesive layer 515. For example, the second cover member 513 may be directly disposed at the second surface of each of the first and second vibration parts 511-1 and 511-2 by a film laminating process by the second adhesive layer 515. Accordingly, each of the first and second vibration parts 511-1 and 511-2 may be integrated (or disposed) or tiled with the second cover member 513 to have the certain separation distance SD1. For example, the vibration device 500 may be implemented as one film(or one vibrator) by the first cover member 512 and the second cover member 513.

The first adhesive layer 514 may be disposed between the first and second vibration parts 511-1 and 511-2 and disposed at the first surface of each of the first and second vibration parts 511-1 and 511-2. For example, the first adhesive layer 514 may be formed at a rear surface (or an inner surface) of the first cover member 512 facing the first surface of each of the first and second vibration parts 511-1 and 511-2, filled between the first and second vibration parts 511-1 and 511-2, and disposed between the first cover member 512 and the first surface of each of the first and second vibration parts 511-1 and 511-2.

The second adhesive layer 515 may be disposed between the first and second vibration parts 511-1 and 511-2 and disposed at the second surface of each of the first and second vibration parts 511-1 and 511-2. For example, the second adhesive layer 515 may be formed at a front surface (or an inner surface) of the second cover member 513 facing the second surface of each of the first and second vibration parts 511-1 and 511-2, filled between the first and second vibration parts 511-1 and 511-2, and disposed between the second cover member 513 and the second surface of each of the first and second vibration parts 511-1 and 511-2.

The first and second adhesive layers 514 and 515 may be connected or coupled to each other between the first and second vibration parts 511-1 and 511-2. Therefore, each of the first and second vibration parts 511-1 and 511-2 may be surrounded by the first and second adhesive layers 514 and 515. For example, the first and second adhesive layers 514 and 515 may be configured between the first cover member 512 and the second cover member 513 to completely surround the first and second vibration parts 511-1 and 511-2. For example, each of the first and second vibration parts 511-1 and 511-2 may be embedded or built-in between the first adhesive layer 514 and the second adhesive layer 515.

Each of the first and second adhesive layers 514 and 515 according to an embodiment of the present disclosure may include an electrically insulating material which has adhesiveness and is capable of compression and decompression. For example, each of the first and second adhesive layers 514 and 515 may include an epoxy resin, an acrylic resin, a silicone resin, or a urethane resin, but embodiments of the present disclosure are not limited thereto. Each of the first and second adhesive layers 514 and 515 may be configured to be transparent, translucent, or opaque.

The vibration device 500 according to another embodiment of the present disclosure may further include a first power supply line PL1 disposed at the first cover member 512, a second power supply line PL2 disposed at the second cover member 513, and a pad part 518 electrically connected to the first power supply line PL1 and the second power supply line PL2.

The first power supply line PL1 may be disposed at a rear surface of the first cover member 512 facing the first surface of each of the first and second vibration parts 511-1 and 511-2. The first power supply line PL1 may be connected or electrically and directly connected to the first electrode layer 511*b* of each of the first and second vibration parts 511-1 and 511-2. For example, the first power supply line PL1 may be electrically connected to the first electrode layer 511*b* of each of the first and second vibration parts 511-1 and 511-2 through an anisotropic conductive film or a conductive material (or particle) included in the first adhesive layer 514.

The first power supply line PL1 according to an embodiment of the present disclosure may include first and second upper power lines PL11 and PL12 disposed along a second direction Y. For example, the first upper power line PL11 may be connected or electrically and directly connected to the first electrode layer 511*b* of the first vibration part 511-1. The second upper power line PL12 may be connected or electrically and directly connected to the first electrode layer 511*b* of the second vibration part 511-2.

The second power supply line PL2 may be disposed at a front surface of the second cover member 513 facing the second surface of each of the first and second vibration parts 511-1 and 511-2. The second power supply line PL2 may be connected or electrically and directly connected to the second electrode layer 511*c* of each of the first and second vibration parts 511-1 and 511-2. For example, the second power supply line PL2 may be electrically connected to the second electrode layer 511*c* of each of the first and second vibration parts 511-1 and 511-2 through an anisotropic conductive film or a conductive material (or particle) included in the second adhesive layer 515.

The second power supply line PL2 according to an embodiment of the present disclosure may include first and second lower power lines PL21 and PL22 disposed along a second direction Y. The first lower power line PL21 may be electrically connected to the second electrode layer 511*c* of the first vibration part 511-1. For example, the first lower power line PL21 may be disposed not to overlap the first upper power line PL11. When the first lower power line PL21 is disposed not to overlap the first upper power line PL11, a short circuit between the first power supply line PL1 and the second power supply line PL2 may be prevented. The second lower power line PL22 may be electrically connected to the second electrode layer 511*c* of the second vibration part 511-2. For example, the second lower power line PL22 may be disposed not to overlap the second upper power line PL12. When the second lower power line PL22 is disposed not to overlap the second upper power line PL12, a short circuit between the first power supply line PL1 and the second power supply line PL2 may be prevented.

The pad part 518 may be configured at one periphery portion of any one of the first cover member 512 and the second cover member 513 to be electrically connected to one portion (or one end) of each of the first power supply line PL1 and the second power supply line PL2.

The pad part 518 according to an embodiment of the present disclosure may include a first pad electrode electrically connected to the one end of the first power supply line PL1, and a second pad electrode electrically connected to one end of the second power supply line PL2.

The first pad electrode may be connected to the one end of each of the first and second upper power lines PL11 and PL12 of the first power supply line PL1 in common. For example, the one end of each of the first and second upper power lines PL11 and PL12 may branch from the first pad electrode. The second pad electrode may be connected to the one end of each of the first and second lower power lines PL21 and PL22 of the second power supply line PL2 in common. For example, the one end of each of the first and second lower power lines PL21 and PL22 may branch from the second pad electrode.

The vibration device 500 according to another embodiment of the present disclosure may further include a signal cable 519.

The signal cable 519 may be electrically connected to the pad part 518 disposed at the vibration device 500 and may supply the vibration device 500 with a vibration driving signal (or a sound signal or a voice signal) provided from a sound processing circuit. The signal cable 519 according to an embodiment of the present disclosure may include a first terminal electrically connected to the first pad electrode of the pad part 518 and a second terminal electrically connected to the second pad electrode of the pad part 518. For example, the signal cable 519 may be a flexible printed circuit cable, a flexible flat cable, a single-sided flexible printed circuit, a single-sided flexible printed circuit board, a flexible multilayer printed circuit, or a flexible multilayer printed circuit board, but embodiments of the present disclosure are not limited thereto.

The sound processing circuit may generate a vibration driving signal of an alternating current (AC) type including a first vibration driving signal and a second vibration driving signal based on a sound data. The first vibration driving signal may be any one of a positive (+) vibration driving signal and a negative (−) vibration driving signal, and the second vibration driving signal may be any one of a positive (+) vibration driving signal and a negative (−) vibration driving signal. For example, the first vibration driving signal may be supplied to the first electrode layer 511*b* of each of the first and second vibration parts 511-1 and 511-2 through the first terminal of the signal cable 519, the first pad electrode of the pad part 518, and the first power supply line PL1. The second vibration driving signal may be supplied to the second electrode layer 511*c* of each of the first and second vibration parts 511-1 and 511-2 through the second terminal of the signal cable 519, the second pad electrode of the pad part 518, and the second power supply line PL2.

The vibration device 500 according to another embodiment of the present disclosure may be implemented as a thin film type. Accordingly, the vibration device 500 may be bent in a shape corresponding to a shape of the vibration member or the vibration object and may easily vibrate the vibration member including various curved portions, thereby enhancing a sound characteristic and/or a sound pressure level characteristic in the low-pitched sound band generated based on a vibration of the vibration member. And, the vibration device 500 according to another embodiment of the present disclosure may include the first and second vibration parts 511-1 and 511-2 which are arranged (or tiled) at a certain interval SD1, so as to be implemented as one single vibration body without being independently driven, and thus, may be driven as a large-area vibration body based on a single-body vibration of the first and second vibration parts 511-1 and 511-2. Therefore, since the vibrating device 200 is implemented as one single vibration body, the vibration device 500 may be driven as a large-area vibration body applied to a display panel or a vibration member which have a large area.

Figure 42:
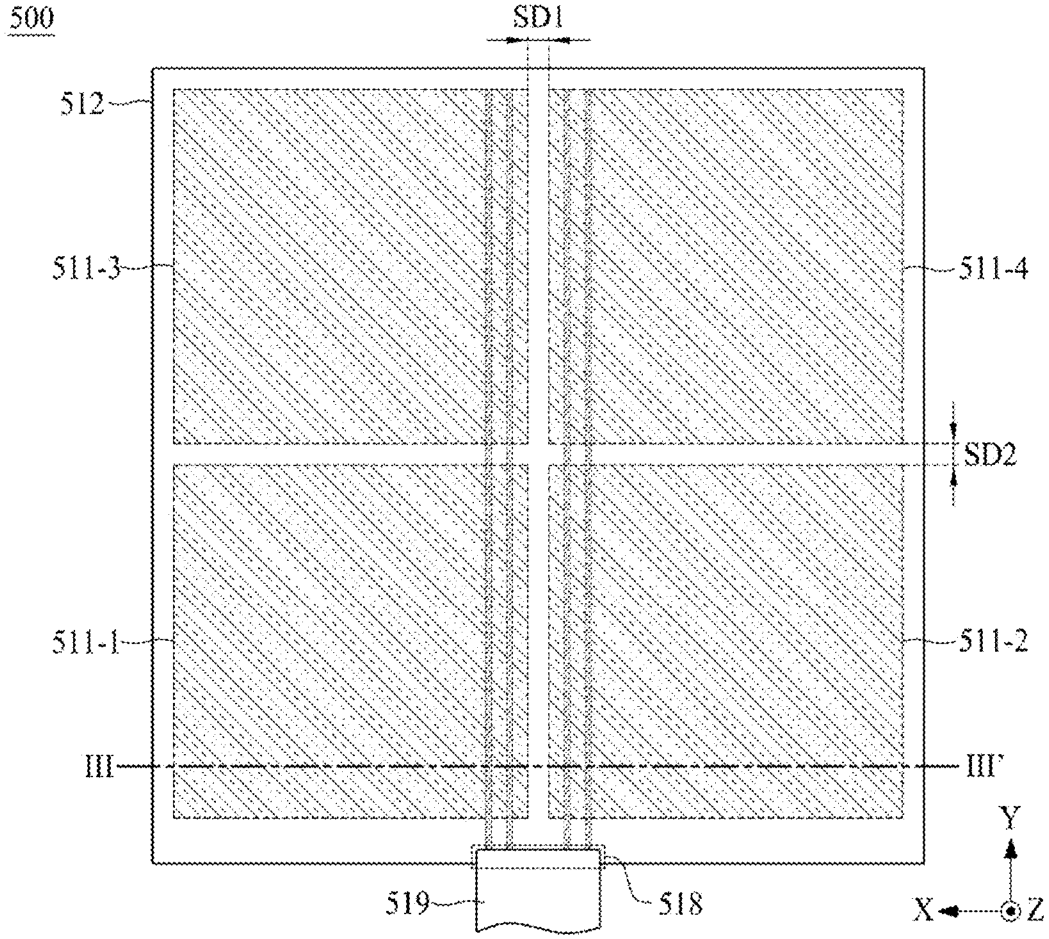
FIG. 42 illustrates a vibration device according to another embodiment of the present disclosure.

FIG. 42 illustrates a vibration device according to another embodiment of the present disclosure. FIG. 42 illustrates an embodiment where four vibration parts are provided in the vibration device illustrated in FIGS. 40 and 41. Hereinafter, therefore, the other elements except four vibration parts and relevant elements are referred to by like reference numerals, and the repetitive description thereof may be omitted or will be briefly given. A cross-sectional surface taken along line III-III' illustrated in FIG. 42 is illustrated in FIG. 41.

With reference to FIGS. 41 and 42, a vibration device 500 according to another embodiment of the present disclosure may include a plurality of vibration parts 511-1 to 511-4.

The plurality of vibration parts 511-1 to 511-4 may be electrically disconnected and disposed spaced apart from one another along each of a first direction X and a second direction Y. For example, the plurality of vibration parts 511-1 to 511-4 may be disposed or tiled in an i×j form on the same plane, and thus, the vibration device 500 may be implemented to have a large area, based on tiling of the plurality of vibration parts 511-1 to 511-4 having a relatively small size. For example, i may be the number of vibration parts disposed along the first direction X and may be a natural number of 2 or more, and j may be the number of vibration parts disposed along the second direction Y and may be a natural number of 2 or more which is the same as or different from i. For example, the plurality of vibration parts 511-1 to 511-4 may be arranged or tiled in a 2×2 form, but embodiments of the present disclosure are not limited thereto. In the following description, an example where the vibration device 500 includes first to fourth vibration parts 511-1 to 511-4 will be described.

According to an embodiment of the present disclosure, the first and second vibration parts 511-1 and 511-2 may be spaced apart from each other along the first direction X. The third and fourth vibration parts 511-3 and 511-4 may be spaced apart from each other along the first direction X and may be spaced apart from each of the first and second vibration parts 511-1 and 511-2 along the second direction Y. The first and third vibration parts 511-1 and 511-3 may be spaced apart from each other along the second direction Y to face each other. The second and fourth vibration parts 511-2 and 511-4 may be spaced apart from each other along the second direction Y to face each other.

The first to fourth vibration parts 511-1 to 511-4 may be disposed between the first cover member 512 and the second cover member 513. For example, each of the first cover member 512 and the second cover member 513 may connect the first to fourth vibration parts 511-1 to 511-4 or may support the first to fourth vibration parts 511-1 to 511-4 in common, and thus, may drive the first to fourth vibration parts 511-1 to 511-4 as one vibration apparatus (or a single vibration apparatus). For example, the first to fourth vibration parts 511-1 to 511-4 may be tiled in a certain interval between the first and the second cover members 512 and 513, and thus, may be driven as one vibration apparatus (or a single vibration apparatus).

According to an embodiment of the present disclosure, as described above with reference to FIGS. 40 and 41, in order to implement a complete single-body vibration or a large-area vibration, the first to fourth vibration parts 511-1 to 511-4 may be disposed (or tiled) at the intervals of 0.1 mm or more and less than 3 cm or may be disposed (or tiled) at 0.1 mm or more and less than 5 mm along each of the first direction X and the second direction Y.

Each of the first to fourth vibration parts 511-1 to 511-4 may include a vibration layer 511*a*, a first electrode layer 511*b*, and a second electrode layer 511*c*.

The vibration layer 511*a* of each of the first to fourth vibration parts 511-1 to 511-4 may include a piezoelectric material (or an electroactive material) which includes a piezoelectric effect. The vibration layer 511*a* of each of the first to fourth vibration parts 511-1 to 511-4 may be configured substantially the same as any one of the vibration layer 511*a* described above with reference to FIGS. 34 to 39, and thus, like reference numeral refer to like element and the repetitive description thereof may be omitted.

According to an embodiment of the present disclosure, each of the first to fourth vibration parts 511-1 to 511-4 may include any one vibration layer 511*a* of the vibration layer 511*a* described above with reference to FIGS. 34 to 39, or may include different vibration layer 511*a*. According to another embodiment of the present disclosure, one or more of the first to fourth vibration parts 511-1 to 511-4 may include a different vibration layer 511*a* described above with reference to FIGS. 34 to 39.

The first electrode layer 511*b* may be disposed at a first surface of the corresponding vibration layer 511*a* and electrically connected to the first surface of the corresponding vibration layer 511*a*. The first electrode layer 511*b* may be substantially the same as the first electrode layer 511*b* described above with reference to FIG. 41, and thus, like reference numeral refer to like element and the repetitive description thereof may be omitted.

The second electrode layer 511*c* may be disposed at a second surface of the corresponding vibration layer 511*a* and electrically connected to the second surface of the corresponding vibration layer 511*a*. The second electrode layer 511*c* may be substantially the same as the second electrode layer 511*c* described above with reference to FIG. 41, and thus, like reference numeral refer to like element and the repetitive description thereof may be omitted.

According to an embodiment of the present disclosure, the first and second adhesive layers 514 and 515 may be connected or coupled to each other between the first to fourth vibration parts 511-1 to 511-4. Therefore, each of the first to fourth vibration parts 511-1 to 511-4 may be surrounded by the first and second adhesive layers 514 and 515. For example, the first and second adhesive layers 514 and 515 may be configured between the first cover member 512 and the second cover member 513 to completely surround the first to fourth vibration parts 511-1 to 511-4. For example, each of the first to fourth vibration parts 511-1 to 511-4 may be embedded or built-in between the first adhesive layer 514 and the second adhesive layer 515.

The vibration device 500 according to another embodiment of the present disclosure may further include a first power supply line PL1, a second power supply line PL2, and a pad part 518.

Except for an electrical connection structure between each of the first and second power supply lines PL1 and PL2 and the first to fourth vibration parts 511-1 to 511-4, the first power supply line PL1 and the second power supply line PL2 may be substantially the same as each of the first power supply line PL1 and the second power supply line PL2 described above with reference to FIGS. 40 and 41, and thus, in the following description, only the electrical connection structure between each of the first and second power supply lines PL1 and PL2 and the first to fourth vibration parts 511-1 to 511-4 will be briefly described below.

The first power supply line PL1 according to an embodiment of the present disclosure may include first and second upper power lines PL11 and PL12 disposed along the second direction Y. For example, the first upper power line PL11 may be electrically connected to the first electrode layer 511*b* of each of the first and third vibration parts 511-1 and 511-3 disposed at a first row parallel to the second direction Y of the first to fourth vibration parts 511-1 to 511-4. The second upper power line PL12 may be electrically connected to the first electrode layer 511*b* of each of the second and fourth vibration parts 511-2 and 511-4 disposed at a second row parallel to the second direction Y of the first to fourth vibration parts 511-1 to 511-4.

The second power supply line PL2 according to an embodiment of the present disclosure may include first and second lower power lines PL21 and PL22 disposed along the second direction Y. For example, the first lower power line PL21 may be electrically connected to the second electrode layer 511*c* of each of the first and third vibration parts 511-1 and 511-3 disposed at a first row parallel to the second direction Y of the first to fourth vibration parts 511-1 to 511-4. The second lower power line PL22 may be electrically connected to the second electrode layer 511*c* of each of the second and fourth vibration parts 511-2 and 511-4 disposed at a second row parallel to the second direction Y of the first to fourth vibration parts 511-1 to 511-4.

The pad part 518 may be configured at one periphery portion of any one of the first cover member 512 and the second cover member 513 so as to be electrically connected to one portion (or one end) of each of the first and second power supply lines PL1 and PL2. The pad part 518 may be substantially the same as the pad part 518 illustrated in FIGS. 40 and 41, and thus, like reference numeral refer to like element and the repetitive description thereof may be omitted.

The vibration device 500 according to another embodiment of the present disclosure may have the same effect as that of the vibration device 500 described above with reference to FIGS. 40 and 41, and thus, the repetitive description thereof may be omitted.

Figure 43:
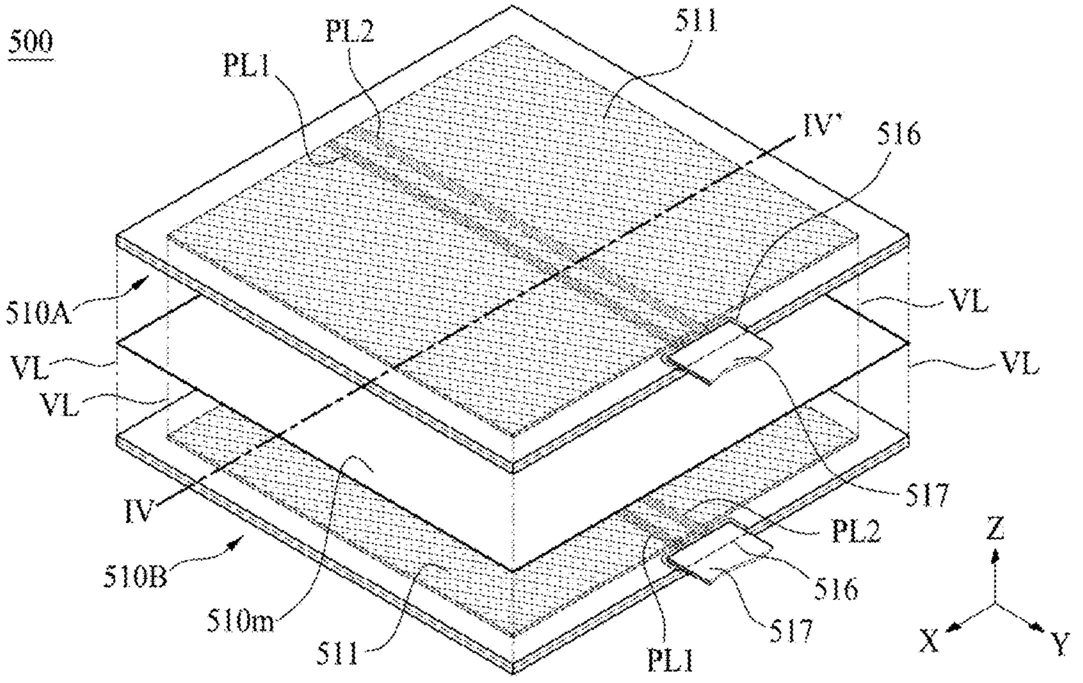
FIG. 43 illustrates a vibration device according to another embodiment of the present disclosure.
Figure 44:
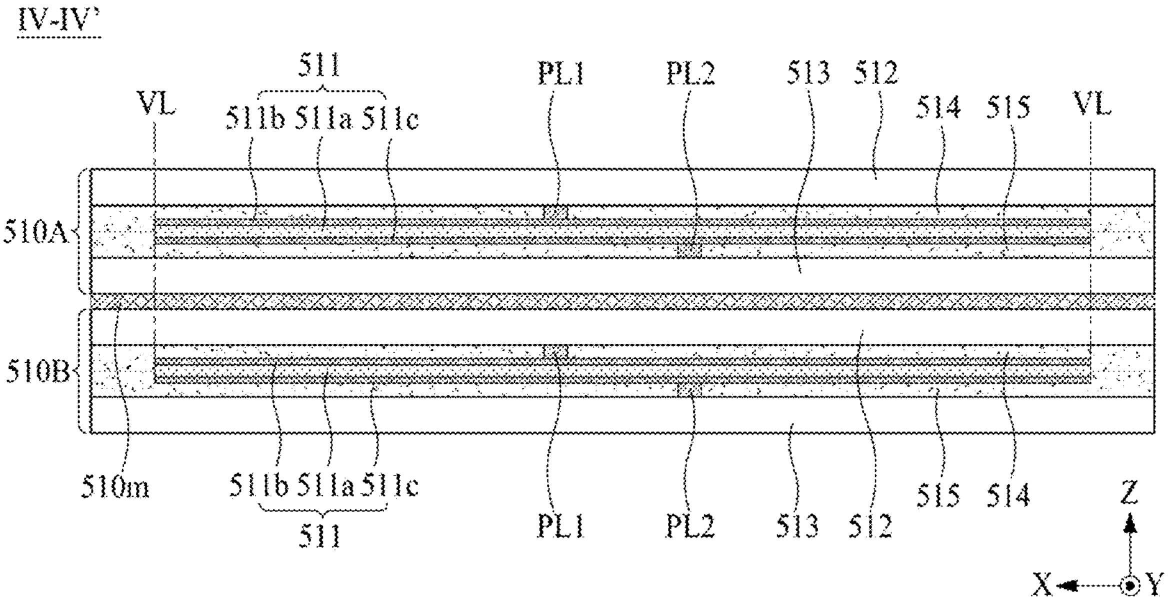
FIG. 44 is a cross-sectional view taken along line IV-IV' illustrated in FIG. 43 according to another embodiment of the present disclosure.

FIG. 43 illustrates a vibration device according to another embodiment of the present disclosure. FIG. 44 is a cross-sectional view taken along line IV-IV' illustrated in FIG. 43. FIGS. 43 and 44 illustrate another embodiment of the vibration device described with reference to FIGS. 1 to 33.

With reference to FIGS. 43 and 44, a vibration device 500 according to another embodiment of the present disclosure may include a plurality of vibration generating parts 510A and 510B and an intermediate member 510*m*. For example, the vibration device 500 according to another embodiment of the present disclosure may include a first vibration generating part 510A, a second vibration generating part 510B, and an intermediate member 510*m* between the first vibration generating part 510A and the second vibration generating part 510B.

According to an embodiment of the present disclosure, a description of FIGS. 43 and 44 may be identically applied to FIGS. 40 to 42.

The plurality of vibration generating parts (or the first and second vibration generating parts) 510A and 510B may overlap or be stacked to be displaced (or driven or vibrated) in the same direction in order to maximize an amplitude displacement of the vibration member and/or an amplitude displacement of the vibration device 500. One sides (or end portions, or end, or outer surfaces, or each corner portion) of each of the plurality of vibration generating parts (or the first and second vibration generating parts) 510A and 510B may be aligned on a virtual extension line VL extending along a third direction Z, or may be located at the virtual extension line VL. For example, the first vibration generating part 510A may be disposed at a front surface or a rear surface of the second vibration generating part 510B.

The plurality of vibration generating parts (or the first and second vibration generating parts) 510A and 510B may be any one of the vibration device 500 described above with reference to FIGS. 34 to 39, and thus, their repetitive descriptions may be omitted.

The plurality of vibration generating parts 510A and 510B may overlap or be stacked to be displaced (or driven or vibrated) in the same direction based on a polarization direction (or a poling direction) of the vibration layer 511*a*. For example, when the vibration layer 511*a* of each of the first and second vibration generating parts 510A and 510B has the same polarization direction to each other, the second vibration generating part 510B may be disposed at the front surface or the rear surface of the first vibration generating part 510A. For example, when the vibration layer 511*a* of each of the first and second vibration generating parts 510A and 510B has the opposite polarization direction (or the poling direction) to each other, the second vibration generating part 510B may be disposed at the front surface or the rear surface of the first vibration generating part 510A as a vertically reversed type.

The intermediate member 510*m* may be disposed or interposed between the plurality of vibration generating parts 510A and 510B. For example, the intermediate member 510*m* may be disposed between the second cover member 513 of the first vibration generating part 510A and the first cover member 512 of the second vibration generating part 510B. For example, the intermediate member 510*m* may be configured as an adhesive material including an adhesive layer which is good in adhesive force or attaching force with respect to each of the plurality of vibration generating parts 510A and 510B stacked vertically.

The intermediate member 510*m* according to an embodiment of the present disclosure may include a foam pad, a single-sided tape, a double-sided tape, a single-sided foam pad, a double-sided foam pad, a single-sided foam tape, a double-sided foam tape, or an adhesive, or the like, but embodiments of the present disclosure are not limited thereto. For example, an adhesive layer of the intermediate member 510*m* may include epoxy-based, acrylic-based, silicone-based, or urethane-based, but embodiments of the present disclosure are not limited thereto. The adhesive layer of the intermediate member 510*m* may include a urethane-based material (or substance) which relatively has a ductile characteristic than that of acrylic of acrylic and urethane. Accordingly, in the vibration device 500 according to another embodiment of the present disclosure, the vibration loss in the vibration device 500 caused by displacement interference between the plurality of vibration generating parts 510A and 510B may be minimized, or each of the plurality of vibration generating parts 510A and 510B may be freely displaced.

The intermediate member 510*m* according to another embodiment of the present disclosure may include one or more of a thermo-curable adhesive, a photo-curable adhesive, and a thermal bonding adhesive. For example, the intermediate member 510*m* may include the thermal bonding adhesive. The thermal bonding adhesive may be a heat-active type or a thermo-curable type. For example, the intermediate member 510*m* including the thermal bonding adhesive may attach or couple two adjacent vibration generating parts 510A and 510B by heat and pressure. For example, the intermediate member 510*m* including the thermal bonding adhesive may minimize or reduce the loss of vibration of the vibration device 500.

The plurality of vibration generating parts 510A and 510B may be integrated as one structure (or a component) by a laminating process by the intermediate member 510*m*. For example, the plurality of vibration generating parts 510A and 510B may be integrated as one structure by a laminating process by a roller.

FIGS. 45A to 45D illustrate a stacked structure between vibration layers of each of a plurality of vibration parts illustrated in FIGS. 43 and 44 according to an embodiment of the present disclosure.

Figure 45A:
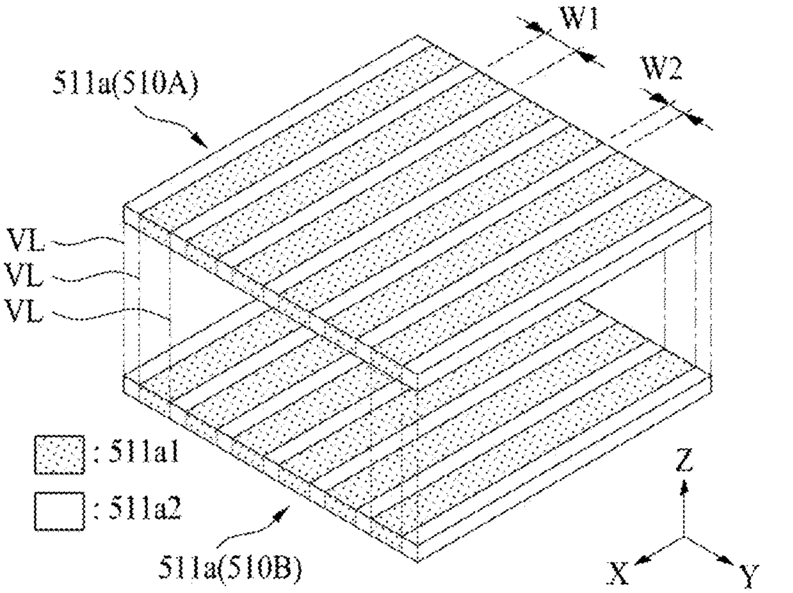
FIGS. 45A to 45D illustrate a stacked structure between vibration layers of each of a plurality of vibration generating parts illustrated in FIGS. 43 and 44 according to another embodiment of the present disclosure.
Figure 45B:
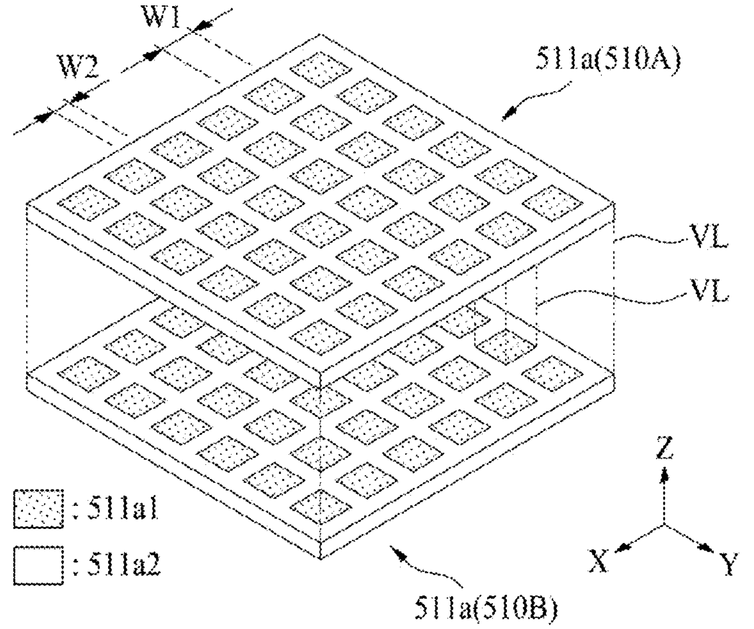
Figure 45C:
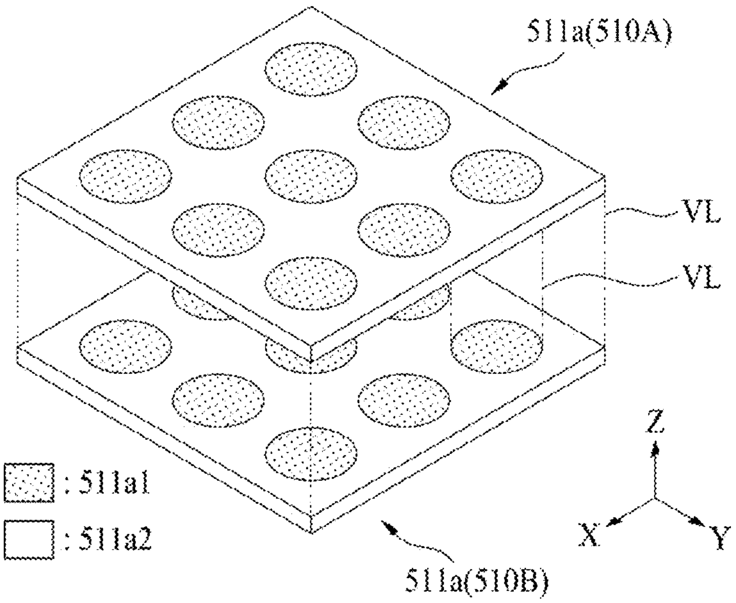
Figure 45D:
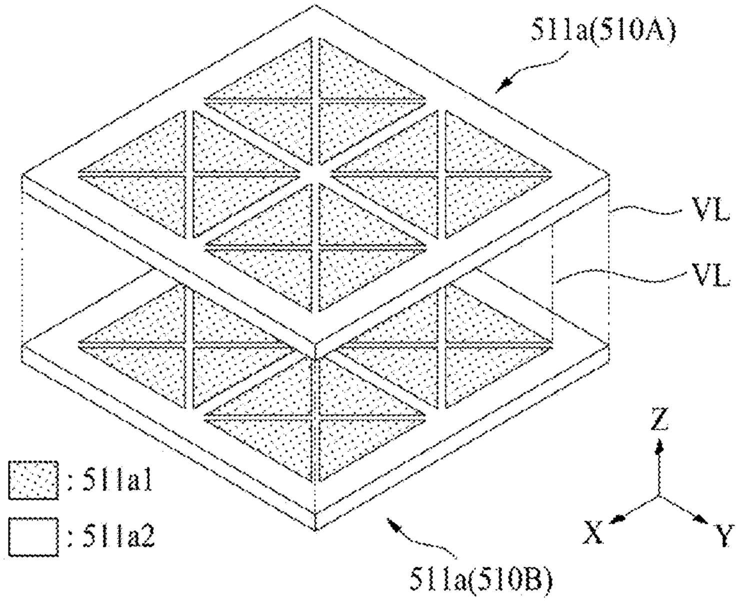

With reference to FIGS. 43 and 45A, a vibration layer 511*a* of each of a plurality of vibration generating parts 510A and 510B may include a plurality of first portions 511*a*1 and a plurality of second portions 511*a*2 disposed between the plurality of first portions 511*a*1. The vibration layer 511*a* may be substantially the same as the vibration layer 511*a* described above with reference to FIG. 36, and thus, the repetitive description thereof may be omitted. According to an embodiment of the present disclosure, a description of FIGS. 45A to 45D may be identically applied to FIGS. 40 to 42.

The first portion 511*a*1 of a vibration generating part 510B disposed at a lower layer and the first portion 511*a*1 of a vibration generating part 510A disposed at an upper layer of the plurality of vibration generating parts 510A and 510B may substantially overlap or stack to each other without being staggered. The second portion 511*a*2 of the vibration generating part 510B disposed at the lower layer and the second portion 511*a*2 of the vibration generating part 510A disposed at the upper layer of the plurality of vibration generating parts 510A and 510B may substantially overlap or stack to each other without being staggered. Therefore, the first portions 511*a*1 of the plurality of vibration generating parts 510A and 510B may substantially overlap or stack to each other without being staggered and may displace (or drive or vibrate) in the same direction, and thus, an amplitude displacement of a vibration device 500 and/or an amplitude displacement of a vibration member may be increased or maximized by a combination vibration of the plurality of vibration generating parts 510A and 510B, thereby enhancing a sound characteristic and/or a sound pressure level characteristic of the low-pitched sound band generated based on a vibration of the vibration member.

With reference to FIGS. 43 and 45B to 45D, a vibration layer 511*a* of each of a plurality of vibration generating parts 510A and 510B may include a plurality of first portions 511*a*1 and a second portion 511*a*2 disposed to surround each of the plurality of first portions 511*a*1. The vibration layer 511*a* may be substantially the same as the vibration layer 511*a* described above with reference to FIGS. 37 to 39, and thus, the repetitive description thereof may be omitted.

The first portion 511*a*1 of the vibration generating part 510B disposed at the lower layer and the first portion 511*a*1 of the vibration generating part 510A disposed at the upper layer of the plurality of vibration generating parts 510A and 510B may substantially overlap or stack to each other without being staggered. The second portion 511*a*2 of the vibration generating part 510B disposed at the lower layer and the second portion 511*a*2 of the vibration generating part 510A disposed at the upper layer of the plurality of vibration generating parts 510A and 510B may substantially overlap or stack to each other without being staggered. Therefore, the first portions 511*a*1 of the plurality of vibration generating parts 510A and 510B may substantially overlap or stack to each other without being staggered and may displace (or drive or vibrate) in the same direction, and thus, an amplitude displacement of a vibration device 500 and/or an amplitude displacement of a vibration member may be increased or maximized by a combination vibration of the plurality of vibration generating parts 510A and 510B, thereby enhancing a sound characteristic and/or a sound pressure level characteristic of the low-pitched sound band generated based on a vibration of the vibration member.

Figure 46:
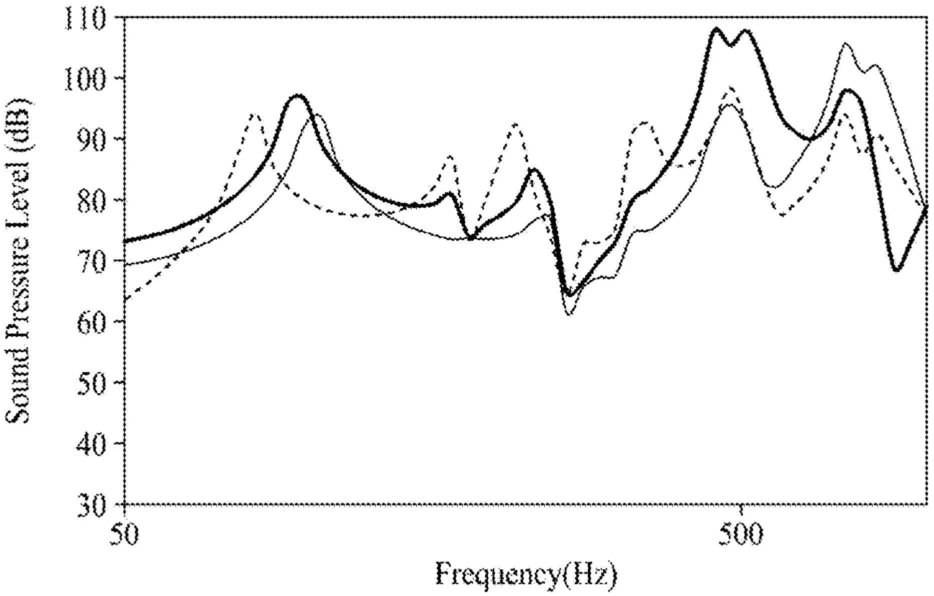
FIG. 46 illustrates a sound output characteristic of an apparatus according to an embodiment of the present disclosure and a sound output characteristic of an apparatus according to an experimental example.

FIG. 46 illustrates a sound output characteristic of an apparatus according to an embodiment of the present disclosure and a sound output characteristic of an apparatus according to an experimental example. In FIG. 46, the abscissa axis represents a frequency in hertz (Hz), and the ordinate axis represents a sound pressure level (SPL) in decibels (dB). In FIG. 46, a thick solid line represents a sound output characteristic of the apparatus 1 according to an embodiment of the present disclosure illustrated in FIG. 2, and a solid line represents a sound output characteristic of the apparatus 11 according to an embodiment of the present disclosure illustrated in FIG. 32. A dotted line represents a sound output characteristic of the apparatus according to the experimental example including a closed internal space where a plurality of holes are not configured at a supporting member.

A sound output characteristic of an apparatus may be measured by a sound analysis apparatus. The sound analysis apparatus may be configured to include a sound card that may transmit or receive sound signal to or from a control personal computer (PC), an amplifier that may amplify a sound signal generated from the sound card and transfer the amplified sound signal to a vibration device, and a microphone that may collect sound generated at a rearward surface of an apparatus based on driving of the vibration device. The sound collected through the microphone may be input to the control PC through the sound card, and a control program may check the input sound to analyze the sound output characteristic of the apparatus.

The sound output characteristic has been measured in an anechoic chamber, which is closed in all directions. When measuring, an applied frequency signal is applied as a sine sweep within a range of 20 Hz to 5 kHz, and 1/12 octave smoothing has been performed on a measurement result. A separation distance between a rearmost surface of the apparatus and the microphone is adjusted to be 50 cm. A measurement method may be not limited thereto.

As seen in FIG. 46, comparing with the dotted line, in each of the thick solid line and the solid line, it may be seen that a sound pressure level increases in a low-pitched sound band of about 90 Hz to about 170 Hz. Accordingly, in a case where a plurality of holes are configured at a supporting member, it may be seen that a sound characteristic and/or a sound pressure level characteristic of the low-pitched sound band of about 90 Hz to about 170 Hz may increase or be improved.

Figure 47:
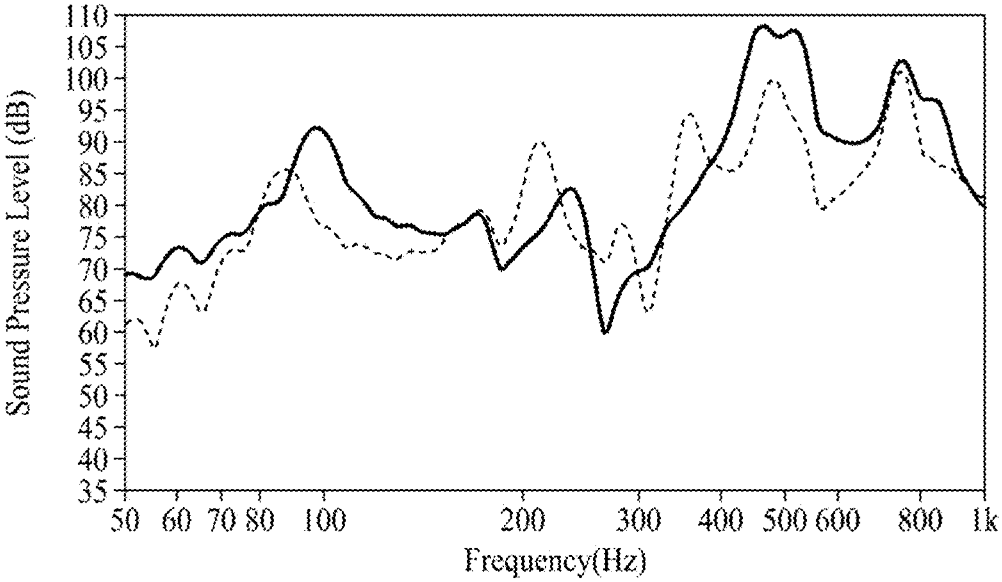
FIG. 47 illustrates a sound output characteristic of an apparatus according to an embodiment of the present disclosure and a sound output characteristic of an apparatus according to an experimental example.

FIG. 47 illustrates a sound output characteristic of an apparatus according to an embodiment of the present disclosure and a sound output characteristic of an apparatus according to an experimental example. In FIG. 47, the abscissa axis represents a frequency in hertz (Hz), and the ordinate axis represents a sound pressure level (SPL) in decibels (dB). In FIG. 47, a solid line represents a sound output characteristic of the apparatus 1 according to an embodiment of the present disclosure illustrated in FIG. 2, and a dotted line represents a sound output characteristic of an apparatus according to an experimental example including a closed internal space where a plurality of holes are not configured at a supporting member.

As seen in FIG. 47, comparing with the dotted line, in the solid line, it may be seen that a sound pressure level increases in a low-pitched sound band of about 90 Hz to about 170 Hz. Accordingly, in a case where a plurality of holes are configured at a supporting member, it may be seen that a sound characteristic and/or a sound pressure level characteristic of the low-pitched sound band of about 90 Hz to about 170 Hz may increase or be improved.

Figure 48A:
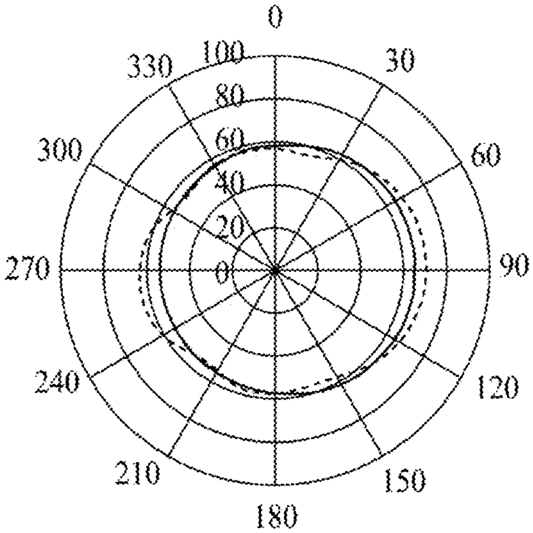
FIG. 48A illustrates a sound pressure level characteristic based on beamforming of a sound output from an apparatus according to an experimental example.
Figure 48B:
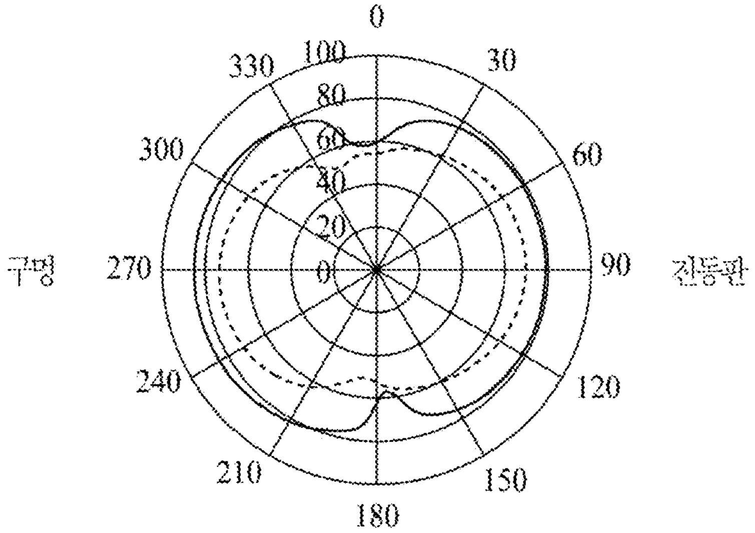
FIG. 48B illustrates a sound pressure level characteristic based on beamforming of a sound output from an apparatus according to an embodiment of the present disclosure.

FIG. 48A illustrates a sound pressure level characteristic based on beamforming of a sound output from an apparatus according to an experimental example. FIG. 48B illustrates a sound pressure level characteristic based on beamforming of a sound output from an apparatus according to an embodiment of the present disclosure. In FIGS. 48A and 48B, a solid line represents a sound pressure level characteristic in about 98 Hz, and a dotted line represents a sound pressure level characteristic in about 1 kHz. In FIGS. 48A and 48B, a 90-degree direction represents a forward direction of the apparatus, and a 270-degree direction represents a rearward direction of the apparatus.

As seen in FIG. 48A, the apparatus according to the experimental example may be relatively low in sound pressure level in a rearward direction, and thus, may be used as a sound apparatus which outputs a sound in only a forward direction of a vibration member.

As seen in FIG. 48B, comparing with the experimental example, in the apparatus according to an embodiment of the present disclosure, it may be seen that a sound pressure level increases, and it may be seen that a sound pressure level increases largely in about 98 Hz. Accordingly, comparing with the experimental example, the apparatus according to an embodiment of the present disclosure may be relatively high in sound pressure level in the forward direction, and for example, may be relatively high in sound pressure level in the rearward direction, and thus, may be used as a both-direction sound apparatus which outputs a sound in each of the forward direction and the rearward direction.

Figure 49:
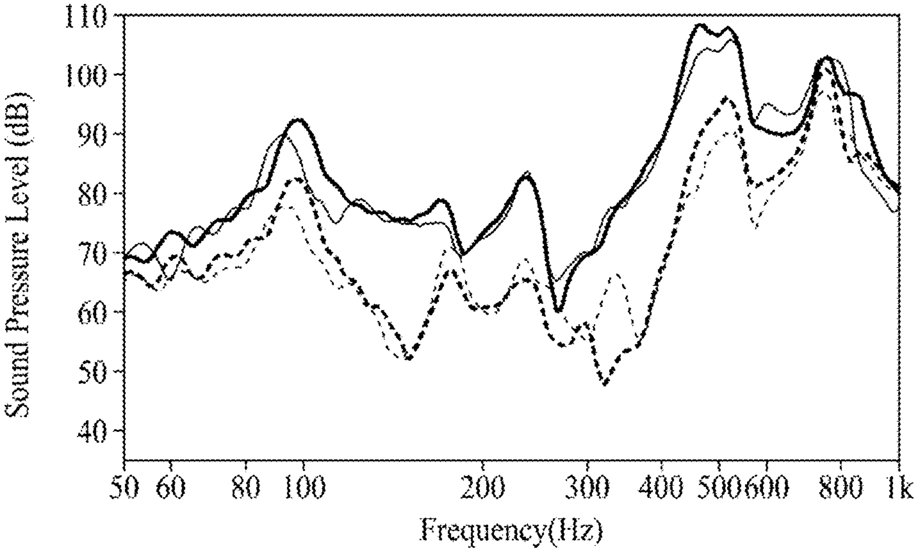
FIG. 49 illustrates a sound output characteristic in a forward direction and a sound output characteristic in a rearward direction with respect to a material of a supporting member, in an apparatus according to an embodiment of the present disclosure.

FIG. 49 illustrates a sound output characteristic in a forward direction and a sound output characteristic in a rearward direction with respect to a material of a supporting member, in an apparatus according to an embodiment of the present disclosure. In FIG. 49, the abscissa axis represents a frequency in hertz (Hz), and the ordinate axis represents a sound pressure level (SPL) in decibels (dB). In FIG. 49, a thick solid line represents a sound output characteristic measured from a rear surface 50 cm of the apparatus 1 according to an embodiment of the present disclosure illustrated in FIG. 2 including a supporting member of an aluminum material. A solid line represents a sound output characteristic measured from a rear surface 50 cm of the apparatus 1 according to an embodiment of the present disclosure illustrated in FIG. 2 including a supporting member of an ABS material. A thick dotted line represents a sound output characteristic measured from a front surface 50 cm of the apparatus 1 according to an embodiment of the present disclosure illustrated in FIG. 2 including the supporting member of the aluminum material. A dotted line represents a sound output characteristic measured from a front surface 50 cm of the apparatus 1 according to an embodiment of the present disclosure illustrated in FIG. 2 including the supporting member of the ABS material. The measurement method of the sound output characteristics may be the same as that described in FIG. 46, and thus, repetitive description thereof may be omitted.

As seen in FIG. 49, it may be seen that the thick solid line and the thick dotted line have almost similar sound pressure level characteristics. Also, it may be seen that the solid line and the dotted line have almost similar sound pressure level characteristics. Accordingly, in a case where a plurality of holes are configured at a supporting member, it may be seen that a sound output characteristic is not affected by a material (or a substance) of the supporting member or the stiffness of the supporting member. Therefore, in an apparatus including the supporting member configured as the ABS material, a weight and the manufacturing cost may be reduced compared to an apparatus including a support member configured as an aluminum material.

FIGS. 50A to 50D illustrate a sound output characteristic based on a hole arrangement structure, in an apparatus according to an embodiment of the present disclosure. In each of FIGS. 50A to 50D, the abscissa axis represents a frequency in hertz (Hz), and the ordinate axis represents a sound pressure level (SPL) in decibels (dB). The measurement method of the sound output characteristics may be the same as that described in FIG. 46, and thus, repetitive description thereof may be omitted.

Figure 50A:
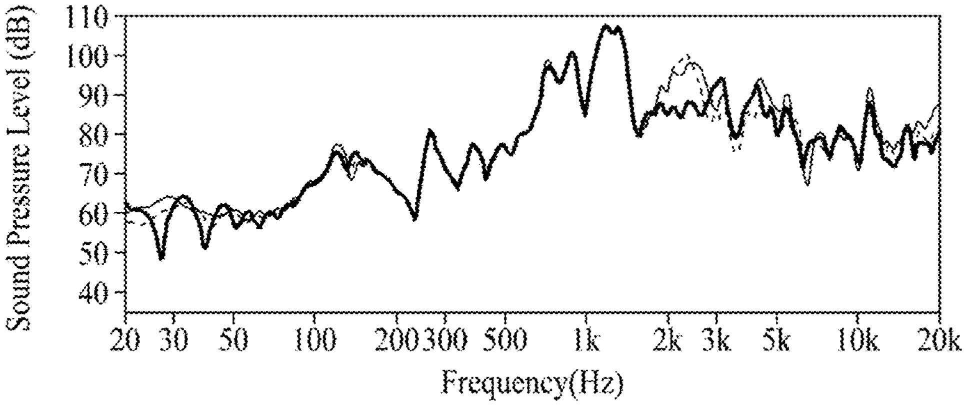
FIGS. 50A to 50D illustrate a sound output characteristic based on a hole arrangement structure, in an apparatus according to an embodiment of the present disclosure.

In FIG. 50A, a thick solid line represents a sound output characteristic of the apparatus including the hole arrangement structure illustrated in FIG. 10, a solid line represents a sound output characteristic of the apparatus including the hole arrangement structure illustrated in FIG. 8, and a dotted line represents a sound output characteristic of the apparatus including the hole arrangement structure illustrated in FIG. 9. As seen in FIG. 50A, comparing with the thick solid line, in each of the solid line and the dotted line, it may be seen that a sound pressure level increases in a pitched sound band of about 1.5 kHz to about 3 kHz (For example, a pitched sound band of about 1.7 kHz to about 2.9 kHz). Accordingly, in a case where one or more holes are configured at a center region or a middle region of a hole region, it may be seen that a sound pressure level increases in a pitched sound band of about 1.5 kHz to about 3 kHz.

Figure 50B:
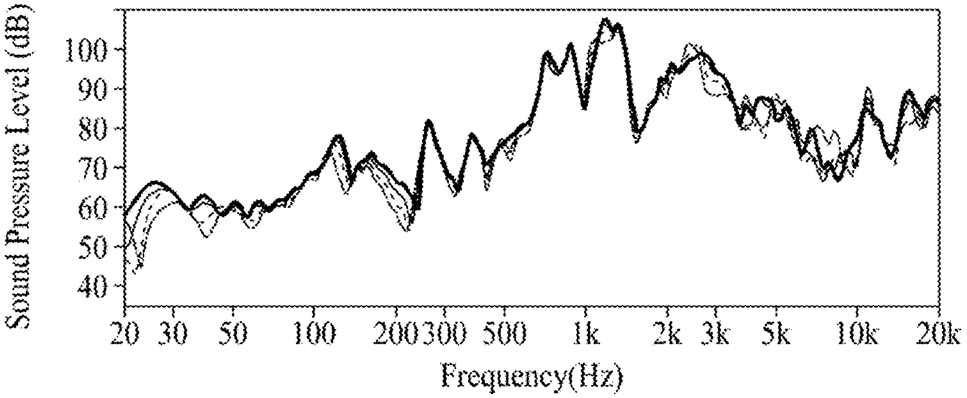

In FIG. 50B, a thick solid line represents a sound output characteristic of the apparatus including the hole arrangement structure illustrated in FIG. 3, a solid line represents a sound output characteristic of the apparatus including the hole arrangement structure illustrated in FIG. 4, a dotted line represents a sound output characteristic of the apparatus including the hole arrangement structure illustrated in FIG. 5, and a dash-single dotted line represents a sound output characteristic of the apparatus including the hole arrangement structure illustrated in FIG. 6. As seen in FIG. 50B, comparing with the thick solid line, in each of the solid line, the dotted line, and the dash-single dotted line, it may be seen that a sound pressure level increases in a pitched sound band of about 100 Hz to about 250 Hz (For example, a pitched sound band of about 110 Hz to about 230 Hz). Accordingly, in a case where one or more holes are configured at a corner region of a hole region, it may be seen that a sound pressure level increases in a pitched sound band of about 100 Hz to about 250 Hz.

Figure 50C:
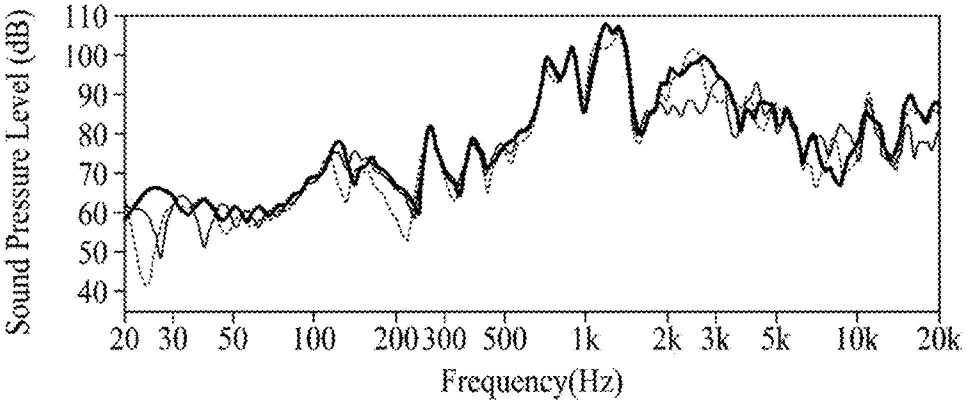

In FIG. 50C, a thick solid line represents a sound output characteristic of the apparatus including the hole arrangement structure illustrated in FIG. 3, a solid line represents a sound output characteristic of the apparatus including the hole arrangement structure illustrated in FIG. 10, and a dotted line represents a sound output characteristic of the apparatus including the hole arrangement structure illustrated in FIG. 6. As seen in FIG. 50C, comparing with the dotted line, in each of the thick solid line and the solid line, it may be seen that a sound pressure level increases in a pitched sound band of about 100 Hz to about 250 Hz (For example, a pitched sound band of about 110 Hz to about 230 Hz). Comparing with the solid line, in each of the thick solid line and the dotted line, it may be seen that a sound pressure level increases in a pitched sound band of about 1.5 kHz to about 3 kHz (For example, a pitched sound band of about 1.7 kHz to about 2.9 kHz). Accordingly, in a case where one or more holes are configured at a corner region of a hole region, it may be seen that a sound pressure level increases in a pitched sound band of about 100 Hz to about 250 Hz. Also, in a case where one or more holes are configured at each of a center region and a middle region of a hole region, it may be seen that a sound pressure level increases in a pitched sound band of about 1.5 kHz to about 3 kHz.

Figure 50D:
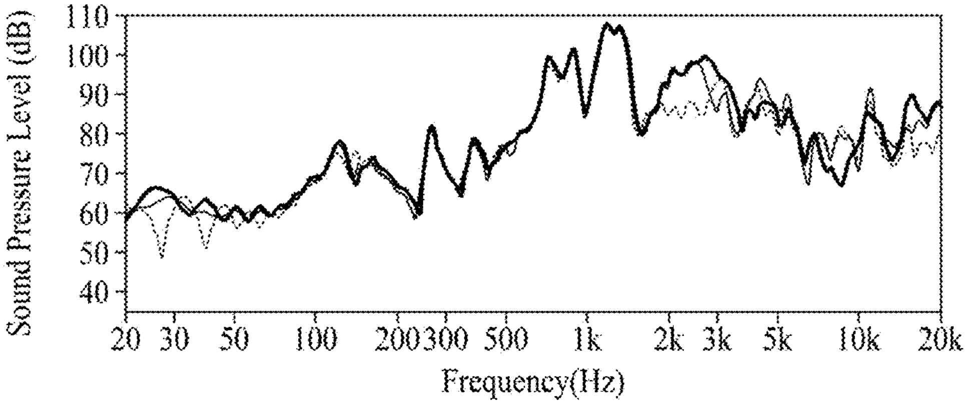

In FIG. 50D, a thick solid line represents a sound output characteristic of the apparatus including the hole arrangement structure illustrated in FIG. 3, a solid line represents a sound output characteristic of the apparatus including the hole arrangement structure illustrated in FIG. 8, and a dotted line represents a sound output characteristic of the apparatus including the hole arrangement structure illustrated in FIG. 10. As seen in FIG. 50D, comparing with the dotted line, in each of the thick solid line and the solid line, it may be seen that a sound pressure level increases in a pitched sound band of about 1.5 kHz to about 3 kHz (For example, a pitched sound band of about 1.7 kHz to about 2.9 kHz). Comparing with the solid line, in each of the thick solid line and the dotted line, it may be seen that a sound pressure level increases in a pitched sound band of about 1.5 kHz to about 3 kHz.

Figure 51A:
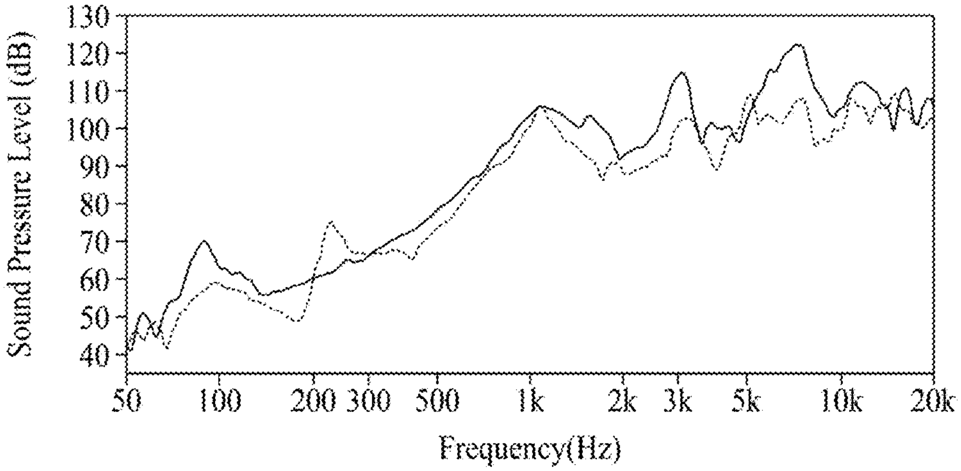
FIGS. 51A and 51B illustrate a sound output characteristic of each of a vibration member configured as a stainless steel material and a vibration member configured as an MCPET material, in an apparatus according to an embodiment of the present disclosure.
Figure 51B:
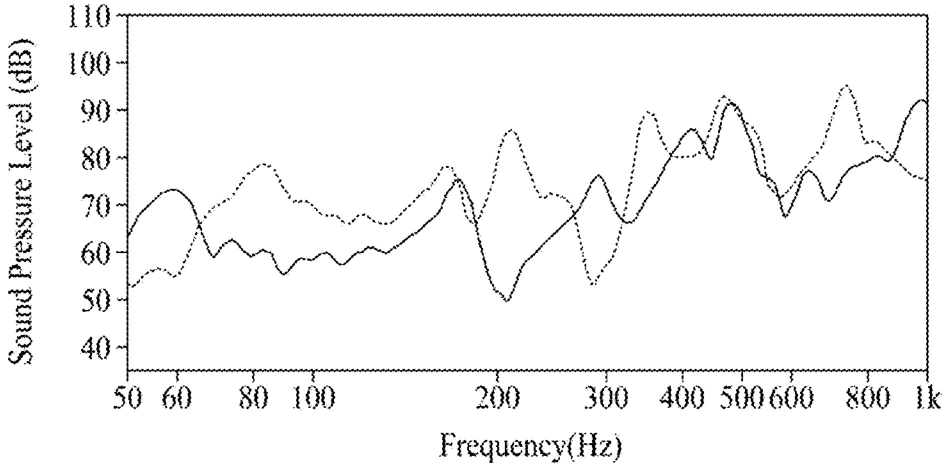

FIGS. 51A and 51B illustrate a sound output characteristic of each of a vibration member configured as a stainless steel material and a vibration member configured as an MCPET material, in an apparatus according to an embodiment of the present disclosure. In FIGS. 51A and 51B, the abscissa axis represents a frequency in hertz (Hz), and the ordinate axis represents a sound pressure level (SPL) in decibels (dB). In FIGS. 51A and 51B, a solid line represents a sound output characteristic of the vibration member configured as the MCPET material, and a dotted line represents a sound output characteristic based on a vibration of the vibration member configured as the stainless steel material. The measurement method of the sound output characteristics may be the same as that described in FIG. 46, and thus, repetitive description thereof may be omitted.

As seen in FIG. 51A, comparing with a dotted line, in a solid line, it may be seen that a sound pressure level increases in a pitched sound band of about 1 kHz or more and a peak phenomenon and a dip phenomenon decrease in a pitched sound band of about 1 kHz or less. Accordingly, in a case where a vibration member configured as the MCPET material is applied to an apparatus, a sound pressure level of a sound may increase or be enhanced.

As seen in FIG. 51B, comparing with a dotted line, in a solid line, it may be seen that a sound pressure level increases in a pitched sound band of about 65 Hz or less. Accordingly, in a case where a vibration member configured as the MCPET material is applied to an apparatus, a reproduction band of a sound may be expanded to a reproduction band of a woofer.

Figure 52:
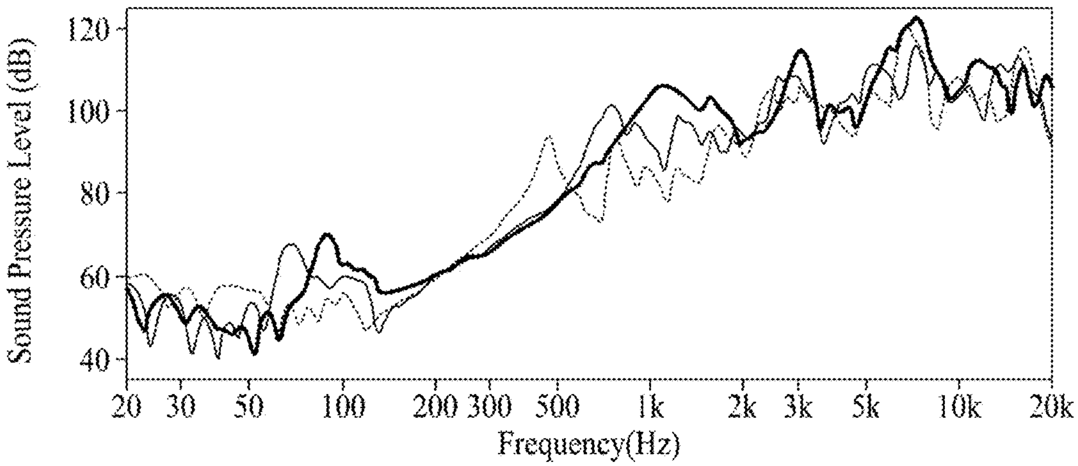
FIG. 52 illustrates a sound output characteristic based on a thickness of a vibration member configured as an MCPET material, in an apparatus according to an embodiment of the present disclosure.

FIG. 52 illustrates a sound output characteristic based on a thickness of a vibration member configured as an MCPET material, in an apparatus according to an embodiment of the present disclosure. In FIG. 52, the abscissa axis represents a frequency in hertz (Hz), and the ordinate axis represents a sound pressure level (SPL) in decibels (dB). In FIG. 52, a thick solid line represents a sound output characteristic based on a vibration of the vibration member configured as an MCPET material having a thickness of about 1 mm, a solid line represents a sound output characteristic based on a vibration of the vibration member including an MCPET material having a thickness of about 0.75 mm, and a dotted line represents a sound output characteristic based on a vibration of the vibration member configured as an MCPET material having a thickness of about 0.5 mm. The measurement method of the sound output characteristics may be the same as that described in FIG. 46, and thus, repetitive description thereof may be omitted.

As seen in FIG. 52, it may be seen that a peak of a sound moves to a low-pitched sound band as a thickness of an MCPET material is progressively thinned. For example, it may be seen that a peak of a sound decreases in height as a thickness of the MCPET material is progressively thinned, in about 50 Hz to about 100 Hz. Accordingly, in an apparatus requiring a high sound pressure level characteristic in about 50 Hz to about 100 Hz, a vibration member configured as the MCPET material may have a relatively thin thickness.

Figure 53A:
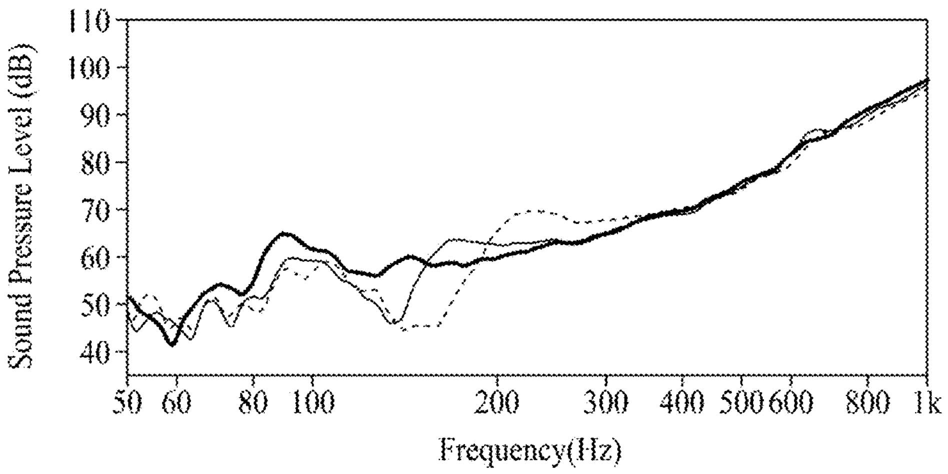
FIGS. 53A and 53B illustrate a sound output characteristic of an apparatus according to an embodiment of the present disclosure including the reinforcement member illustrated in FIGS. 21 to 28.
Figure 53B:
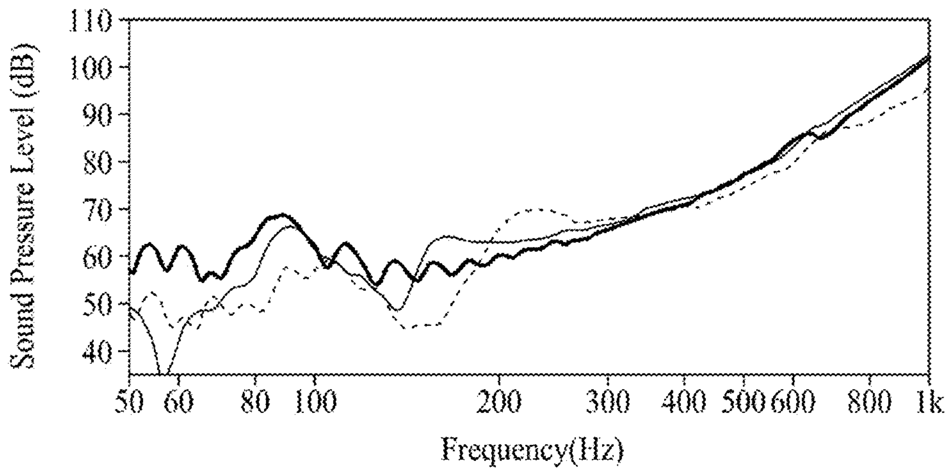

FIGS. 53A and 53B illustrate a sound output characteristic of an apparatus according to an embodiment of the present disclosure including the reinforcement member illustrated in FIGS. 21 to 28. In FIGS. 53A and 53B, the abscissa axis represents a frequency in hertz (Hz), and the ordinate axis represents a sound pressure level (SPL) in decibels (dB). In an experiment based on FIGS. 53A and 53B, a vibration member is configured as an MCPET material having a thickness of about 1 mm, and a reinforcement member is configured as an MCPET material having a thickness of about 1 mm. The measurement method of the sound output characteristics may be the same as that described in FIG. 46, and thus, repetitive description thereof may be omitted.

In FIG. 53A, a thick solid line represents a sound output characteristic of an apparatus including the reinforcement member illustrated in FIG. 22, a solid line represents a sound output characteristic of the apparatus including the reinforcement member having a width of about 2 mm illustrated in FIG. 24, and a dotted line represents a sound output characteristic of the apparatus including the reinforcement member having a width of about 1 mm illustrated in FIG. 24.

As seen in FIG. 53A, comparing with the dotted line, in each of the thick solid line and the solid line, it may be seen that dip decreases in a pitched sound band of about 100 Hz to about 200 Hz. Accordingly, in a case where a reinforcement member is configured at a periphery portion of a vibration member, dip may decrease in a pitched sound band of about 100 Hz to about 200 Hz.

In FIG. 53B, a thick solid line represents a sound output characteristic of the apparatus including the reinforcement member illustrated in FIG. 26, a solid line represents a sound output characteristic of the apparatus including the reinforcement member illustrated in FIG. 28, and a dotted line represents a sound output characteristic of the apparatus including the reinforcement member illustrated in FIG. 22.

As seen in FIG. 53B, comparing with each of the solid line and the dotted line, in the thick solid line, it may be seen that a sound pressure level increases in a pitched sound band of about 90 Hz or less. Accordingly, in a case where a reinforcement member is configured at a pair of corner portions of a vibration member, a sound pressure level may increase or be enhanced in a pitched sound band of about 90 Hz or less.

Figure 54A:
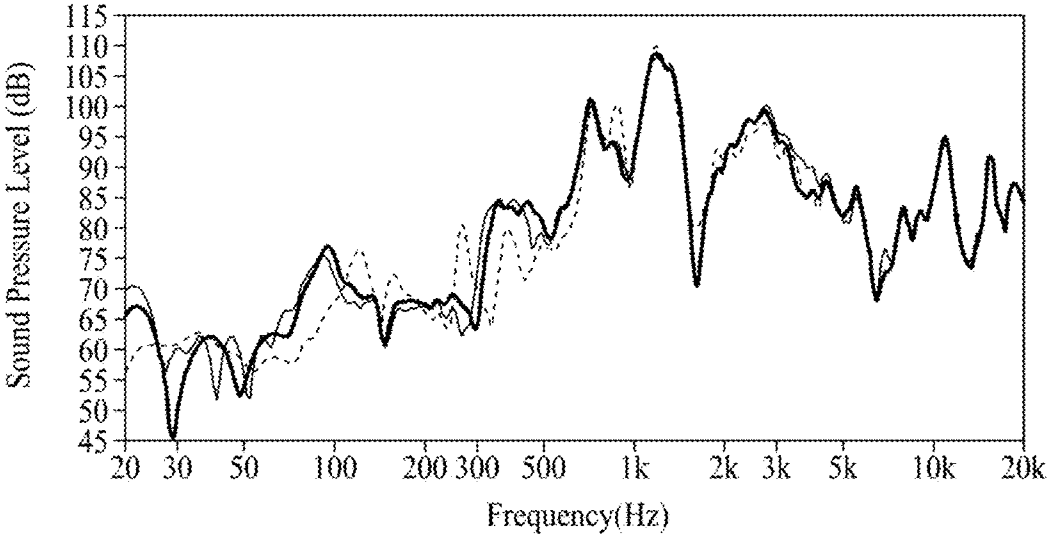
FIGS. 54A and 54B illustrate a sound output characteristic of an apparatus according to an embodiment of the present disclosure including the weight member illustrated in FIGS. 16 and 17.
Figure 54B:
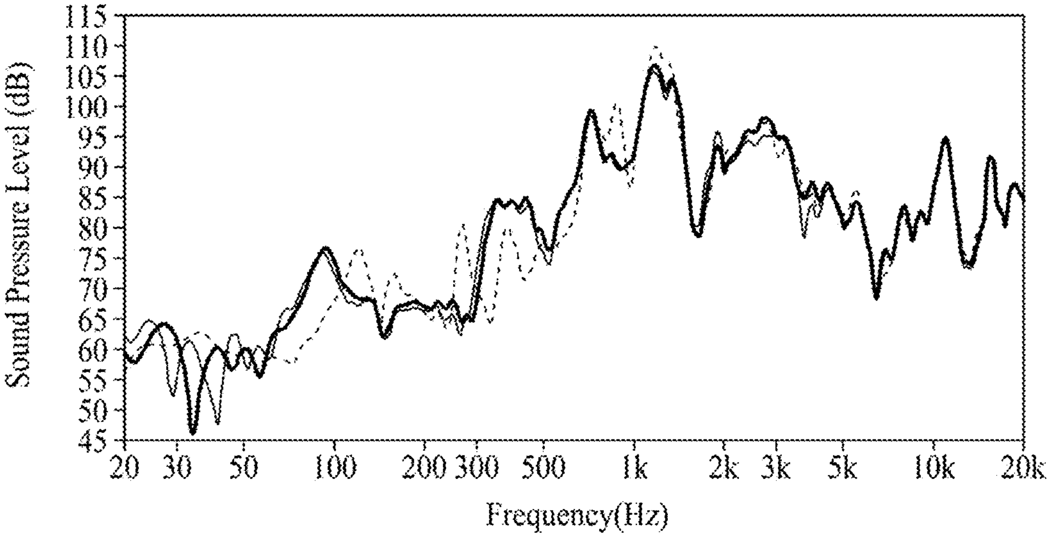

FIGS. 54A and 54B illustrate a sound output characteristic of an apparatus according to an embodiment of the present disclosure including the weight member illustrated in FIGS. 16 and 17. In FIGS. 54A and 54B, the abscissa axis represents a frequency in hertz (Hz), and the ordinate axis represents a sound pressure level (SPL) in decibels (dB). The measurement method of the sound output characteristics may be the same as that described in FIG. 46, and thus, repetitive description thereof may be omitted.

In FIG. 54A, a thick solid line represents a sound output characteristic of an apparatus including four weight members having a weight of about 40 g illustrated in FIG. 16, a solid line represents a sound output characteristic of the apparatus including five weight members having a weight of about 60 g illustrated in FIG. 17, and a dotted line represents a sound output characteristic of an apparatus including no weight member.

As seen in FIG. 54A, comparing with the dotted line, in each of the thick solid line and the solid line, it may be seen that a sound pressure level increases in a pitched sound band of about 50 Hz to about 100 Hz. Accordingly, in a case where a weight member is applied to an apparatus, a sound pressure level may increase or be enhanced in a pitched sound band of about 50 Hz to about 100 Hz.

In FIG. 54B, a thick solid line represents a sound output characteristic of an apparatus including four weight members having a weight of about 40 g illustrated in FIG. 18, a solid line represents a sound output characteristic of the apparatus including six weight members having a weight of about 60 g illustrated in FIG. 19, and a dotted line represents a sound output characteristic of an apparatus configuring no weight member.

As seen in FIG. 54B, comparing with the dotted line, in each of the thick solid line and the solid line, it may be seen that a sound pressure level increases in a pitched sound band of about 50 Hz to about 100 Hz. Accordingly, in a case where a weight member is applied to an apparatus, a sound pressure level may increase or be enhanced in a pitched sound band of about 50 Hz to about 100 Hz.

An apparatus according to one or more embodiments of the present disclosure may be applied to or included in a vibration generating apparatus and/or a sound generating apparatus. The apparatus according to an embodiment of the present disclosure may be applied to or included in mobile apparatuses, video phones, smart watches, watch phones, wearable apparatuses, foldable apparatuses, rollable apparatuses, bendable apparatuses, flexible apparatuses, curved apparatuses, sliding apparatuses, variable apparatuses, electronic organizers, electronic books, portable multimedia players (PMPs), personal digital assistants (PDAs), MP3 players, mobile medical devices, desktop personal computers (PCs), laptop PCs, netbook computers, workstations, navigation apparatuses, automotive navigation apparatuses, automotive display apparatuses, automotive apparatuses, theater apparatuses, theater display apparatuses, TVs, wall paper display apparatuses, signage apparatuses, game machines, notebook computers, monitors, cameras, camcorders, and home appliances, or the like. And, a vibration generating apparatus according to one or more embodiments of the present disclosure may be applied to or included in an organic light-emitting lighting apparatus or an inorganic light-emitting lighting apparatus. When the vibration generating apparatus is applied to or included in the lighting apparatuses, the lighting apparatuses may act as lighting and a speaker. In addition, when the vibration generating apparatus according to one or more embodiments of the present disclosure is applied to or included in the mobile apparatuses, or the like, the vibration generating apparatus may be one or more of a speaker, a receiver, and a haptic device, but embodiments of the present disclosure are not limited thereto.

An apparatus according to one or more embodiments of the present disclosure are described below.

An apparatus according to one or more embodiments of the present disclosure may comprise a vibration member, a vibration device connected with the vibration member, a supporting member at a rear surface of the vibration member and configured to include an internal space, and a plurality of holes configured at the supporting member.

According to one or more embodiments of the present disclosure, the supporting member may comprise a first supporting part at the rear surface of the vibration member; and a second supporting part connected between a periphery portion of the rear surface of the vibration member and the first supporting part, and the plurality of holes are configured at the first supporting part.

According to one or more embodiments of the present disclosure, the first supporting part may comprise a hole region overlapping the vibration device and including the plurality of holes, and the hole region may comprise a first hole region overlapping a center region of the vibration device, a plurality of second hole regions overlapping a corner region of the vibration device, and a third hole region between the first hole region and the plurality of second hole regions.

According to one or more embodiments of the present disclosure, one or more of the plurality of holes may be configured at one or more of the first hole region, the plurality of second hole regions, and the third hole region.

According to one or more embodiments of the present disclosure, the first supporting part may comprise a center portion overlapping the vibration device and a periphery portion surrounding the center portion, and the plurality of holes may be configured at the periphery portion of the first supporting part.

According to one or more embodiments of the present disclosure, the vibration member may comprise a porous plastic material or a micro cellular foam plastic material.

According to one or more embodiments of the present disclosure, the apparatus may further comprise a hole cover part configured at the supporting member to cover some of the plurality of holes.

According to one or more embodiments of the present disclosure, the hole cover part may be detachably attached on the supporting member to cover some of the plurality of holes.

According to one or more embodiments of the present disclosure, the internal space may be connected to an external space of the supporting member through the plurality of holes.

According to one or more embodiments of the present disclosure, the apparatus may further comprise a connection member between the vibration device and the vibration member.

According to one or more embodiments of the present disclosure, the plurality of holes may be configured to overlap the vibration device.

According to one or more embodiments of the present disclosure, the plurality of holes may be configured not to overlap the vibration device.

According to one or more embodiments of the present disclosure, the apparatus may further comprise a coupling member between the vibration member and the supporting member.

According to one or more embodiments of the present disclosure, the coupling member may comprise a first coupling member between the vibration member and the supporting member and a second coupling member between the vibration member and the supporting member, the second coupling member including a material which differs from a material of the first coupling member.

According to one or more embodiments of the present disclosure, the apparatus may further comprise one or more weight members provided at the vibration device.

According to one or more embodiments of the present disclosure, the apparatus may further comprise one or more weight members configured at the vibration member or the vibration device. The weight members may overlap one or more of a center portion and a periphery portion of the vibration device.

According to one or more embodiments of the present disclosure, the apparatus may further comprise a reinforcement member at the vibration member.

According to one or more embodiments of the present disclosure, the reinforcement member may comprise one or more materials of metal, plastic, fiber, leather, wood, cloth, rubber, carbon, glass, and paper, or comprises the same material as a material of the vibration member.

According to one or more embodiments of the present disclosure, the reinforcement member may be coupled to one of an entire rear surface of the vibration member, a rear periphery portion of the vibration member, a corner portion of the vibration member, and a center portion of the vibration member.

According to one or more embodiments of the present disclosure, the apparatus may further comprise a second connection member between the vibration member and the reinforcement member.

According to one or more embodiments of the present disclosure, the second connection member may comprise a plurality of hollow portions.

According to one or more embodiments of the present disclosure, the second connection member may comprise a first connection pattern between a center portion of the vibration member and a center portion of the reinforcement member and a second connection pattern between a periphery portion of the vibration member and a periphery portion of the reinforcement member, the second connection pattern including a material which differs from a material of the first connection pattern.

According to one or more embodiments of the present disclosure, the vibration member may comprises one or more materials of metal, plastic, fiber, leather, wood, cloth, rubber, carbon, glass, and paper.

According to one or more embodiments of the present disclosure, the vibration device may comprise a vibration layer, a first electrode layer at a first surface of the vibration layer, and a second electrode layer at a second surface of the vibration layer, the second surface of the vibration layer being different from the first surface of the vibration layer.

According to one or more embodiments of the present disclosure, the vibration layer may comprise a plurality of inorganic material portions having a piezoelectric characteristic and an organic material portion between the plurality of inorganic material portions.

According to one or more embodiments of the present disclosure, the vibration device may comprise a plurality vibration parts spaced apart from one another. Each of the plurality vibration parts may comprise a vibration layer, a first electrode layer at a first surface of the vibration layer, and a second electrode layer at a second surface of the vibration layer, the second surface of the vibration layer being different from the first surface of the vibration layer.

According to one or more embodiments of the present disclosure, the vibration device may further comprise a first cover member commonly connected with the first electrode layer of each of the plurality vibration parts and a second cover member commonly connected with the second electrode layer of each of the plurality vibration parts.

According to one or more embodiments of the present disclosure, the vibration layer of each of the plurality vibration parts may comprise a plurality of inorganic material portions having a piezoelectric characteristic and an organic material portion between the plurality of inorganic material portions.

According to one or more embodiments of the present disclosure, the vibration device may comprise a plurality of vibration generating parts. The plurality of vibration generating parts may be configured to vibrate in a same direction.

According to one or more embodiments of the present disclosure, the vibration device may further comprise an intermediate member between the plurality of vibration generating parts.

An apparatus according to one or more embodiments of the present disclosure may comprise a vibration member, a vibration device connected with the vibration member, and a housing covering a rear surface of the vibration member and including a plurality of holes, an internal space provided by the vibration member and the housing may be connected with an external space of the housing through the plurality of holes.

According to one or more embodiments of the present disclosure, the housing may comprise a first supporting part and a second supporting part configuring the internal space at the rear surface of the vibration member. The plurality of holes may be configured to pass through the first supporting part.

According to one or more embodiments of the present disclosure, the apparatus may further comprise a connection member between the vibration device and the vibration member.

According to one or more embodiments of the present disclosure, the plurality of holes may be configured to overlap the vibration device.

According to one or more embodiments of the present disclosure, the plurality of holes may be configured not to overlap the vibration device.

According to one or more embodiments of the present disclosure, the apparatus may further comprise one or more weight members provided at the vibration device.

According to one or more embodiments of the present disclosure, the apparatus may further comprise one or more weight members configured at the vibration member or the vibration device. The weight members may overlap one or more of a center portion and a periphery portion of the vibration device.

According to one or more embodiments of the present disclosure, the apparatus may further comprise a reinforcement member at the vibration member.

According to one or more embodiments of the present disclosure, the reinforcement member may comprise one or more materials of metal, plastic, fiber, leather, wood, cloth, rubber, carbon, glass, and paper, or may comprise the same material as a material of the vibration member.

According to one or more embodiments of the present disclosure, the reinforcement member may be coupled to one of an entire rear surface of the vibration member, a rear periphery portion of the vibration member, a corner portion of the vibration member, and a center portion of the vibration member.

According to one or more embodiments of the present disclosure, the apparatus may further comprise a second connection member between the vibration member and the reinforcement member.

According to one or more embodiments of the present disclosure, the second connection member may comprise a plurality of hollow portions.

According to one or more embodiments of the present disclosure, the second connection member may comprise a first connection pattern between a center portion of the vibration member and a center portion of the reinforcement member, and a second connection pattern between a periphery portion of the vibration member and a periphery portion of the reinforcement member, the second connection pattern including a material which differs from a material of the first connection pattern.

According to one or more embodiments of the present disclosure, the vibration member may comprise one or more materials of metal, plastic, fiber, leather, wood, cloth, rubber, carbon, glass, and paper.

According to one or more embodiments of the present disclosure, the vibration device may comprise a vibration layer, a first electrode layer at a first surface of the vibration layer, and a second electrode layer at a second surface of the vibration layer, the second surface of the vibration layer being different from the first surface of the vibration layer.

According to one or more embodiments of the present disclosure, the vibration layer may comprise a plurality of inorganic material portions having a piezoelectric characteristic, and an organic material portion between the plurality of inorganic material portions.

According to one or more embodiments of the present disclosure, the vibration device may comprise a plurality vibration parts spaced apart from one another. Each of the plurality vibration parts may comprise a vibration layer, a first electrode layer at a first surface of the vibration layer, and a second electrode layer at a second surface of the vibration layer, the second surface of the vibration layer being different from the first surface of the vibration layer.

According to one or more embodiments of the present disclosure, the vibration device may further comprise a first cover member commonly connected with the first electrode layer of each of the plurality vibration parts, and a second cover member commonly connected with the second electrode layer of each of the plurality vibration parts.

According to one or more embodiments of the present disclosure, the vibration layer of each of the plurality vibration parts may comprise a plurality of inorganic material portions having a piezoelectric characteristic, and an organic material portion between the plurality of inorganic material portions.

According to one or more embodiments of the present disclosure, the vibration device may comprise a plurality of vibration generating parts, and the plurality of vibration generating parts may be configured to vibrate in a same direction.

According to one or more embodiments of the present disclosure, the vibration device may further comprise an intermediate member between the plurality of vibration generating parts.

According to one or more embodiments of the present disclosure, the vibration member may comprise a porous pattern.

According to one or more embodiments of the present disclosure, the apparatus may further comprise a coupling member between the vibration member and the supporting member.

According to one or more embodiments of the present disclosure, the coupling member may comprise a first coupling member between the vibration member and the supporting member, and a second coupling member between the vibration member and the supporting member, the second coupling member including a material which differs from a material of the first coupling member.

It will be apparent to those skilled in the art that various modifications and variations can be made in the apparatus of the present disclosure without departing from the scope of the present disclosure. Thus, it is intended that the present disclosure cover the modifications and variations of this disclosure provided they come within the scope of the appended claims and their equivalents.

What is claimed is:

1. An apparatus, comprising:

a vibration member;

a vibration device connected with the vibration member;

a supporting member at a rear surface of the vibration member and configured to include an internal space; and a plurality of holes configured at the supporting member, wherein the supporting member comprises:

a first supporting part at the rear surface of the vibration member; and a second supporting part connected between a periphery portion of the rear surface of the vibration member and the first supporting part, wherein the plurality of holes are configured at the first supporting part, wherein the first supporting part comprises a hole region overlapping the vibration device and including the plurality of holes, and wherein the hole region comprises:

a first hole region overlapping a center region of the vibration device;

a plurality of second hole regions overlapping a corner region of the vibration device; and a third hole region between the first hole region and the plurality of second hole regions.

2. The apparatus of claim 1, wherein one or more of the plurality of holes are configured at one or more of the first hole region, the plurality of second hole regions, and the third hole region.

3. The apparatus of claim 1, wherein the first supporting part comprises a center portion overlapping the vibration device and a periphery portion surrounding the center portion.

4. The apparatus of claim 1, wherein the vibration member comprises a porous plastic material or a micro cellular foam plastic material.

5. The apparatus of claim 1, further comprising a hole cover part configured at the supporting member to cover some of the plurality of holes.

6. The apparatus of claim 5, wherein the hole cover part is detachably attached on the supporting member to cover some of the plurality of holes.

7. The apparatus of claim 1, wherein the internal space is connected to an external space of the supporting member through the plurality of holes.

8. The apparatus of claim 1, further comprising a connection member between the vibration device and the vibration member.

9. The apparatus of claim 1, further comprising a coupling member between the vibration member and the supporting member.

10. The apparatus of claim 9, wherein the coupling member comprises:

a first coupling member between the vibration member and the supporting member; and a second coupling member between the vibration member and the supporting member, the second coupling member including a material which differs from a material of the first coupling member.

11. The apparatus of claim 1, further comprising one or more weight members provided at the vibration device.

12. The apparatus of claim 1, further comprising one or more weight members configured at the vibration member or the vibration device, wherein the weight members overlap one or more of a center portion and a periphery portion of the vibration device.

13. The apparatus of claim 1, further comprising a reinforcement member at the vibration member.

14. The apparatus of claim 13, wherein the reinforcement member comprises one or more materials of metal, plastic, fiber, leather, wood, cloth, rubber, carbon, glass, and paper, or comprises the same material as a material of the vibration member.

15. The apparatus of claim 13, wherein the reinforcement member is coupled to one of an entire rear surface of the vibration member, a rear periphery portion of the vibration member, a corner portion of the vibration member, and a center portion of the vibration member.

16. The apparatus of claim 13, further comprising a second connection member between the vibration member and the reinforcement member.

17. The apparatus of claim 16, wherein the second connection member comprises a plurality of hollow portions.

18. The apparatus of claim 17, wherein the second connection member comprises:

a first connection pattern between a center portion of the vibration member and a center portion of the reinforcement member; and a second connection pattern between a periphery portion of the vibration member and a periphery portion of the reinforcement member, the second connection pattern including a material which differs from a material of the first connection pattern.

19. The apparatus of claim 1, wherein the vibration member comprises one or more materials of metal, plastic, fiber, leather, wood, cloth, rubber, carbon, glass, and paper.

20. The apparatus of claim 1, wherein the vibration device comprises:

a vibration layer;

a first electrode layer at a first surface of the vibration layer; and a second electrode layer at a second surface of the vibration layer, the second surface of the vibration layer being different from the first surface of the vibration layer.

21. The apparatus of claim 20, wherein the vibration layer comprises:

a plurality of inorganic material portions having a piezoelectric characteristic; and an organic material portion between the plurality of inorganic material portions.

22. The apparatus of claim 1, wherein the vibration device comprises a plurality vibration parts spaced apart from one another, and wherein each of the plurality vibration parts comprises:

a vibration layer;

a first electrode layer at a first surface of the vibration layer; and a second electrode layer at a second surface of the vibration layer, the second surface of the vibration layer being different from the first surface of the vibration layer.

23. The apparatus of claim 22, wherein the vibration device further comprises:

a first cover member commonly connected with the first electrode layer of each of the plurality vibration parts; and a second cover member commonly connected with the second electrode layer of each of the plurality vibration parts.

24. The apparatus of claim 22, wherein the vibration layer of each of the plurality vibration parts comprises:

a plurality of inorganic material portions having a piezoelectric characteristic; and an organic material portion between the plurality of inorganic material portions.

25. The apparatus of claim 1, wherein the vibration device comprises a plurality of vibration generating parts, and wherein the plurality of vibration generating parts are configured to vibrate in a same direction.

26. The apparatus of claim 25, wherein the vibration device further comprises an intermediate member between the plurality of vibration generating parts.

27. An apparatus, comprising:

a vibration member;

a vibration device connected with the vibration member; and a housing covering a rear surface of the vibration member and including a plurality of holes, wherein an internal space provided by the vibration member and the housing is connected to an external space of the housing through the plurality of holes, wherein the housing comprises a first supporting part and a second supporting part configuring the internal space at the rear surface of the vibration member, wherein the plurality of holes are configured to pass through the first supporting part, wherein the first supporting part comprises a hole region overlapping the vibration device and including the plurality of holes, and wherein the hole region comprises:

a first hole region overlapping a center region of the vibration device;

a plurality of second hole regions overlapping a corner region of the vibration device; and a third hole region between the first hole region and the plurality of second hole regions.

28. The apparatus of claim 27, further comprising a connection member between the vibration device and the vibration member.

29. The apparatus of claim 27, further comprising one or more weight members provided at the vibration device.

30. The apparatus of claim 27, further comprising one or more weight members configured at the vibration member or the vibration device, wherein the weight members overlap one or more of a center portion and a periphery portion of the vibration device.

31. The apparatus of claim 27, further comprising a reinforcement member at the vibration member.

32. The apparatus of claim 31, wherein the reinforcement member comprises one or more materials of metal, plastic, fiber, leather, wood, cloth, rubber, carbon, glass, and paper, or comprises the same material as a material of the vibration member.

33. The apparatus of claim 31, wherein the reinforcement member is coupled to one of an entire rear surface of the vibration member, a rear periphery portion of the vibration member, a corner portion of the vibration member, and a center portion of the vibration member.

34. The apparatus of claim 31, further comprising a second connection member between the vibration member and the reinforcement member.

35. The apparatus of claim 34, wherein the second connection member comprises a plurality of hollow portions.

36. The apparatus of claim 34, wherein the second connection member comprises:

a first connection pattern between a center portion of the vibration member and a center portion of the reinforcement member; and a second connection pattern between a periphery portion of the vibration member and a periphery portion of the reinforcement member, the second connection pattern including a material which differs from a material of the first connection pattern.

37. The apparatus of claim 27, wherein the vibration member comprises one or more materials of metal, plastic, fiber, leather, wood, cloth, rubber, carbon, glass, and paper.

38. The apparatus of claim 27, wherein the vibration device comprises:

a vibration layer;

a first electrode layer at a first surface of the vibration layer; and a second electrode layer at a second surface of the vibration layer, the second surface of the vibration layer being different from the first surface of the vibration layer.

39. The apparatus of claim 38, wherein the vibration layer comprises:

a plurality of inorganic material portions having a piezoelectric characteristic; and an organic material portion between the plurality of inorganic material portions.

40. The apparatus of claim 27, wherein the vibration device comprises a plurality vibration parts spaced apart from one another; and wherein each of the plurality vibration parts comprises:

a vibration layer;

a first electrode layer at a first surface of the vibration layer; and a second electrode layer at a second surface of the vibration layer, the second surface of the vibration layer being different from the first surface of the vibration layer.

41. The apparatus of claim 40, wherein the vibration device further comprises:

a first cover member commonly connected with the first electrode layer of each of the plurality vibration parts; and a second cover member commonly connected with the second electrode layer of each of the plurality vibration parts.

42. The apparatus of claim 40, wherein the vibration layer of each of the plurality vibration parts comprises:

a plurality of inorganic material portions having a piezoelectric characteristic; and an organic material portion between the plurality of inorganic material portions.

43. The apparatus of claim 27, wherein the vibration device comprises a plurality of vibration generating parts, and wherein the plurality of vibration generating parts are configured to vibrate in a same direction.

44. The apparatus of claim 43, wherein the vibration device further comprises an intermediate member between the plurality of vibration generating parts.

45. The apparatus of claim 27, wherein the vibration member comprises a porous pattern.

46. The apparatus of claim 27, further comprising a coupling member between the vibration member and the supporting member.

47. The apparatus of claim 46, wherein the coupling member comprises:

a first coupling member between the vibration member and the supporting member; and a second coupling member between the vibration member and the supporting member, the second coupling member including a material which differs from a material of the first coupling member.

* * * * *